(12) United States Patent
Takanashi et al.

(10) Patent No.: US 12,332,545 B2
(45) Date of Patent: Jun. 17, 2025

(54) ACCESSORY HAVING FUNCTION OF PERFORMING REPRODUCTION DRIVING OF FOCUS LENS, CONTROL METHOD AND MEMORY MEDIUM

(71) Applicant: CANON KABUSHIKI KAISHA, Tokyo (JP)

(72) Inventors: Hideya Takanashi, Kanagawa (JP); Munenori Date, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 17/934,227

(22) Filed: Sep. 22, 2022

(65) Prior Publication Data

US 2023/0101440 A1 Mar. 30, 2023

(30) Foreign Application Priority Data

Sep. 27, 2021 (JP) ................................ 2021-156457
Sep. 27, 2021 (JP) ................................ 2021-156568

(51) Int. Cl.
*G03B 13/36* (2021.01)
*G03B 17/14* (2021.01)
*H04N 23/55* (2023.01)
*H04N 23/66* (2023.01)
*H04N 23/69* (2023.01)

(52) U.S. Cl.
CPC ............. *G03B 13/36* (2013.01); *G03B 17/14* (2013.01); *H04N 23/55* (2023.01); *H04N 23/66* (2023.01); *H04N 23/69* (2023.01)

(58) Field of Classification Search
CPC .... G03B 13/36; G03B 17/14; G03B 2206/00; G03B 17/565; H04N 23/55; H04N 23/66; H04N 23/663; H04N 23/67; H04N 23/69
See application file for complete search history.

(56) References Cited

U.S. PATENT DOCUMENTS 6,041,189 A * 3/2000 Izukawa .................. G03B 7/26
396/529

FOREIGN PATENT DOCUMENTS

| JP | 2012141573 A | * | 7/2012 |
| JP | 2017-038241 A | | 2/2017 |
| JP | 2019179049 A | * | 10/2019 |
| WO | 2013/042736 A1 | | 3/2013 |

* cited by examiner

*Primary Examiner* — Antoinette T Spinks
(74) *Attorney, Agent, or Firm* — Cowan, Liebowitz & Latman, P.C.

(57) ABSTRACT

An accessory detachably attached between an interchangeable lens and an imaging apparatus includes a communication unit for communicating with the interchangeable lens and the imaging apparatus, a first operation unit operated when focus position information on the interchangeable lens is to be acquired from the interchangeable lens, a memory unit storing information relating to focus of the interchangeable lens based on the focus position information, a second operation unit operated when reproduction driving is to be performed of a focus lens included in the interchangeable lens, and a control unit controlling driving of the focus lens. When the first operation unit is operated, the control unit acquires the information relating to focus by using the focus position information. When the second operation unit is operated, the control unit performs the reproduction driving of the focus lens by using the information relating to focus.

25 Claims, 34 Drawing Sheets

ACCESSORY HAVING FUNCTION OF PERFORMING REPRODUCTION DRIVING OF FOCUS LENS, CONTROL METHOD AND MEMORY MEDIUM

BACKGROUND OF THE INVENTION

Field of the Invention

An aspect of the embodiments relates to an accessory that is detachably attached between an interchangeable lens and a camera body.

Description of the Related Art

Conventionally, in order that functions of lens-interchangeable type camera systems are extended, accessories have been proposed each of which is attached between a camera body and an interchangeable lens. PCT International Publication No. ("WO") 2013/042736 discloses an accessory including an operation member for inputting optical characteristic information on an interchangeable lens.

In recent years, there has been a need for an accessory that has a function of storing a focus position and performing reproduction driving of a focus lens to the stored focus position, but the accessory disclosed in WO 2013/042736 cannot realize the above function.

SUMMARY OF THE INVENTION

The present disclosure provides an accessory, a control method, and a memory medium each of which can store a focus position and perform reproduction driving of a focus lens to the stored focus position.

An accessory according to one aspect of embodiments of the present disclosure is detachably attached between an interchangeable lens and an imaging apparatus. The accessory includes a communication unit, a first operation unit, a memory unit, a second operation unit, and at least one processor. The communication unit is configured to communicate with the interchangeable lens and the imaging apparatus. The first operation unit is configured to be operated in a case where focus position information on the interchangeable lens is to be acquired from the interchangeable lens. The memory unit is configured to store information relating to focus of the interchangeable lens based on the focus position information. The second operation unit is configured to be operated in a case where reproduction driving is to be performed of a focus lens included in the interchangeable lens. The at least one processor is configured to function as a control unit configured to control driving of the focus lens. In a case where the first operation unit is operated, the control unit acquires the information relating to focus by using the focus position information. In a case where the second operation unit is operated, the control unit performs the reproduction driving of the focus lens by using the information relating to focus.

A control method according to one aspect of embodiments of the present disclosure is a control method of an accessory. The accessory is detachably attached between an interchangeable lens and an imaging apparatus and includes a first operation unit and a second operation unit. The first operation unit is configured to be operated in a case where focus position information on the interchangeable lens is to be acquired from the interchangeable lens. The second operation unit is configured to be operated in a case where reproduction driving is to be performed of a focus lens included in the interchangeable lens. The control method includes a step in which the first operation unit is operated, a step of acquiring information relating to focus by using the focus position information, a step of storing the information relating to focus, and a step in which the second operation unit is operated, and a step of performing the reproduction driving of the focus lens by using the information relating to focus.

A non-transitory computer-readable storage medium according to one aspect of embodiments of the present disclosure stores a computer program that causes a computer to execute the above control method.

Further features of the present invention will become apparent from the following description of exemplary embodiments with reference to the attached drawings.

DESCRIPTION OF THE EMBODIMENTS

Figure 1:
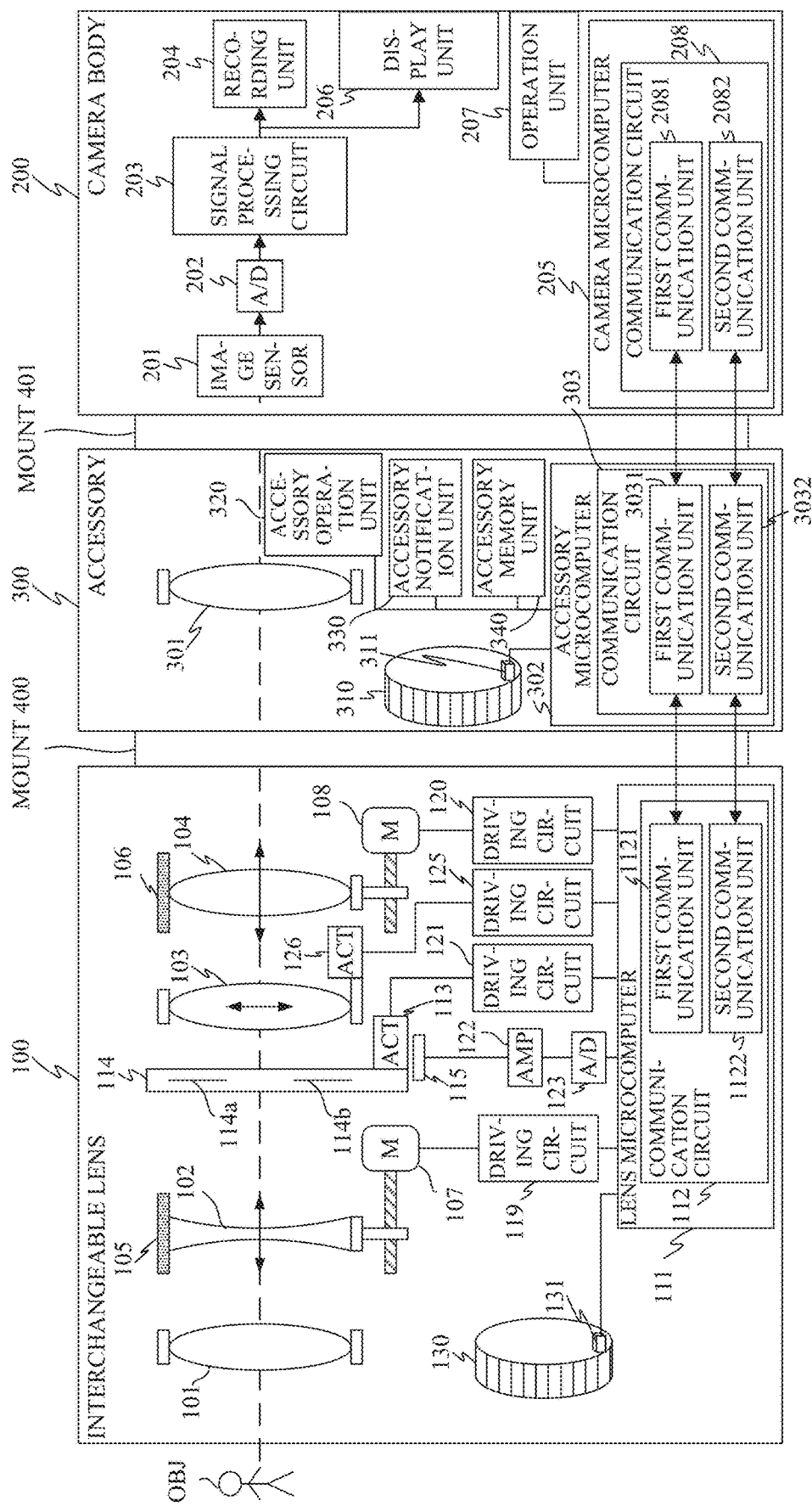
FIG. 1 is a block diagram illustrating a camera system according to an embodiment of the present disclosure.

Referring now to the accompanying drawings, a description is given of embodiments according to the present disclosure. Corresponding elements in respective figures are designated by the same reference numerals, and a description thereof is omitted.

First Embodiment

Configuration of Camera System

FIG. 1 is a block diagram of a camera system (imaging system) according to embodiments of the present disclosure. The camera system includes an interchangeable lens 100, a camera body (imaging apparatus) 200, and an accessory 300 that is detachably attached between the camera body 200 and the interchangeable lens 100. The camera body 200 can be used in a state where both the interchangeable lens 100 and the accessory 300 are attached. In this embodiment, the accessory 300 consists of one accessory but may include a plurality of accessories.

In this embodiment, the interchangeable lens 100, camera body 200, and the accessory 300 perform communication by using a plurality of communication methods. The interchangeable lens 100, the camera body 200, and the accessory 300 communicate a control command and data (information) via their respective communication circuits (communication unit) 112, 208, and 303. The interchangeable lens 100, the camera body 200, and the accessory 300 include a path for communication via first communication units 1121, 2081, and 3031 and a path for communication via second communication units 1122, 2082, and 3032. The first communication unit and the second communication unit support a plurality of communication methods, and can select respective optimum communication methods for various situations by changing the communication method to a same communication method in synchronization with each other depending on a type of data to be communicated and/or a purpose of communication. The communication methods, the communication circuits, and the communication paths are not limited to those in this embodiment, and may have different configurations as long as communication can be performed between the interchangeable lens 100, the camera body 200, and the accessory 300. For example, the communication path may be only one of the paths via the first communication unit and the second communication unit.

Hereinafter, a description is given of specific configurations of the interchangeable lens 100, the camera body 200, and the accessory 300. The interchangeable lens 100 and the accessory 300 are mechanically and electrically connected via a mount 400. The mount 400 schematically represents a state in which a mount provided on the interchangeable lens 100 and a mount provided on the accessory 300 are connected. The camera body 200 and accessory 300 are mechanically and electrically connected via a mount 401. The mount 401 schematically represents a state in which a mount provided on the camera body 200 and a mount provided on the accessory 300 are connected. A communication terminal is provided on a mount surface of each of the mounts provided on the interchangeable lens 100, the camera body 200, and the accessory 300. In a state where each unit is connected via the mounts, when the corresponding communication terminals are in contact with each other, communication via the communication terminals can be performed.

The interchangeable lens 100 receives power supply from the camera body 200 via unillustrated power terminals provided on the mounts 400 and 401, and supplies power to various actuators and a lens microcomputer 111 which are described below. The accessory 300 receives power supply from the camera body 200 via an unillustrated power terminal provided on the mount 401, and supplies power to an accessory microcomputer (control unit) 302.

Hereinafter, a description is given of a configuration of the interchangeable lens 100. The interchangeable lens 100 includes an imaging optical system. The imaging optical system includes, in order from an object OBJ side, a field lens 101, a zoom lens 102 that performs zooming (magnification variation), an aperture unit 114 that adjusts a light amount, an image stabilization lens 103, and a focus lens 104 that performs focusing.

Lens holding frames 105 and 106 respectively hold the zoom lens 102 and the focus lens 104. In synchronization with a driving pulse, stepping motors 107 and 108 respectively drive the lens holding frames 105 and 106 along an optical axis of the imaging optical system represented by a broken line.

By moving in a direction including a component in a direction orthogonal to the optical axis of the imaging optical system, the image stabilization lens 103 reduces image blur caused by camera shake or the like.

The lens microcomputer 111 controls operation of each part in the interchangeable lens 100. The lens microcomputer 111 receives, via the communication circuit 112, a control command and a transmission request command each of which is transmitted from the camera body 200 or the accessory 300. The lens microcomputer 111 provides a lens control corresponding to the control command, and transmits, via the communication circuit 112, lens data corresponding to the transmission request command to the camera body 200 or the accessory 300. For example, in response to commands relating to zooming and focusing among the control commands, the lens microcomputer 111 outputs driving signals to a zoom driving circuit 119 and a focus driving circuit 120 so as to drive the stepping motors 107 and 108. Thereby, zooming processing of controlling zooming operation (zooming process) performed by the zoom lens 102 and autofocus (AF) processing of controlling focusing operation (focus adjustment process) performed by the focus lens 104 are performed.

The aperture unit 114 includes diaphragm blades 114a and 114b. A Hall element 115 detects a state (position) of the diaphragm blades 114a and 114b. A result of the detection by the Hall element 115 is input to the lens microcomputer 111 via an amplifier circuit 122 and an A/D conversion circuit 123. The lens microcomputer 111 outputs a driving signal to an aperture driving circuit 121 based on the input signal from the A/D conversion circuit 123 so that an aperture actuator 113 is driven. Thereby, a light amount adjustment process by the aperture unit 114 is performed.

The lens microcomputer 111 drives an image stabilization actuator 126 such as a voice coil motor via an image stabilization driving circuit 125 in response to a shake detected by an unillustrated shake sensor such as a vibration gyro provided in the interchangeable lens 100. Thereby, image stabilization processing is performed that controls a shifting process (image stabilization process) of the image stabilization lens 103.

The interchangeable lens 100 includes a manual operation ring (electronic ring) 130 that can be rotated by a user and a ring rotation detector 131. The ring rotation detector 131 includes, for example, a photo interrupter that outputs a two-phase signal in response to a rotation of the manual operation ring 130. The lens microcomputer 111 can detect a rotation operation amount (including a direction) of the manual operation ring 130 by using the two-phase signal.

Hereinafter, a description is given of a configuration of the accessory 300. The accessory 300 is, for example, an extender for changing a focal length, and includes a magnification variation lens 301 and an accessory microcomputer 302. The accessory 300 is described as an extender in this embodiment, but may be a wide converter that changes the focal length or may be a mount converter that changes a flange back length.

The accessory microcomputer 302 controls operation or a process of each part in the accessory 300. The accessory microcomputer 302 receives, via the communication circuit 303, a control command and a transmission request command transmitted from the camera body 200. The accessory microcomputer 302 performs accessory control corresponding to the control command, and transmits, via the communication circuit 303, accessory data corresponding to the transmission request command to the camera body 200. In a case where the accessory microcomputer 302 receives a command for the interchangeable lens 100, the accessory microcomputer 302 performs communication converging processing as necessary, and then transmits a control command or a transmission request command to the interchangeable lens 100 via the communication circuit 303 as necessary. The accessory microcomputer 302 transmits a control command and a transmission request command to the interchangeable lens 100 via the communication circuit 303 as necessary based on an operation on an accessory operation unit 320 described below or the like. In a case where the accessory microcomputer 302 receives, via the communication circuit 303, lens data corresponding to the transmission request command to the interchangeable lens 100, the accessory microcomputer 302 performs the communication converging processing as necessary and then transmits the lens data to the camera body 200 via the communication circuit 303 as necessary.

The accessory 300 includes an accessory operation ring (so-called electronic ring) 310 that can be rotated by the user and a ring rotation detector 311. The ring rotation detector 311 includes, for example, a photo interrupter that outputs a two-phase signal in response to a rotation of the accessory operation ring 310. The accessory microcomputer 302 can detect a rotation operation amount (including a direction) of the accessory operation ring 310 by using the two-phase signals.

The accessory 300 includes an accessory operation unit 320 in addition to the accessory operation ring 310. The accessory operation unit 320 is, for example, a switch, a button, a touch panel, or the like, and may include a plurality of operation members.

The accessory 300 includes an accessory notification unit (notification unit) 330 for notifying the user of information. The accessory notification unit 330 is, for example, an LED, a liquid crystal display (LCD), a speaker, a vibrator, or the like, and may include a plurality of notification members.

The accessory 300 includes an accessory memory unit (memory unit) 340 (for example, a non-volatile memory) for storing information. The accessory memory unit 340 is used to store target focus position information for performing reproduction driving of a focus position, which is described below, information communicated between the interchangeable lens 100 and the camera body 200 for warning determination, and the like.

Next, a description is given of a configuration of the camera body 200. The camera body 200 includes an image sensor 201 such as a CCD sensor and a CMOS sensor, an A/D conversion circuit 202, a signal processing circuit 203, a recording unit 204, a camera microcomputer 205, and a display unit 206.

The image sensor 201 photoelectrically converts an object image formed by the imaging optical system in the interchangeable lens 100 and outputs an electric signal (analog signal). The A/D conversion circuit 202 converts the analog signal output from the image sensor 201 into a digital signal. The signal processing circuit 203 generates an image signal by performing various image processing on the digital signal output from the A/D conversion circuit 202.

The signal processing circuit 203 also generates, from the image signal, focusing information indicating (representing or including) a contrast state of the object image, that is, a focusing state of the imaging optical system, and luminance information indicating (representing or including) an exposure state. The signal processing circuit 203 outputs the image signal to the display unit 206, and the display unit 206 displays the image signal as a live view image used by the user checking a composition, a focusing state, and the like.

The camera microcomputer 205 controls the camera body 200 in response to input from an operation unit 207 such as an imaging instruction switch and various setting switches. The camera microcomputer 205 transmits a control command and a transmission request command to the interchangeable lens 100 and/or the accessory 300 via the communication circuit 208, and receives the lens data and/or the accessory data from the interchangeable lens 100 and/or the accessory 300 via the communication circuit 208. For example, the camera microcomputer 205 transmits a control command relating to a focusing process to the interchangeable lens 100 depending on the focusing information generated by the signal processing circuit 203. For example, the camera microcomputer 205 transmits a transmission request command for acquiring lens data relating to the focusing process to the interchangeable lens 100, and receives lens data relating to the focusing process from the interchangeable lens 100.

Communication Path in First Communication

Figure 2A:
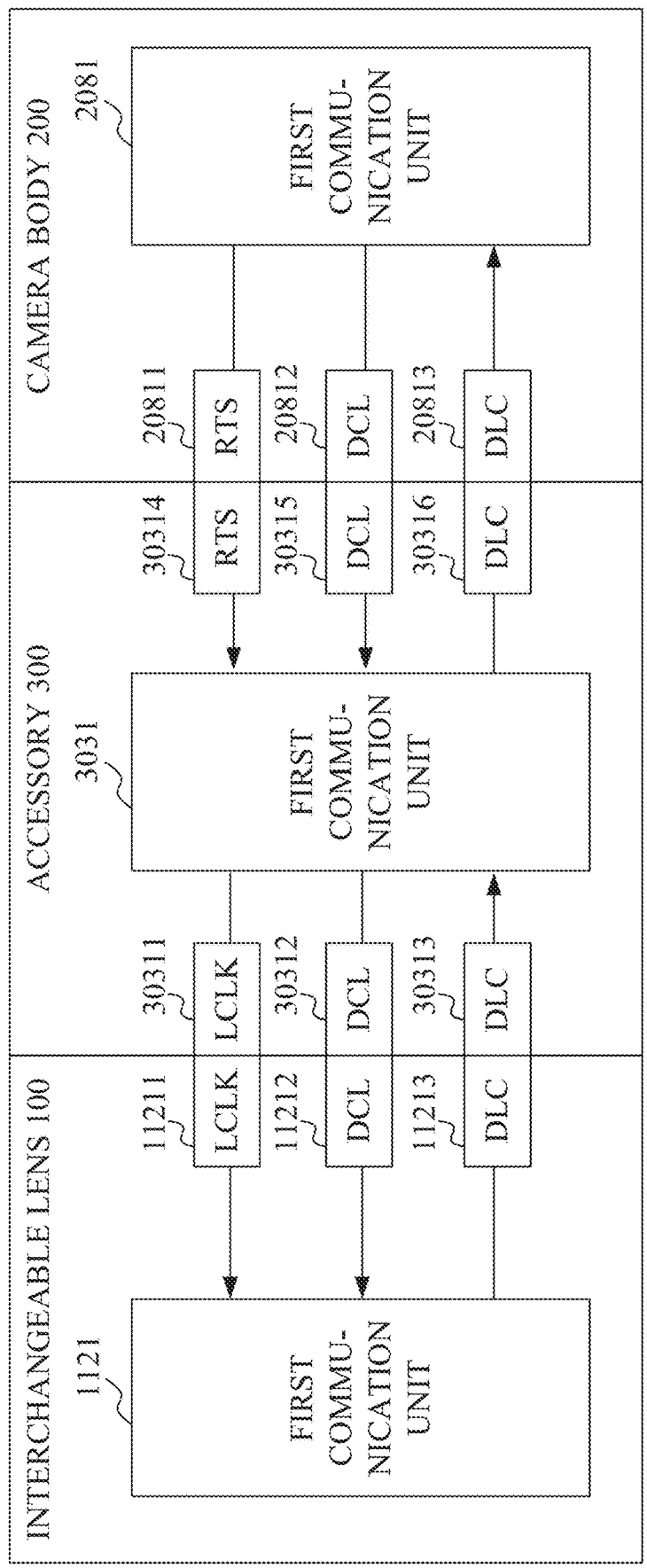
FIGS. 2A and 2B are diagrams illustrating communication paths in first communication according to the first embodiment.
Figure 2B:
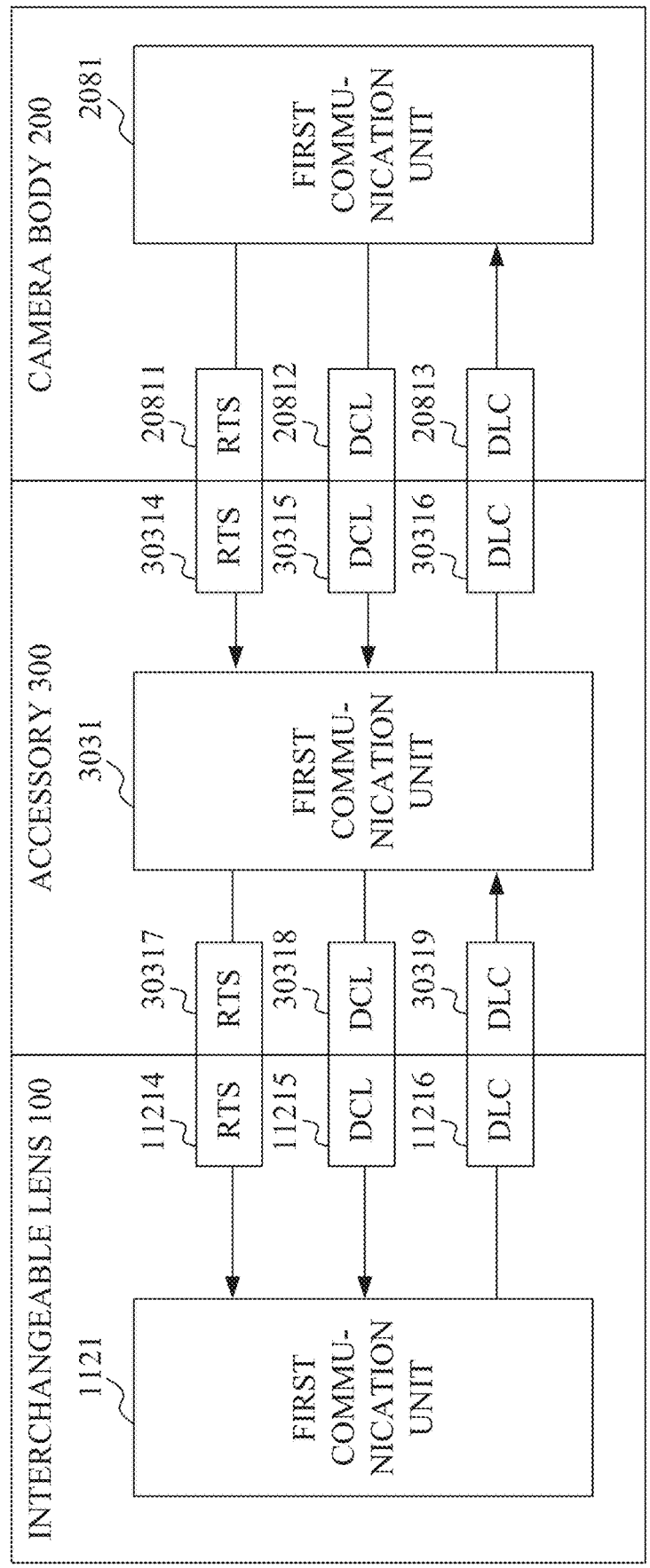

With reference to FIGS. 2A and 2B, a description is given of a communication path configured between the first communication units 1121, 2081, and 3031 according to this embodiment. Communication performed via this communication path is also referred to as first communication.

FIG. 2A illustrates an example of the communication path in the first communication. The first communication units 1121 and 3031 communicate using a signal line connected via communication terminals (LCLK 11211, DCL 11212, DLC 11213, LCLK 30311, DCL 30312, DLC 30313) provided in the mount 400. The first communication units 2081 and 3031 communicate using a signal line connected via communication terminals (RTS 20811, DCL 20812, DLC 20813, RTS 30314, DCL 30315, DLC 30316) provided in the mount 401. In this example, the first communication units 1121 and 3031 communicate by a communication method A which is a three-wire clock synchronous serial communication method. The first communication units 2081 and 3031 communicate by a communication method B which is a three-wire asynchronous serial communication method and is different from the communication method A.

FIG. 2B illustrates an example of a communication path in the first communication that is different from the example illustrated in FIG. 2A. The first communication units 1121 and 3031 communicate using a signal line connected via communication terminals (RTS 11214, DCL 11215, DLC 11216, RTS 30317, DCL 30318, DLC 30319) provided in the mount 400. The first communication units 2081 and 3031 communicate using a signal line connected via communication terminals (RTS 20811, DCL 20812, DLC 20813, RTS 30314, DCL 30315, DLC 30316) provided in the mount 401. In this example, communication between the first communication units 1121 and 3031 and between the first communication units 2081 and 3031 are performed by the communication method B, which is a three-wire asynchronous serial communication method. Combinations of the communication paths and the communication methods are not limited to these, and may be another combination. For example, communication between the first communication units 1121 and 3031 and between the first communication units 2081 and 3031 may be performed by the communication method A.

Communication Waveform in Communication Method A of First Communication

Figure 3A:
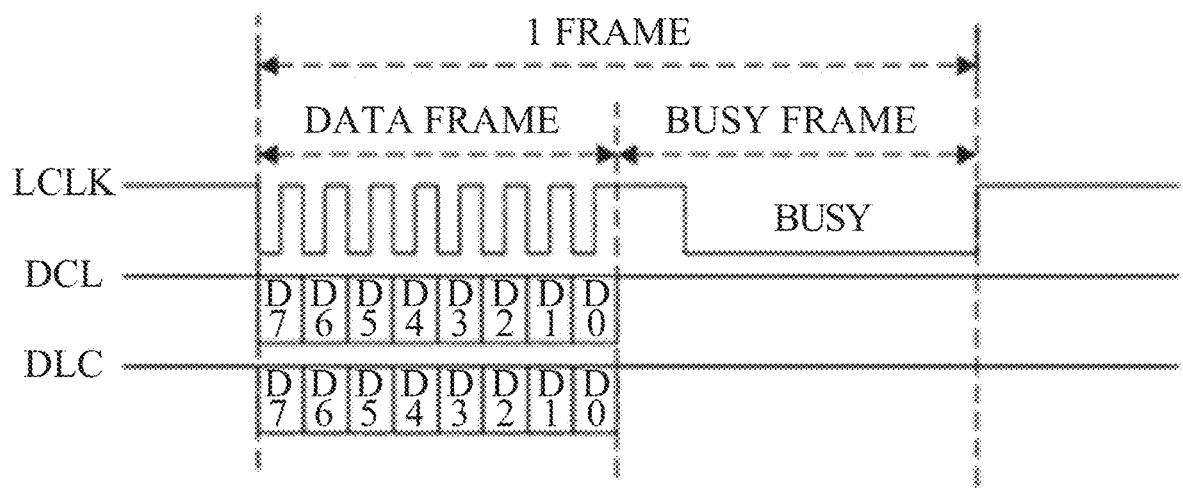
FIGS. 3A to 3C are diagrams illustrating communication waveforms in a communication method A of the first communication according to the first embodiment.
Figure 3B:
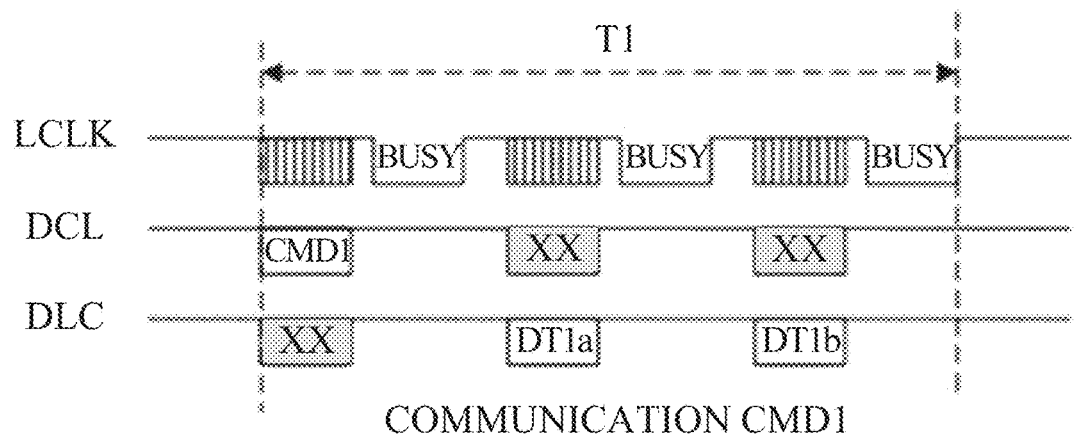
Figure 3C:
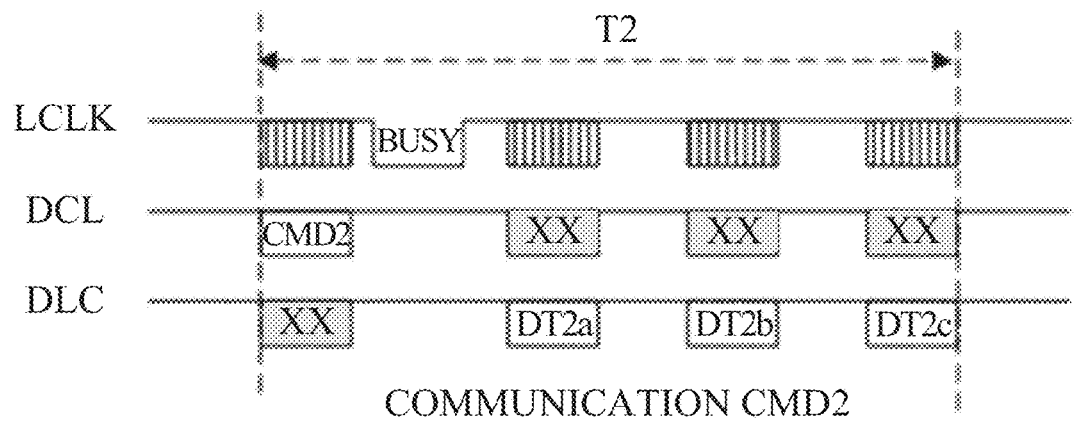

With reference to FIGS. 3A to 3C, a description is given of a communication method A, which is a three-wire clock synchronous serial communication method of the first communication in this embodiment.

The communication method A is a communication method executed between a communication main unit that transmits a control command and a data transmission request command and a communication sub unit that transmits data in response to the data transmission request command. In the example illustrated in FIG. 2A, the communication is performed while the first communication unit 3031 serves as a communication main unit and the first communication unit 1121 serves as a communication sub unit.

A clock signal LCLK is mainly used as data synchronous clock signal from the communication main unit to the communication sub unit. A communication signal DCL is used for transmission of data such as a control command and a data transmission request command from the communication main unit to the communication sub unit. A data signal DLC is used for transmission of data transmitted from the communication sub unit to the communication main unit.

In the communication method A, the communication main unit and the communication sub unit communicate by a full-duplex communication method (full duplex method) in which communication (transmission and reception) is performed simultaneously in both directions in synchronization with a common clock signal LCLK.

FIG. 3A illustrates waveforms of communication signals in one frame, which is the smallest unit of communication. First, the communication main unit transmits the clock signal LCLK including eight cycles of pulses as one set, and also transmits the communication signal DCL to the communication sub unit in synchronization with the clock signal LCLK. At the same time, the communication main unit receives the data signal DLC output from the communication sub unit in synchronization with the clock signal LCLK. In this way, one byte (eight bits) of data is transmitted and received by each of the communication main unit and the communication sub unit in synchronization with one set of clock signals LCLK. The period of one-byte data communication is referred to as a data frame. After the data frame, a communication pause period is inserted by communication standby (wait) request information (hereinafter, simply referred to as "communication standby request") BUSY of which the communication sub unit notifies the communication main unit. The communication pause period is referred to as a BUSY frame. A unit of communication including a data frame and a BUSY frame as one set is referred to as one frame.

FIG. 3B illustrates waveforms of communication signals of three frames in a case where the communication main unit transmits a command CMD1 to the communication sub unit and receives two-byte data DT1$a$ and DT1$b$ corresponding to the command CMD1. Between the communication main unit and the communication sub unit, a type of data DT and the number of bytes corresponding to each command CMD are determined in advance.

In the first frame, the communication main unit transmits the clock signal LCLK and transmits, as the communication signal DCL, the command CMD1 corresponding to the data DT1$a$ and DT1$b$ of which the communication main unit requests transmission. The data signal DLC in this frame is regarded as invalid data.

Subsequently, the communication main unit outputs the clock signal LCLK for eight cycles, and then changes a state of the communication terminal on the communication main unit side from an output format to an input format. The communication sub unit changes a state of the communication terminal on the communication sub unit side from an input format to an output format after the change is completed of the state of the communication terminal on the communication main unit side. Thereafter, the communication sub unit changes a signal level of the clock signal LCLK to low so as to notify the communication main unit of a communication standby request BUSY. The communication main unit maintains the state of the communication terminal in the input format during a period in which the communication main unit is notified of the communication standby request BUSY, and pauses communication with the communication sub unit.

The communication sub unit generates the data DT1$a$ corresponding to the command CMD1 during the period in which the communication sub unit notifies the communication main unit of the communication standby request BUSY. After the communication sub unit is ready to transmit the data DT1$a$ as the data signal DLC for the next frame, the communication sub unit changes the signal level of the clock signal LCLK to high so as to notify the communication main unit of cancellation of the communication standby request BUSY. The communication main unit recognizes the cancellation of the communication standby request BUSY, and then receives the data DT1$a$ from the communication sub unit by transmitting the clock signal LCLK for one frame to the communication sub unit. Subsequently, similarly, the communication main unit receives the data DT1$b$.

FIG. 3C illustrates waveforms of communication signals including four frames in a case where the communication main unit transmits a command CMD2 to the communication sub unit and receives three-byte lens data DT2$a$, DT2$b$, and DT2$c$ corresponding to the command CMD2. The communication sub unit notifies the communication main unit of the communication standby request BUSY in the first frame, but does not notify the communication main unit of the communication standby request BUSY in the second to fourth frames. Therefore, intervals can be shortened between frames.

Communication Waveform of Communication Method B in First Communication

Figure 4A:
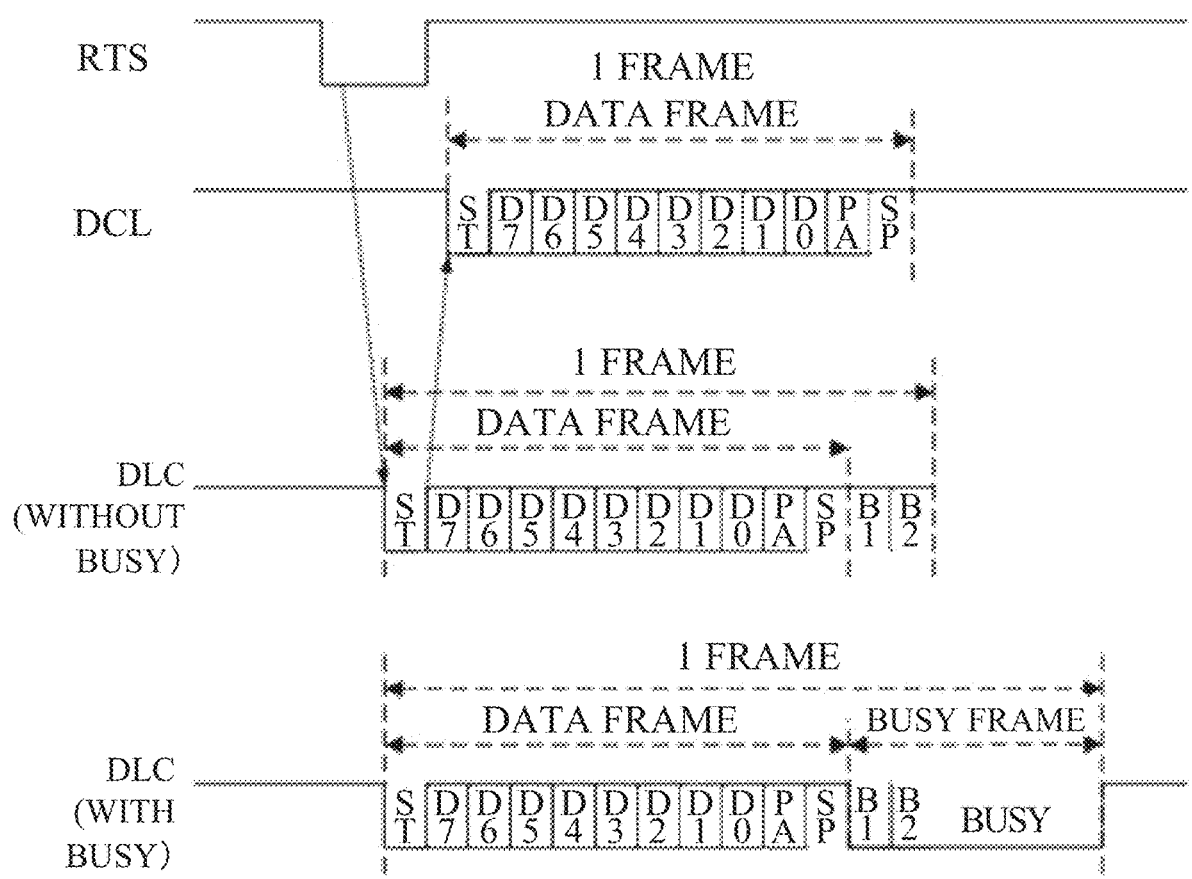
FIGS. 4A to 4C are diagrams illustrating communication waveforms in a communication method B of the first communication according to the first embodiment.
Figure 4B:
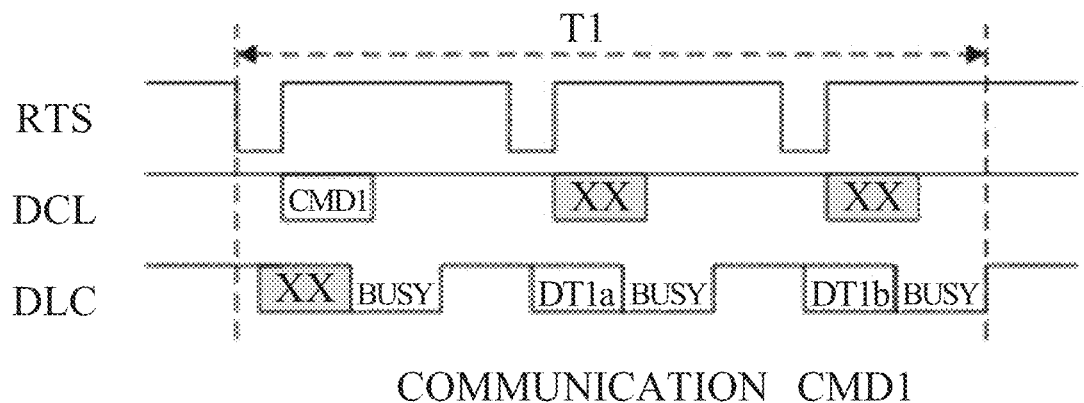
Figure 4C:
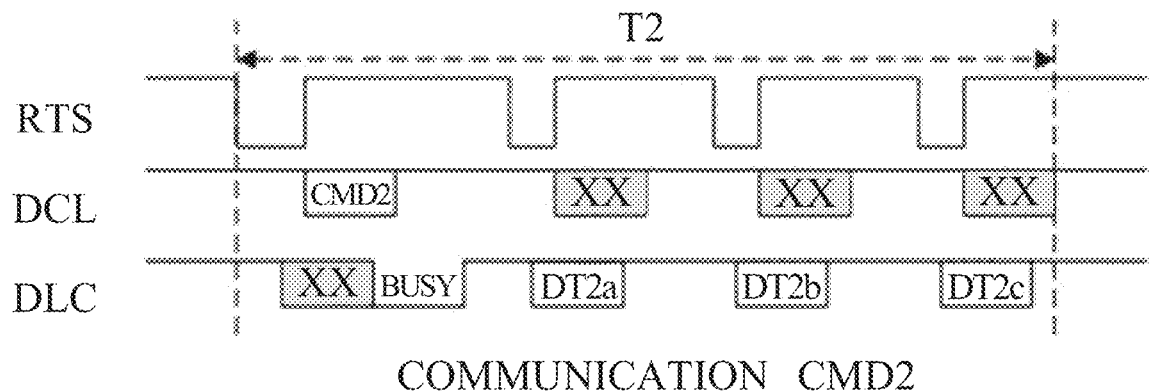

With reference to FIGS. 4A to 4C, a description is given of the communication method B, which is a three-wire asynchronous serial communication method in the first communication according to this embodiment.

The communication method B is a communication method performed between a communication main unit that transmits a control command and a data transmission request command and a communication sub unit that transmits data in response to the data transmission request command. In the example illustrated in FIG. 2A, the communication is performed while the first communication unit 2081 serves as a communication main unit and the first communication unit 3031 serves as a communication sub unit. In the example illustrated in FIG. 2B, the communication is performed while the first communication unit 2081 serves as a communication main unit and the first communication unit 3031 serves as a communication sub unit, and the communication is performed while the first communication unit 3031 serves as a communication main unit and the first communication unit 1121 serves as a communication sub unit.

The communication main unit uses a communication request signal RTS at a time when the communication starts between the communication main unit and the communication sub unit. A communication signal DCL is used for transmission of data such as a control command and a data transmission request command from the communication main unit to the communication sub unit. A data signal DLC is used for transmission of data transmitted from the communication sub unit to the communication main unit.

In the communication method B, the communication main unit and the communication sub unit do not transmit and receive data in synchronization with a common clock signal as in the communication method A, but transmit and receive data in a predetermined communication bit rate. The communication bit rate indicates (represents) an amount of data that can be communicated per second, and is represented by a unit of bits per second (bps). The communication main unit and the communication sub unit communicate by using a full-duplex communication method in which communication (transmission and reception) are performed simultaneously in both directions.

FIG. 4A illustrates waveforms of communication signals in one frame, which is the smallest unit of communication. In a state where data is not transmitted/received, a signal level of the communication request signal RTS is high. Data communication is started by the communication main unit changing the signal level of the communication request signal RTS to low. The communication sub unit detects that the signal level of the communication request signal RTS has changed to low, and then starts outputting data to the data signal DLC. The communication main unit detects that a start bit ST is output to the data signal DLC, and then starts data output to the data signal DCL.

Here, a description is given of a data format of the data signal DLC. One frame is roughly divided into a first data frame and a subsequent BUSY frame. In a non-transmission state where no data is transmitted, the signal level is high. The communication sub unit notifies the communication main unit of the start of transmission of the data signal DLC of one frame by setting the signal level to low only for one-bit period. This one-bit period is referred to as a start bit ST, and the data frame starts from this bit. Subsequently, the communication sub unit transmits one byte of data in an eight-bit period from a second bit to a ninth bit. A data bit sequence is in an MSB first format, starting with highest data D7, followed by data D6, and data D5, and ending with lowest data D0. One-bit parity PA information is added to a tenth bit. The signal level is set to high for a period of a stop bit SP indicating (representing) the end of one frame, and thereby the data frame started from the start bit ST ends. A BUSY frame is added after the stop bit SP. As illustrated in DLC (with BUSY) in FIG. 4A, the signal level is low until the communication standby request BUSY is canceled. For a case where the communication sub unit does not need to notify the communication main unit of the communication standby request BUSY, a data format is specified in which one frame does not include a BUSY frame as illustrated in DLC (without BUSY) in FIG. 4A. That is, as the data format of the data signal DLC, it is possible to select whether or not to notify the communication main unit of the communication standby request BUSY depending on a processing state in the communication sub unit.

Here, a description is given of how the communication main unit identifies presence or absence of the communication standby request BUSY (whether the DLC is with BUSY or without BUSY). The communication main unit defines one of bit positions B1 and B2 in the DLC (without BUSY) and DLC (without BUSY) waveforms as a default position P for identifying the presence or absence of the communication standby request BUSY. Selecting the default position P from the bit positions B1 and B2 can solve a problem that, depending on processing performance of the communication sub unit, processing time to set the signal level to low for the notification of the communication standby request BUSY are different after the data frame of the data signal DLC is transmitted. Which of the bit positions B1 and B2 is set as the default position P is determined in advance by communication between the communication main unit and the communication sub unit. The default position P does not have to be selected from the bit positions B1 and B2, and may be selected from bit positions later than B1 and B2 depending on the processing capabilities of both the microcomputers.

Next, as a supplement description to the BUSY frame, a description is given of a point that the BUSY frame, which is added to the clock signal LCLK in the communication method A, is added to the data signal DLC in the communication method B. In the communication method A, the clock signal LCLK output by the communication main unit and the communication standby request BUSY transmitted by the communication sub unit are communicated using the same signal line. Collision is prevented between the outputs from the communication main unit and the communication sub unit by allocating a period in which output can be performed in a time division manner. In order that the collision prevention is ensured between the outputs, an output prohibition period is inserted in which no output is allowed between when the communication main unit completes the output of the clock signal LCLK and when the communication sub unit is allowed to output the communication standby request BUSY. Inserting the output prohibition period, which is a communication invalid period during which communication cannot be performed, reduces an effective communication speed. In the communication method B, since the BUSY frame is added to the data signal DLC which is the dedicated output signal for the communication sub unit, the above problem does not occur.

Subsequently, a description is given of a data format of the communication signal DCL. Specifications of a data frame are the same in the communication signal DCL and the data signal DLC, and therefore a detailed description thereof is omitted. Unlike the data signal DLC, it is prohibited to add a BUSY frame to the communication signal DCL.

FIGS. 4B and 4C illustrate waveforms of communication signals in communication method B, and these waveforms respectively correspond to the waveforms illustrated in FIGS. 3B and 3C.

Communication Path in Second Communication

Figure 5:
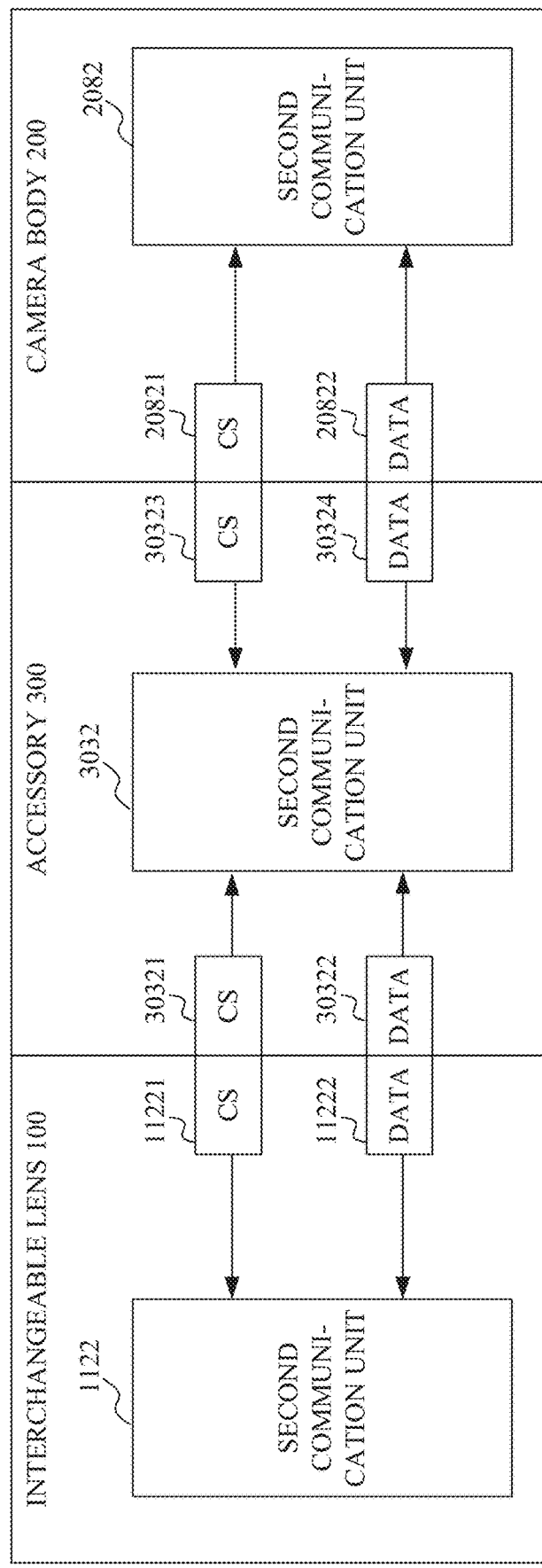
FIG. 5 is a diagram illustrating communication paths in second communication according to the first embodiment.

With reference to FIG. 5, a description is given of communication paths formed between the second communication units 1122, 2082, and 3032 according to this embodiment. Communication performed via these communication paths is also referred to as second communication. The second communication units 1122 and 3032 communicate by using signal lines connected via communication terminals (CS 11221, DATA 11222, CS 30321, DATA 30322) provided in the mount 400. The second communication units 2082 and 3032 communicate by using signal lines connected via communication terminals (CS 20821, DATA 20822, CS 30323, DATA 30324) provided in the mount 401. In this embodiment, communication between the second communication units 1122 and 3032 and between the second communication units 2082 and 3032 are performed by a communication method C which is a two-wire asynchronous serial communication method. The combination of the communication path and the communication method is not limited to this, and may be another combination. For example, the second communication units 1122 and 3032 may perform communication by the communication method C, and the second communication units 2082 and 3032 may perform communication by the communication method A.

Communication Waveform in Second Communication

Figure 6A:
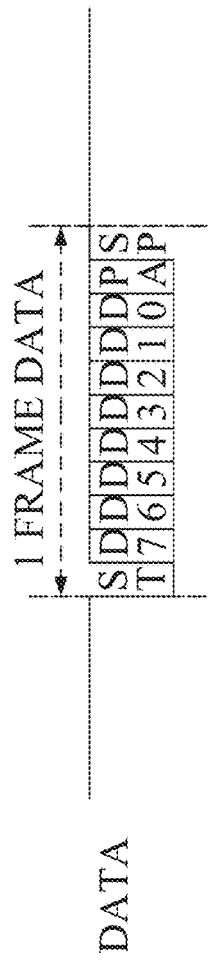
FIGS. 6A and 6B are diagrams illustrating communication waveforms in a communication method C of the second communication according to the first embodiment.
Figure 6B:
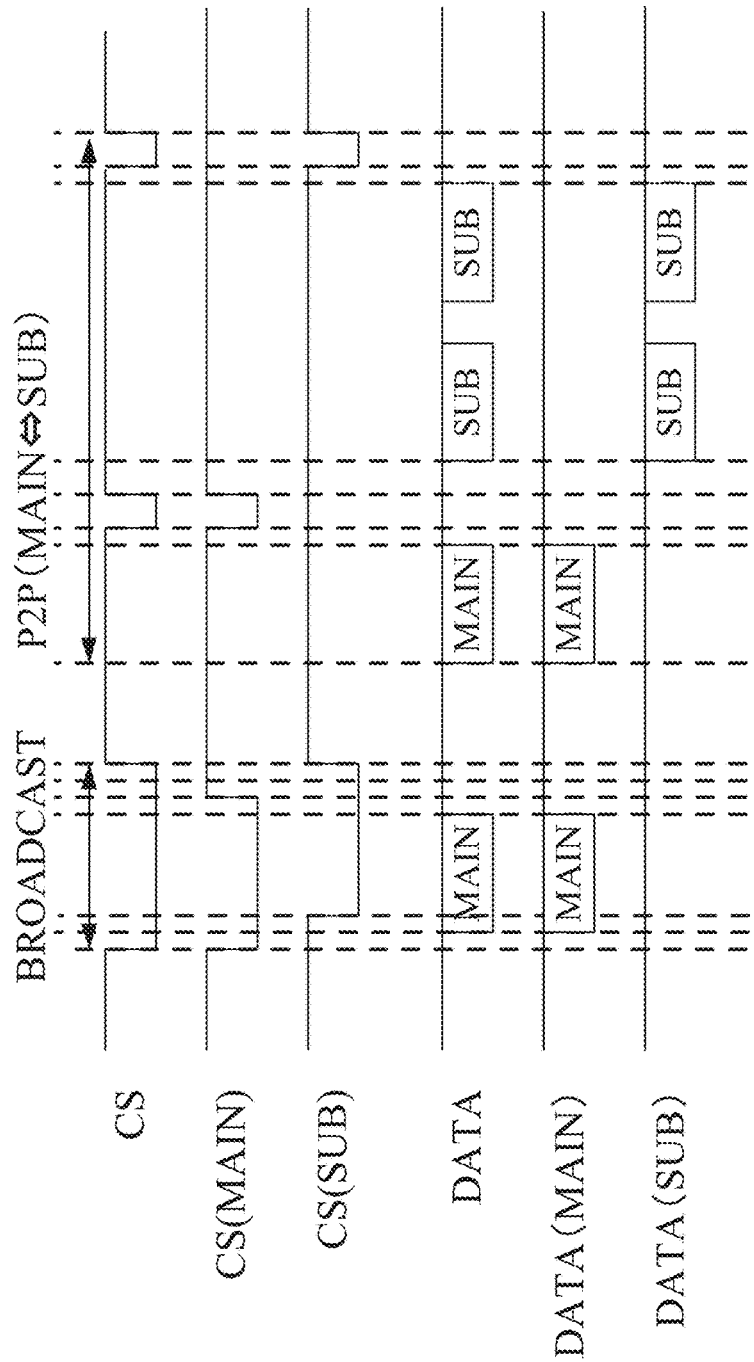

With reference to FIGS. 6A to 6C, a description is given of the communication method C, which is a two-wire asynchronous serial communication method in the second communication according to this embodiment.

The communication method C is a communication method performed between a communication main unit that transmits a control command and a data transmission request command and one or more communication sub units that transmit data in response to the data transmission request command. In the example illustrated in FIG. 5, the communication is performed between the second communication units 2082 and 3032, while the second communication unit 2082 serves as a communication main unit and the second communication unit 3032 serves as a communication sub unit. The communication is performed between the second communication units 1122 and 3032, while the second communication unit 3032 serves as a communication main unit and the second communication unit 1122 serves as a communication sub unit.

In contrast to the communication methods A and B, each of which is one-to-one communication between the communication main unit and the communication sub unit, the communication method C is characterized by one-to-many communication in which the communication main unit and a plurality of communication sub units can communicate. Thus, for example, a second communication unit (not illustrated) of another accessory may be connected between the second communication units 2082 and 3032. In that case, the second communication unit 2082 can communicate with the plurality of second communication units of the accessories.

In the communication method C, one-to-many communication is performed by changing mode to a broadcast communication mode and to a P2P communication mode. In the broadcast communication mode, broadcast communication is performed in which the communication main unit transmits data simultaneously to all communication sub units connected to the communication main unit. In the P2P communication mode, P2P communication is performed in which the communication main unit performs data communication with one of the communication sub units connected to the communication main unit.

In the broadcast communication mode, the communication main unit uses a control signal CS at a time when communication starts between the communication main unit and the communication sub unit(s). A communication signal DATA is used for transmission of data such as a control command and a data transmission request command from the communication main unit to the communication sub unit(s).

In the P2P communication mode, the control signal CS is used by the communication main unit to notify the communication sub unit of completion of data reception. The communication signal DATA is used for transmission of data such as a control command and a data transmission request command from the communication main unit to the communication sub unit, and is also used for transmission of data transmitted from the communication sub unit to the communication main unit.

In the communication method C, communication is performed at a communication bit rate determined in advance as in the communication method B. The communication main unit and the communication sub unit communicate by a half-duplex communication method (half-duplex method) in which bidirectional communication is performed via one data signal line in which transmission and reception are alternately switched.

FIG. 6A illustrates a communication waveform of the communication signal DATA of one frame, which is the smallest unit of communication in the communication method C, and a communication data format is described with reference to FIG. 6A. The communication data format is the same in the broadcast communication and in the P2P communication. Here, a description is given of a communication data format in a case where so-called asynchronous communication is performed, in which the communication speed to be used for communication is determined in advance and transmission and reception are performed at a communication bit rate according to the determination.

First, a signal level is maintained at high in a non-transmission state in which data is not transmitted. Next, in order that a data receiving side is notified of a start of data transmission, the signal level is set to low for a one-bit period. This one-bit period is referred to as a start bit ST. Subsequently, one-byte data is transmitted in an eight-bit period from a next second bit to a ninth bit. A data bit sequence, as an MSB first format, starts with highest data D7, followed by data D6, data D5, . . . , and data D1, and ends with lowest data DO. One-bit parity PA information is added to a tenth bit, and by setting, at the end, the signal level to high during a period of the stop bit SP indicating the end of the transmission data, the one-frame period started from the start bit ST ends.

The above description is an example of an embodiment of the communication data format in the communication method C, and another communication data format may be used. For example, a bit sequence of data may be LSB first and/or may have a 9-bit length, and the parity PA information may not be added. The communication data format may be different between the broadcast communication mode and the P2P communication mode.

Next, with reference to FIG. 6B, a description is given of communication formats in the broadcast communication and the P2P communication.

In the broadcast communication, the communication main unit outputs low to a control signal CS so as to notify the communication sub unit that the broadcast communication is to be started, and then outputs, to the communication signal DATA, data to be transmitted. On the other hand, the communication sub unit outputs low to the control signal CS at a time when a start bit ST input from the communication signal DATA is detected. At this time point, since the communication main unit has already output low to the control signal CS, a signal level of the control signal CS does not change.

Thereafter, the communication main unit completes output of a stop bit SP, and then cancels the low output to the control signal CS. After the communication sub unit receives the stop bit SP of the data input from the communication signal DATA, the communication sub unit analyzes the received data and performs processing associated with the received data. After the preparation for receiving the next data is completed, the communication sub unit cancels the low output to the control signal CS, so that the signal level of the control communication CS becomes high.

After that, by detecting that the signal level of the control communication CS has become high, the communication main unit detects that the reception process in the communication sub unit has been completed and determines that the preparation for the next communication has been completed.

As described above, the signal transmitted by the control signal CS in the broadcast communication functions as a signal indicating (representing) the start of the broadcast communication mode and the state that the broadcast communication mode is in progress.

The P2P communication mode is a communication mode in which the communication main unit designates one of the plurality of communication sub units and performs data communication only with the designated communication sub unit, that is, performs one-to-one communication (exclusive communication). The communication main unit includes a unit for designating a communication peer for the P2P communication. In this embodiment, in the broadcast communication mode, the communication main unit transmits identification information on a communication sub unit that the communication main unit is to designate for the P2P communication, so that the communication main unit can designate the communication sub unit as a communication peer for the P2P communication.

In the P2P communication, the communication main unit first outputs, to the communication signal DATA, data to be transmitted to the communication sub unit, which is the communication peer. Next, the communication main unit outputs low to the control signal CS after completing output of a stop bit SP. Subsequently, the communication main unit cancels the low output to the control signal CS after the preparation for receiving data from the communication sub unit is completed.

Subsequently, after the communication sub unit designated as the peer for the P2P communication detects that the signal level of the control signal CS is low, the communication sub unit analyzes the received data input from the communication signal DATA and performs processing associated with the received data. Next, after the communication sub unit designated as the peer for the P2P communication detects that the signal level of the control signal CS has returned to high, the communication sub unit outputs, to the communication signal DATA, data to be transmitted. Next, the communication sub unit designated as the peer for the P2P communication completes output of a stop bit SP of a last byte of the data to be transmitted, and then outputs low to the control signal CS. After a preparation for receiving data from the communication main unit is completed, the communication sub unit designated as the peer for P2P communication cancels the low output to the control signal CS.

The communication sub unit that has not been designated as a peer for the P2P communication does not output signals to the control signal CS and communication signal DATA.

As described above, the signal communicated by the control CS in the P2P communication functions as a state notification signal indicating (representing) the end of the data transmission and a standby (wait) request for the next data transmission.

External Appearance of Accessory

Figure 7:
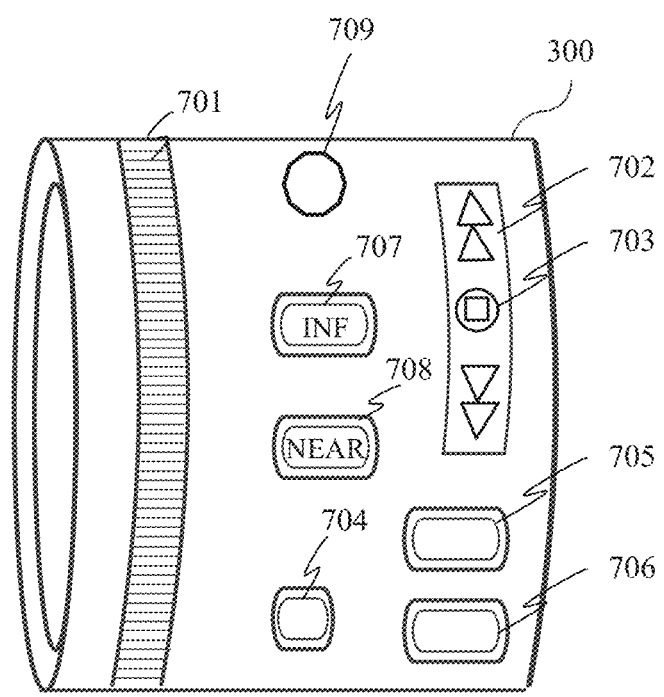
FIG. 7 is a diagram illustrating an appearance example of the accessory according to the first embodiment.

With reference to FIG. 7, a description is given of an external appearance of the accessory according to this embodiment.

An electronic ring 701 corresponds to the accessory operation ring 310. A focusing speed setting member (setting unit) 702, a focus stop button 703, a reset button (third operation unit) 704, a focus position memory button (first operation unit) 705, and a focusing reproduction driving button (second operation unit) 706 correspond to the accessory operation unit 320. An infinite side focus limit setting button 707 and a close side focus limit setting button 708 also correspond to the accessory operation unit 320. An LED 709 is an example of the accessory notification unit 330.

The focusing speed setting member 702 is used for setting a sensitivity that indicates (represents or expresses) a focusing driving speed in autofocus control or a relationship in manual focus control between a focusing driving amount and an operation amount on the accessory operation ring 310. The focus stop button 703 is used to realize a focus pause function, which is realized in this embodiment. The reset button 704 is used to realize storing of a focus position and reproduction driving of the focus lens 104, each of which is realized in this embodiment. The focus position memory button 705 is used to realize storing of the focus position and the reproduction driving of the focus lens 104, each of which is realized in this embodiment. The focusing reproduction driving button 706 is a reproduction driving button for realizing the storing of the focus position and the reproduction driving of the focus lens 104, each of which is realized in this embodiment. The infinite side focus limit setting button 707 is used for limiting a focusing driving range on the infinite side or for driving the focus lens 104 to the infinite side in manual focus control, each of which is realized in this embodiment. The close side focus limit setting button 708 is used for limiting the focusing driving range on a close side or for driving the focus lens 104 to the close side in manual focus control, each of which is realized in this embodiment.

Start Sequence of Camera System

Figure 8:
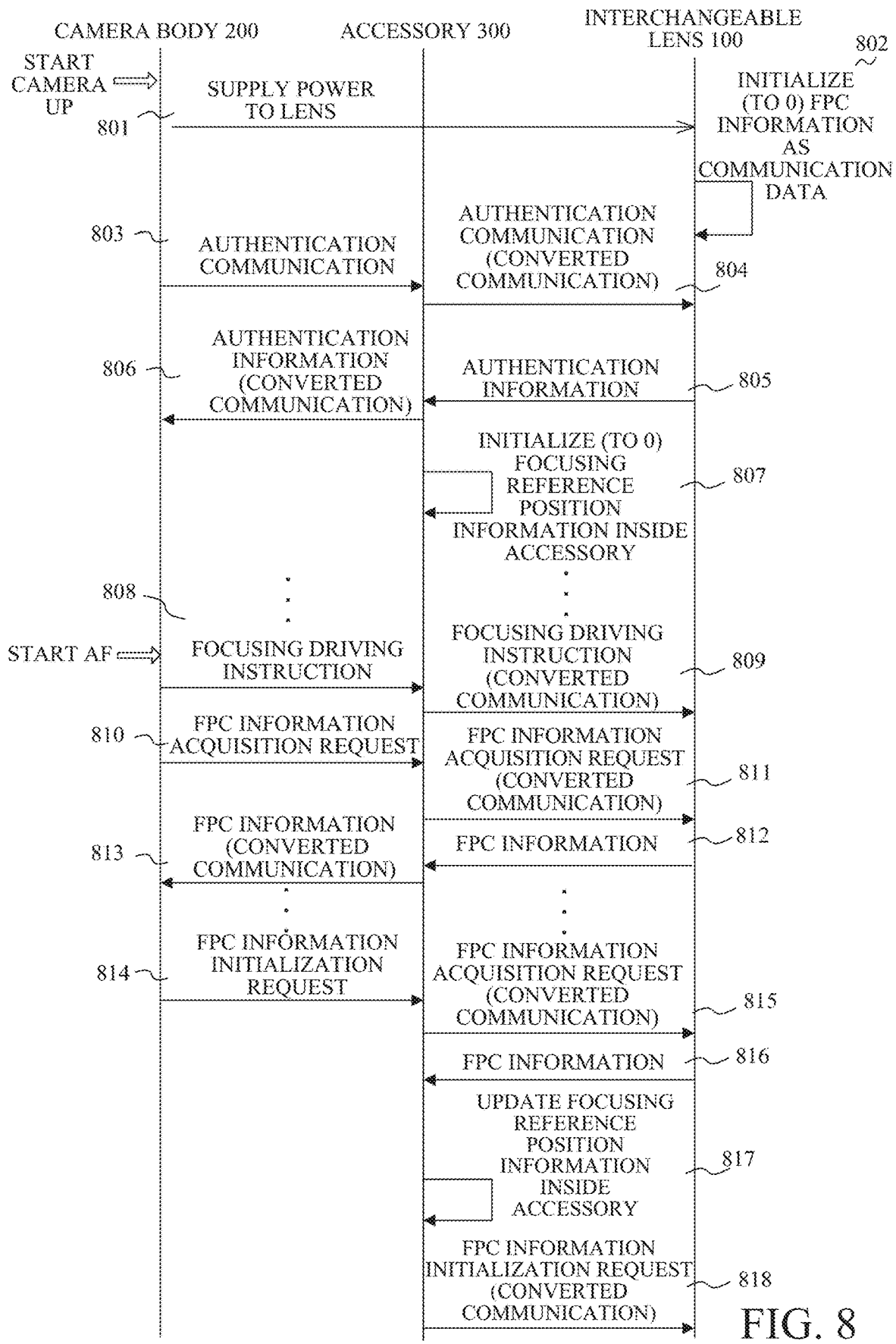
FIG. 8 is a diagram illustrating a start sequence in the camera system according to the first embodiment.

With reference to FIG. 8, a description is given of a start sequence at the time when power is turned on in a state where the interchangeable lens 100, the camera body 200, and the accessory 300 are combined.

In process 801, when the camera body 200 is turned on, the camera body 200 starts supplying power to the interchangeable lens 100 via the accessory 300 through the mounts 400 and 401.

In process 802, the interchangeable lens 100 initializes a parameter of focus position information (hereinafter referred to as FPC information) to be transmitted in a response to the camera body 200 so as to set a current physical focus position as a start position. The FPC information is a parameter communicated as communication data between the interchangeable lens 100 and the camera body 200. A starting point position can be updated at any time between the interchangeable lens 100 and the camera body 200 as described in processes 814 to 818 described below, and therefore the FPC information is not necessarily a parameter indicating (representing) an absolute position of the focus lens 104. On the other hand, for a purpose of realization of the function of storing the focus position at an arbitrary position and the reproduction driving of the focus lens 104, the accessory 300 stores focusing reference position information described below so as to manage the absolute position of the focus lens 104.

In process 803, the camera body 200 requests authentication communication for identifying (acquiring) a function of the interchangeable lens 100. This communication is transmitted to the accessory 300 via the mount 401, and the accessory 300 performs conversion processing on a communication protocol so that the converted communication protocol is supported by the interchangeable lens 100 (communication protocol conversion processing).

In process 804, the interchangeable lens 100 is requested to perform authentication communication via the mount 400 with the communication protocol converted by the accessory 300.

In process 805, the interchangeable lens 100 transmits a response to the authentication request for the information on the function of the interchangeable lens 100 to the accessory 300 via the mount 400. The accessory 300 performs conversion processing so that the converted communication protocol is supported by the camera body 200 (communication protocol conversion processing). At this time point, the accessory 300 can acquire (identify) the function of the currently attached interchangeable lens 100.

In process 806, as the response to the authentication communication, the accessory 300 transmits the authentication information to the camera body 200 via the mount 401 in a converted communication protocol.

In process 807, the accessory 300 initializes the focusing reference position information managed by the accessory 300 itself. That is, the FPC information communicated between the interchangeable lens 100 and the camera body 200 and the focusing reference position information managed by the accessory 300 are both initialized to a same value at this time point. In addition to the focusing reference position information, the accessory 300 manages a focus relative change amount that is a relative change amount of the focus lens 104 from the reference position, and the accessory 300 also initializes the focus relative change amount in this process.

Thereafter, if AF is started by an operation on the operation unit 207 of the camera body 200, the camera body 200 transmits a focusing driving instruction to the interchangeable lens 100 through the communication protocol conversion processing by the accessory 300 in the processes 808 and 809. In response to the reception of this communication request, the interchangeable lens 100 drives the focus lens 104 and changes the FPC information managed by the interchangeable lens 100 by a value corresponding to the driving amount of the focus lens 104.

In processes 810 and 811, an FPC information acquisition request is transmitted to the interchangeable lens 100 through the communication protocol conversion processing by the accessory 300.

In response to the reception of this communication request, the interchangeable lens 100 responds with the FPC information managed by the interchangeable lens 100. This response is transmitted to the camera body 200 through the communication protocol conversion processing by the accessory 300 in processes 812 and 813.

In process 814, the camera body 200 performs communication on a request for initialization of the FPC information. As described above, the FPC information does not necessarily indicate the absolute position of the focus lens 104, and can be reset so that the current position is set as a start point for the convenience of the camera body 200.

In a case where the accessory 300 detects that the request for initialization of FPC information has been communicated from the camera body 200, the interchangeable lens 100 performs the following processes 815 to 817 before executing the communication from the camera body 200.

In process 815, the accessory 300 requests the interchangeable lens 100 to acquire latest FPC information (FPC information acquisition request).

In process 816, in response to the reception of the FPC information acquisition request, the interchangeable lens 100 responds to the accessory 300 with the latest FPC information managed inside the interchangeable lens 100.

In process 817, the accessory 300 corrects the stored focusing reference position information so as to eliminate a difference from the latest FPC information acquired in process 816 and stores the corrected focusing reference position information.

In process 818, the interchangeable lens 100 is requested to initialize the FPC information through the communication protocol conversion processing by the accessory 300, and the interchangeable lens 100 initializes the FPC information managed by itself in response to the reception of this request. At this time point, the FPC information communicated between the interchangeable lens 100 and the camera body 200 and the focusing reference position information managed by the accessory 300 have different values. The FPC information is a parameter whose reference (0) is the current focus position, whereas the focusing reference position information managed by the accessory 300 is information indicating the position of the focus lens 104 determined at the time of process 807.

A description is given below of a process of updating the focusing reference position information managed inside the accessory 300 using the latest FPC information in processes 814 to 818.

AF Stop Function

The camera system according to this embodiment is characterized in that the interchangeable lens 100 and the camera body 200 are connected via the accessory having an AF stop function.

Hereinafter, with reference to FIG. 9, a description is given of processing in the camera system having the AF stop function according to this embodiment.

A description is given of the AF stop function. Generally, in a camera system, AF is started by an operation on an AF start button provided on the camera body or an interchangeable lens, by half-pushing on a shutter button, or the like. AF may be automatically started in response to (may automatically follow), for example, detection by the camera body of a change in an imaging condition. The AF stop function is a function for temporarily stopping AF. For example, in this embodiment, the following of AF is stopped while a user operates the focus stop button 703, which makes it possible to fix the focus at a time intended by the user. The method of causing the AF stop function is not limited to this, and for example, the AF stop function may be started or ended every time the operation member is operated.

If AF is started, a focusing driving instruction is transmitted to the interchangeable lens 100 through the communication protocol conversion processing by the accessory 300 in processes 901 and 902. In response to the reception of this communication request, the interchangeable lens 100 drives the focus lens 104 and updates the focusing information managed by the interchangeable lens 100. The focusing information is information including a focusing driving state indicating (including or representing) whether the focus lens 104 is being driven, AF/MF information indicating (including or representing) whether the interchangeable lens 100 is in an AF state or an MF state, and the like, in addition to the FPC information.

In processes 903 and 904, a focusing information acquisition request is transmitted to the interchangeable lens 100 through the communication protocol conversion processing by the accessory 300. In response to the reception of this communication request, the interchangeable lens 100 responds with the focusing information managed by the interchangeable lens 100. This response is communicated to the camera body 200 through the communication protocol conversion processing by the accessory 300 in processes 905 and 907. In process 906, the accessory 300 updates the focusing information stored in the accessory 300 itself based on the latest focusing information acquired in process 905.

If a process of the AF stop function is started by the focus stop button 703, the accessory 300 updates an accessory state setting stored in itself in process 908. The accessory state setting is information including AF stop function state information indicating (including or representing) whether or not the process of the AF stop function is in progress (whether the AF stop function is operating), and in process 908, the AF stop function state information is updated with a value indicating "in operation". Thereafter, in process 909, the accessory 300 transmits a focusing stop instruction to the interchangeable lens 100. Thereby, in a case where the focus lens 104 is being driven, the focus lens 104 is stopped immediately, which makes it possible to fix the focus at a position intended by the user. The method of fixing the focus is not limited to this. For example, in a case where it can be determined from the focusing information that the focus lens 104 is stopped, process 909 may not be executed. Alternatively, for example, an MF prohibition instruction is transmitted to the interchangeable lens 100, and a focus change is prevented from being caused by the user unintentionally operating the manual operation ring 130 or the like.

In a state where the AF stop function of the accessory 300 is in progress, even when AF is started and the accessory 300 receives the focusing driving instruction in process 910, the accessory 300 does not execute the communication protocol conversion processing. However, the process in the case where the accessory 300 receives the focusing driving instruction in a state where the AF stop function is in progress is not limited to this. For example, the accessory 300 may convert the focusing information stored in itself into information indicating a state different from the latest focusing information received from the interchangeable lens 100. Alternatively, for example, the accessory 300 may transmit a response corresponding to the focusing driving instruction to the camera body 200 without transmitting the focusing driving instruction to the interchangeable lens 100.

Even in a state where the AF stop function of the accessory 300 is operating, the focusing information acquisition request is transmitted to the interchangeable lens 100 through the communication protocol conversion processing by the accessory 300 in processes 911 and 912. In response to the reception of this communication request, the interchangeable lens 100 responds with the focusing information managed by the interchangeable lens 100. This response is communicated to the camera body 200 through the communication protocol conversion processing by the accessory 300 in processes 913 and 915. In process 914, the accessory 300 updates the focusing information stored in the accessory 300 itself based on the latest focusing information acquired in process 913. At this time, the focusing information stored in the accessory 300 itself may be converted into information indicating a state different from the latest focusing information acquired in process 913. For example, even in a case where the focusing information from the interchangeable lens 100 indicates that the state is the AF state, the accessory 300 may update the focusing information stored in the accessory 300 itself with information indicating the MF state, and may transmit that the state is the MF state to the camera body 200.

If the process of the AF stop function is completed by the focus stop button 703, the accessory 300 updates the AF stop function state information of the accessory state setting stored in the accessory 300 itself with a value indicating "not in operation" in process 916.

Figure 10:
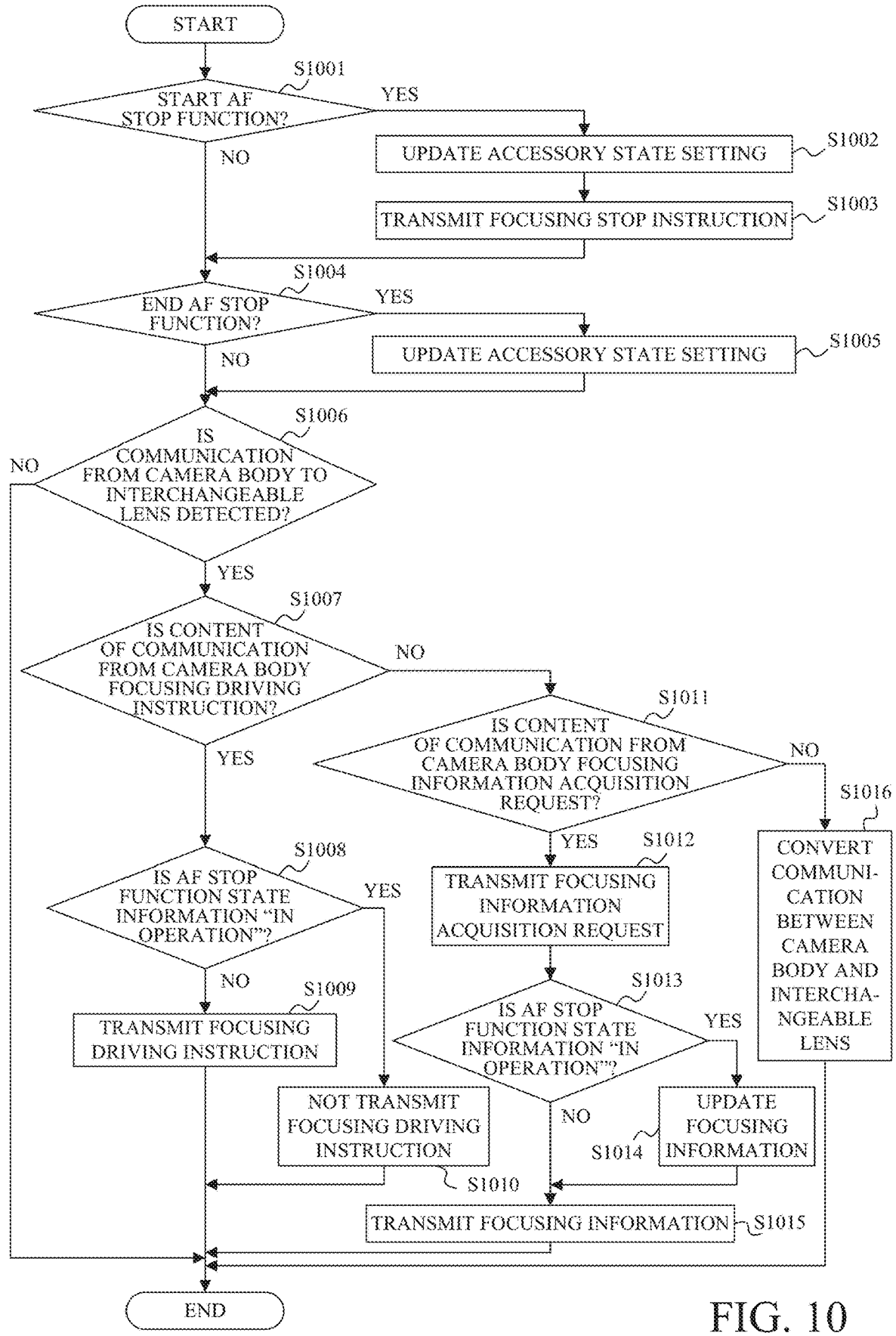
FIG. 10 is a diagram illustrating a processing flow of the AF stop function in the accessory according to the first embodiment.

With reference to FIG. 10, a description is given of processing in the accessory 300 having the AF stop function according to this embodiment.

The processing to be described hereinafter is control processing relating to the AF stop function by the accessory microcomputer 302 in the accessory 300 in a state of normal operation after completing the start sequence described with reference to FIG. 8.

In step S1001, the accessory microcomputer 302 determines whether or not to start the AF stop function. For example, in a case where AF stop function state information indicates "not in operation", the accessory microcomputer 302 determines to start the AF stop function in response to detection of an operation on the focus stop button 703. The method of determining the start of the AF stop function is not limited to this. If the accessory microcomputer 302 determines to start the AF stop function, the process proceeds to step S1002, and if the accessory microcomputer 302 determines not to start the AF stop function, the process proceeds to step S1004.

In step S1002 and step S1003, the accessory microcomputer 302 starts the AF stop function. The processes in steps S1002 and S1003 are similar to the above-described process 908 and process 909, respectively, and a description thereof is omitted.

In step S1004, the accessory microcomputer 302 determines whether or not to end the AF stop function. For example, in a case where the AF stop function state information indicates "in operation", the accessory microcomputer 302 determines to end the AF stop function in response to detection that the focus stop button 703 is not operated. The method of determining the end of the AF stop function is not limited to this. If the accessory microcomputer 302 determines to end the AF stop function, the process proceeds to step S1005, and if the accessory microcomputer 302 determines to end the AF stop function, the process proceeds to step S1006.

In step S1005, the accessory microcomputer 302 ends the AF stop function. The process in step S1005 is similar to process 916 described above, and therefore a description thereof is omitted.

In step S1006, the accessory microcomputer 302 determines whether or not the communication from the camera body 200 to the interchangeable lens 100 is detected. If the accessory microcomputer 302 determines that the communication is detected, the process proceeds to step S1007, and if the accessory microcomputer 302 determines that the communication is not detected, this flow is restarted from the start so that this flow is repeatedly executed, that is, the process proceeds to step S1001.

In step S1007, the accessory microcomputer 302 determines whether or not a content of the communication from the camera body 200 is a focusing driving instruction. If the accessory microcomputer 302 determines that the content of the communication is the focusing driving instruction, the process proceeds to step S1008, and if the accessory microcomputer 302 determines that the content of the communication is not the focusing driving instruction, the process proceeds to step S1011.

In step S1008, the accessory microcomputer 302 determines whether or not the AF stop function state information is "in operation". If the accessory microcomputer 302 determines that the AF stop function state information is "in operation", the process proceeds to step S1010, and if the accessory microcomputer 302 determined that the AF stop function state information is not "in operation", the process proceeds to step S1009.

In step S1009, the accessory microcomputer 302 transmits, to the interchangeable lens 100, the focusing driving instruction whose communication protocol is converted into the communication protocol supported by the interchangeable lens 100.

In step S1010, the accessory microcomputer 302 does not transmit a focusing driving instruction to the interchangeable lens 100. This process is similar to the above-described process 910, and a detailed description thereof is omitted.

After the process in step S1009 or step S1010 is completed, this flow is restarted from the start so that this flow is repeatedly executed, that is, the process proceeds to step S1001.

In step S1011, the accessory microcomputer 302 determines whether or not a content of the communication from the camera body 200 is a focusing information acquisition request. If the accessory microcomputer 302 determines that the content of the communication is the focusing information acquisition request, the process proceeds to step S1012, and if the accessory microcomputer 302 determines that the content of the communication is not the focusing information acquisition request, the process proceeds to step S1016.

In step S1012, the accessory microcomputer 302 transmits, to the interchangeable lens 100, a focusing information acquisition request whose communication protocol is converted into the communication protocol supported by the interchangeable lens 100, and receives the focusing information from the interchangeable lens 100. A detailed process is similar to the above-described processes 904 and 905 or the above-described processes 912 and 913, and thus a detailed description thereof is omitted.

In step S1013, the accessory microcomputer 302 determines whether or not the AF stop function state information is "in operation". If the accessory microcomputer 302 determines that the AF stop function state information is "in operation", the process proceeds to step S1014, and if the accessory microcomputer 302 determines that the AF stop function state information is not "in operation", the process proceeds to step S1015.

In step S1014, the accessory microcomputer 302 updates the focusing information stored in the accessory 300 itself based on the acquired focusing information. A detailed process is similar to the process in S914 described above, and thus a detailed description thereof is omitted.

In step S1015, the accessory microcomputer 302 transmits the focusing information stored in the accessory 300 itself in the protocol supported by the camera body 200. This process is similar to the above-described process in S915, and therefore a detailed description is omitted. After the process in step S1015 is completed, this flow is restarted from the start so that this flow is repeatedly executed, that is, the process proceeds to step S1001.

In step S1016, the accessory microcomputer 302 analyzes the content of the communication received from the camera body 200, converts it into the communication protocol supported by the interchangeable lens 100, and transmits the communication to the interchangeable lens 100. At this time, in a case where the interchangeable lens 100 is to respond to the communication, the accessory microcomputer 302 waits until receiving the response. In a case where the camera body 200 needs a response, the response is transmitted in the communication protocol supported by the camera body 200. After the process in step S1016 is completed, the process is restarted from the start of this flow so that this flow is repeatedly executed, that is, the process proceeds to step S1001.

As described above, the configuration according to this embodiment can make the accessory 300 have the AF stop function. This makes it possible to provide a camera system having an AF stop function even in a case where the interchangeable lens 100 and the camera body 200 do not have the AF stop function.

Second Embodiment

A configuration of a camera system according to this embodiment is similar to the configuration of the camera system according to the first embodiment. The camera system according to this embodiment is characterized in that the interchangeable lens 100 and the camera body 200 are connected via an accessory 300 having an AF driving range changing function.

AF Driving Range Changing Function

Here, a description is given of the AF driving range changing function. The AF driving range changing function is a function that limits a driving range of the focus lens in AF to an arbitrary range so as to shorten an AF searching time or improve object tracking performance. For example, in this embodiment, in a case where the infinite side focus limit setting button 707 is operated, a limit is set such that the focus lens 104 is not driven to an infinite side from a position of the focus lens 104 at that time, and if the infinite side focus limit setting button 707 is operated again, the limit is released. Similarly, in a case where the close side focus limit setting button 708 is operated, a limit is set such that the focus lens 104 is not driven to a close side from the position of the focus lens 104 at that time, and if the close side focus limit setting button 708 is operated again, the limit is released. The method of causing the process of the AF driving range changing function is not limited to this. For example, the driving range may not be set such that an end of the driving range is the focus position at the time when the arbitrary setting button is operated but may be set to an arbitrary preset range based on the focus position at the time of the operation. Alternatively, the driving range may be set to an arbitrary preset position irrespective of (not based on) the focus position at the time of operation.

Figure 11:
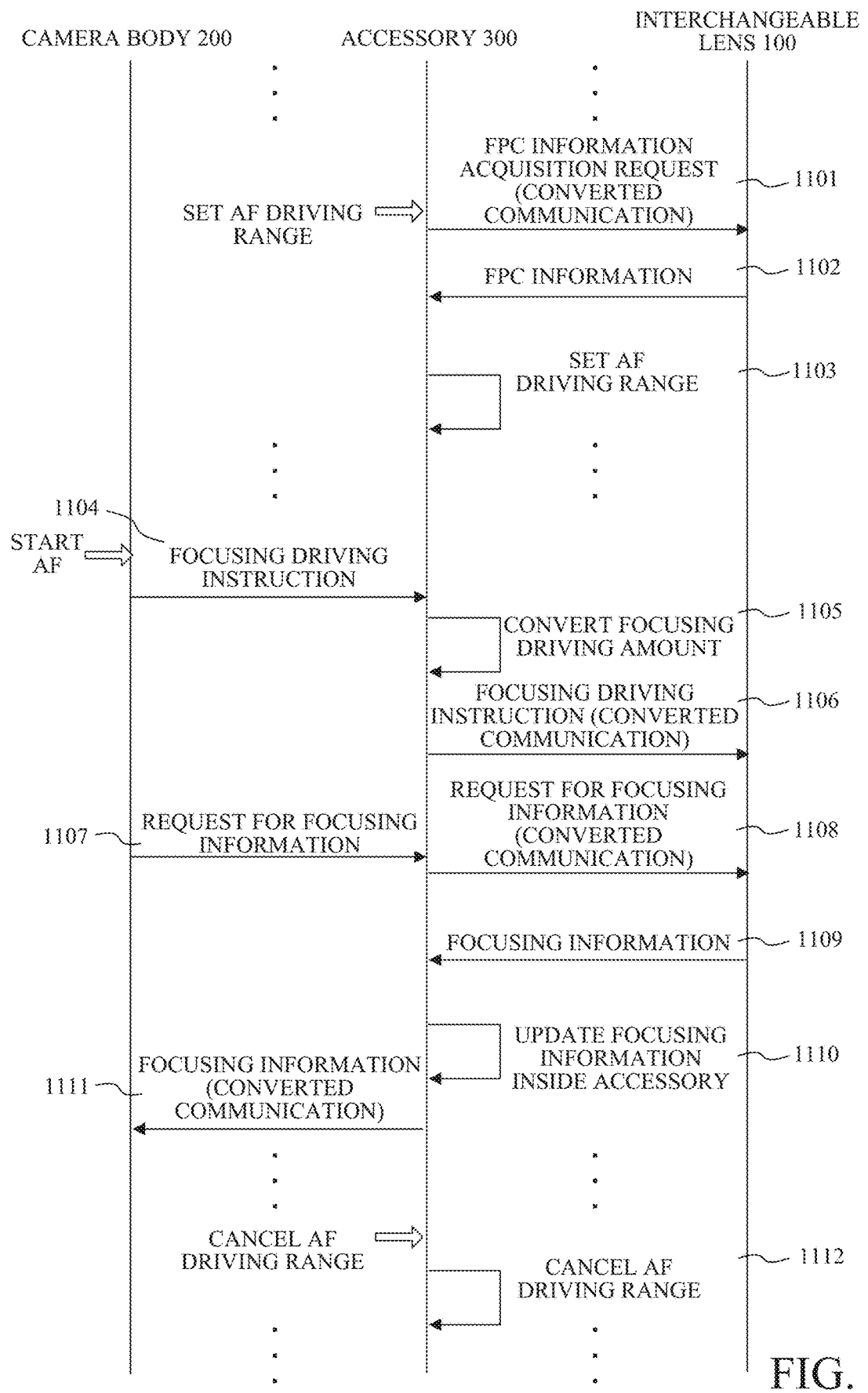
FIG. 11 is a diagram illustrating a sequence of an AF driving range changing function in a camera system according to a second embodiment.

With reference to FIG. 11, a description is given of processing in the camera system having the AF driving range changing function according to this embodiment.

If the AF driving range is set by an operation on the infinite side focus limit setting button 707 or on the close side focus limit setting button 708, or the like, the accessory 300 acquires the latest FPC information from the interchangeable lens 100 in process 1101 and process 1102. At this time, the accessory 300 can manage the absolute position of the focus lens 104 based on focusing reference position information acquired by using the FPC information.

In process 1103, the accessory 300 updates an AF driving range state of the accessory state setting stored in the accessory 300 itself with a value indicating "set", and sets the AF driving range based on the FPC information. The AF driving range includes (indicates, represents, or consists of) a range within an infinite side limit position and a close side limit position, and in a state where the AF driving range state is "set", the accessory 300 provides control such that the focus lens 104 is within the AF driving range. For example, in case where the AF driving range setting is caused by an operation on the infinite side focus limit setting button 707, the infinite side limit position is set based on the FPC information. For example, in a case where the AF driving range setting is caused by an operation on the close side focus limit setting button 708, the close side limit position is set based on the FPC information. The setting method for the AF driving range is not limited to this, and, for example, the AF driving range may be set to an arbitrary preset range based on the FPC information at a time when an arbitrary setting button is operated. Alternatively, the AF driving range may be set to an arbitrary preset position irrespective of (not based on) the FPC information at the time when the arbitrary setting button is operated. For example, in a case where the operation member is operated in order that the infinite side limit position is set on the close side of the close side limit position, this operation may be ignored. The same applies in a case where the close side limit position is to be set. At this time, the LED included in the accessory notification unit 330 may be turned on to notify the user that the AF driving range setting has been ignored. The method of notifying the user that the AF driving range has been canceled via the accessory notification unit 330 is not limited to this, and for example, an LCD included in the accessory notification unit 330 may display a notification indicating that the AF driving range has been canceled.

If AF is started, the focusing driving instruction for the interchangeable lens 100 is transmitted to the accessory 300 in process 1104. After that, in process 1105, the accessory 300 whose AF driving range state is "set" performs conversion such that the focusing driving amount to be transmitted to the interchangeable lens 100 is within the AF driving range. A detailed description of focusing driving amount conversion processing is given below with reference to FIG. 13. Thereafter, in process 1106, the accessory 300 uses the converted focusing driving amount to transmit the focusing driving instruction to the interchangeable lens 100. In response to the reception of this communication request, the interchangeable lens 100 drives the focus lens 104 and updates focusing information managed by the interchangeable lens 100. The focusing information includes, in addition to the FPC information, infinite end information indicating (including or representing) whether or not the position of focus lens 104 is at an infinite side end of a drivable range, close end information indicating (including or representing) whether or not the position of the focus lens 104 is at a close side end of the drivable range, and the like.

In processes 1107 and 1108, a focusing information acquisition request from the camera body 200 is transmitted to the interchangeable lens 100 through the communication protocol conversion processing by the accessory 300. In response to the reception of this communication request, the interchangeable lens 100 responds with the focusing information managed by the interchangeable lens 100. This response is communicated to the camera body 200 through the communication protocol conversion processing by the accessory 300 in processes 1109 and 1111. In process 1110, the accessory 300 updates the focusing information stored in the accessory 300 itself based on the latest focusing information acquired in process 1109. At this time, the accessory 300 may convert the focusing information stored in the accessory 300 itself into information indicating (representing or including) a state different from the latest focusing information acquired in process 1109. For example, even in a case where the infinite end information from the interchangeable lens 100 indicates a state that the focus lens 104 is not at the infinite end, the FPC information may be equal (equivalent) to the infinite side limit position. In this case, the accessory 300 may update the infinite end information stored in the accessory 300 itself with a state that the focus lens 104 is at the infinite end, and may transmit, to the camera body 200, the state that the focus lens 104 is at the infinite end. The same applies to the close side.

In a state where the AF driving range state is "set", the infinite side focus limit setting button 707 or the close side focus limit setting button 708 is operated or the like. As a result, if the AF driving range is canceled, the accessory 300 updates the AF driving range state with a value indicating "not set" in process 1112, and clears the AF driving range. The accessory 300 may update the focusing information stored in the accessory 300 itself with information that matches (corresponds to) the latest focusing information. The method of canceling the AF driving range is not limited to the operation on the operation member. For example, the AF driving range may be canceled in response to removal of the interchangeable lens 100, and the AF driving range may be canceled when the imaging optical system is changed by driving of the zoom lens 102. The LED included in the accessory notification unit 330 may be turned on to notify the user that the AF driving range has been canceled. The method of notifying the user that the AF driving range has been canceled via the accessory notification unit 330 is not limited to this, and for example, an LCD included in the accessory notification unit 330 may display a notification indicating that the AF driving range has been canceled.

Figure 12:
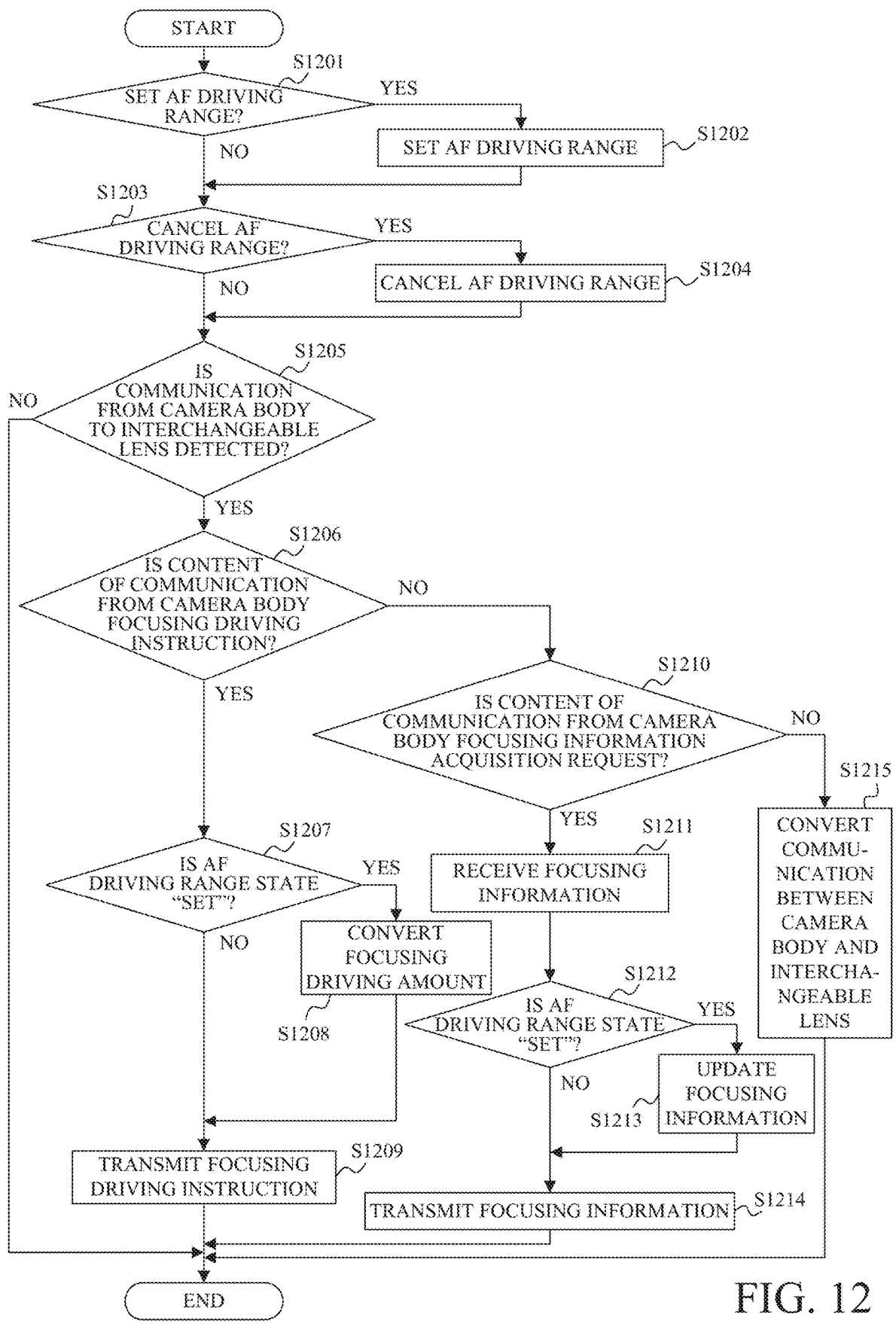
FIG. 12 is a diagram illustrating a processing flow of the AF driving range changing function in an accessory according to the second embodiment.

With reference to FIG. 12, a description is given of processing in the accessory 300 having the AF driving range changing function according to this embodiment.

The processing to be described hereinafter is control processing relating to the AF driving range changing function performed by the accessory microcomputer 302 in the accessory 300 in a state of normal operation after completing the start sequence described with reference to FIG. 8.

In step S1201, the accessory microcomputer 302 determines whether or not to set the AF driving range. If the accessory microcomputer 302 determines to set the AF driving range, the process proceeds to step S1202, and if the accessory microcomputer 302 determines not to set the AF driving range, the process proceeds to step S1203.

In step S1202, the accessory microcomputer 302 sets the AF driving range.

The determination method of determining the start of the AF driving range setting in step S1201 and the method of setting the AF driving range in step S1202 are similar to those in the above-described processes 1101 to 1103, and thus a description thereof is omitted.

In step S1203, the accessory microcomputer 302 determines whether or not to cancel the AF driving range. If the accessory microcomputer 302 determines to cancel the AF driving range, the process proceeds to step S1204, and if the accessory microcomputer 302 determines not to cancel the AF driving range, the process proceeds to step S1205.

In step S1204, the accessory microcomputer 302 cancels the AF driving range.

The determination method for determining the cancellation of the AF driving range setting in step S1203 and the method for canceling the AF driving range in step S1204 are similar to those in the above-described process 1112, and thus a description thereof is omitted.

In step S1205, the accessory microcomputer 302 determines whether or not communication from the camera body 200 to the interchangeable lens 100 is detected. If the accessory microcomputer 302 determines that the communication is detected, the process proceeds to step S1206, and if the accessory microcomputer 302 determines that the communication is not detected, this flow is restarted from the start so that this flow is repeatedly executed, that is, the process proceeds to step S1201.

In step S1206, the accessory microcomputer 302 determines whether or not a content of the communication from the camera body 200 is a focusing driving instruction. If the accessory microcomputer 302 determines that the content is a focusing driving instruction, the process proceeds to step S1207, and if the accessory microcomputer 302 determines that the content is not a focusing driving instruction, the process proceeds to step S1210.

In step S1207, the accessory microcomputer 302 determines whether or not the AF driving range state is "set". If the accessory microcomputer 302 determines that the AF driving range state is "set", the process proceeds to step S1208, and if the accessory microcomputer 302 determines that the AF driving range state does not indicate "set", the process proceeds to step S1209.

In step S1208, the accessory microcomputer 302 converts the focusing driving amount to be transmitted to the interchangeable lens 100 so that the focusing driving amount is within the AF driving range.

In step S1209, the accessory microcomputer 302 transmits the focusing driving instruction to the interchangeable lens 100 in the communication protocol supported by the interchangeable lens 100. After the process in step S1209 is completed, this flow is restarted from the start so that this flow is repeatedly executed, that is, the process proceeds to step S1201.

In step S1210, the accessory microcomputer 302 determines whether or not a content of the communication from the camera body 200 is a focusing information acquisition request. If the accessory microcomputer 302 determines that the content is a focusing information acquisition request, the process proceeds to step S1211, and if the accessory microcomputer 302 determines that the content is not a focusing information acquisition request, the process proceeds to step S1215.

In step S1211, the accessory microcomputer 302, to the interchangeable lens 100, the focusing information acquisition request whose communication protocol is converted by the accessory microcomputer 302 into the communication protocol supported by the interchangeable lens 100, and receives the focusing information from the interchangeable lens 100. This process is similar to the above-described processes 1107 and 1108, and therefore a detailed description thereof is omitted.

In step S1212, the accessory microcomputer 302 determines whether or not the AF driving range state is "set". If the accessory microcomputer 302 determines that the AF driving range state is "set", the process proceeds to step S1213, and if the accessory microcomputer 302 determines that the AF driving range state does not indicate "set", the process proceeds to S1214.

In step S1213, the accessory microcomputer 302 updates the focusing information stored in the accessory 300 itself based on the acquired focusing information. This process is similar to the above-described process 1110, and therefore a detailed description thereof is omitted.

In step S1214, the accessory microcomputer 302 transmits the focusing information stored in the accessory 300 itself in the communication protocol supported by the camera body 200. This process is similar to the above-described process 1111, and therefore a detailed description thereof is omitted. After the process in step S1214 is completed, this flow is restarted from the start so that this flow is repeatedly executed, that is, the process proceeds to step S1201.

In step S1215, the accessory microcomputer 302 analyzes a content of the communication received from the camera body 200, converts it into the communication protocol supported by the interchangeable lens 100, and transmits the communication to the interchangeable lens 100. At this time, in a case where the interchangeable lens 100 is to respond to the communication, the accessory microcomputer 302 waits until receiving the response. In a case where the camera body 200 needs a response, the response is transmitted in the communication protocol supported by the camera body 200. After the process in step S1215 is completed, this flow is restarted from the start so that this flow is repeatedly executed, that is, the process proceeds to step S1201.

Figure 13:
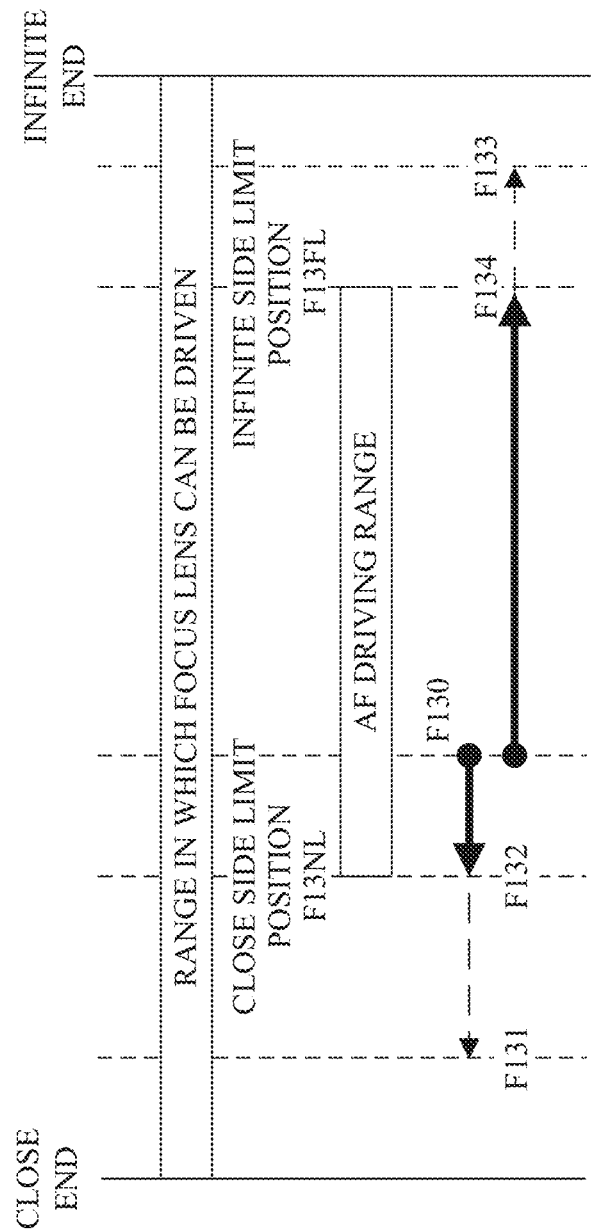
FIG. 13 is a diagram illustrating a process in the AF driving range changing function in the camera system according to the second embodiment.

With reference to FIG. 13, a description is given of a movement of the focus lens 104 in a state where the AF driving range state is "set" in the camera system including the accessory 300 having the AF driving range changing function according to this embodiment.

A range from the closest end to the infinite end in FIG. 13 indicates a range in which the focus lens 104 can be driven. At this time, the current position information of the focus lens 104 is transmitted to the camera body 200 and the accessory 300 as FPC information, and the absolute position of the focus lens 104 is managed as the above-described FPC information inside the accessory 300.

In a state where the AF driving range state is "set", the accessory 300 manages inside an AF driving range including a close side limit position F13NL and an infinite side limit position F13FL. The AF driving range is set based on the FPC information and is set within the range from the close end to the infinite end. The close side limit position F13NL is set to a position on the close side of the infinite side limit position F13FL.

A description is given of an example of a case where the FPC information is (indicates or represents) F130 and the camera body 200 transmits the focusing driving instruction including a focusing driving amount to F131. In this case, the accessory 300 converts the focusing driving amount into a focusing driving amount to F132 based on the FPC information so that the close side limit position F13NL is not exceeded, and then transmits the converted focusing driving instruction to the interchangeable lens 100. At this time, the focusing driving instruction transmitted by the camera body 200 may be searching driving toward the close end and does not instruct a focusing driving amount. Even in this case, the accessory 300 calculates a focusing driving amount to F132 based on the FPC information so that the close side limit position F13NL is not exceeded, and then transmits a focusing driving instruction including the focusing driving amount to the interchangeable lens 100.

A description is given of an example of a case where the FPC information is F130 and the camera body 200 transmits the focusing driving instruction including the focusing driving amount to F133. In this case, the accessory 300 converts the focusing driving amount into a focus driving amount to F134 based on the FPC information so that the infinite side limit position F13FL is not exceeded, and then transmits the converted focusing driving instruction to the interchangeable lens 100. At this time, the focusing driving instruction transmitted by the camera body 200 may be searching driving toward the infinite end and does not instruct the focusing driving amount. Even in this case, the accessory 300 calculates the focusing driving amount to F134 based on the FPC information so that the infinite side limit position F13FL is not exceeded, and then transmits a focusing driving instruction including the focusing driving amount to the interchangeable lens 100.

With the control described above, the accessory 300 can limit the focus lens 104 so that the focus lens 104 does not exceed the AF driving range managed by the accessory 300.

As described above, the configuration according to this embodiment can make the accessory 300 have the AF driving range changing function. This makes it possible to provide a camera system having an AF driving range changing function even in a case where the interchangeable lens 100 and the camera body 200 do not have the AF driving range changing function.

Third Embodiment

A configuration of a camera system according to this embodiment is similar to the first embodiment. The camera system according to this embodiment is characterized in that the interchangeable lens 100 and the camera body 200 are connected via an accessory 300 having an AF speed setting function.

AF Speed Setting Function

Here, a description is given of the AF speed setting function. The AF speed setting function is a function with which an AF speed can be increased or decreased by changing a driving speed in AF of the focus lens to an arbitrary speed setting. For example, in this embodiment, an operation on one button of the focusing speed setting member can increase the AF speed at an arbitrary magnification, and operating the other button can decrease the AF speed at an arbitrary magnification. The method of causing a process of the AF speed setting function is not limited to this, and for example, the magnification of the AF speed may have a plurality of steps (for example, five steps of ¼ times, ½ times, equal magnification, twice, and four times), and the magnification may be changed in order every time the setting button is operated.

Figure 14:
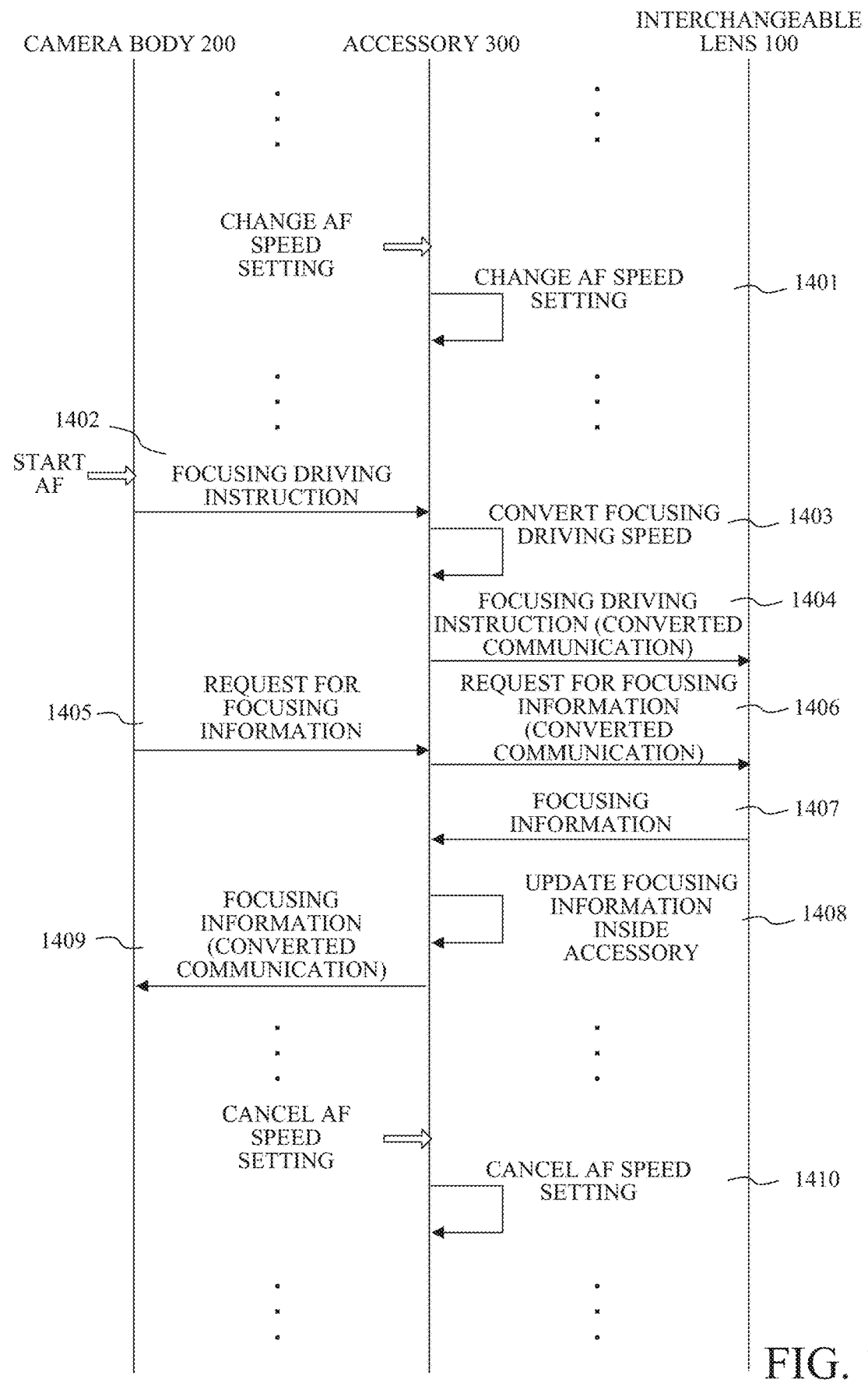
FIG. 14 is a diagram illustrating a sequence of an AF speed setting function in a camera system according to a third embodiment.

With reference to FIG. 14, a description is given of processing in the camera system having the AF speed setting function according to this embodiment.

If the AF speed setting is changed by an operation on the focusing speed setting member 702 or the like, the accessory 300 updates an AF speed setting state in the accessory state setting stored in the accessory 300 itself with a value indicating (representing) "set" in process 1401. The accessory 300 arbitrarily sets an AF speed setting. At this time, the AF speed setting is a magnification to be multiplied by the focusing driving speed when the focusing driving instruction from the camera body 200 is converted into the communication protocol supported by the interchangeable lens 100. Specifications of the AF speed setting are not limited to this, and for example, the accessory 300 may manage the AF speed setting as a value with which the focusing driving speed is to be replaced in the conversion to the communication protocol supported by the interchangeable lens 100.

In a case where the accessory 300 cannot specify the focusing speed for the interchangeable lens 100, the LED included in the accessory notification unit 330 may be turned on so that the user is notified that the AF speed setting cannot be set. The method of notifying the user that the AF speed setting cannot be set via the accessory notification unit 330 is not limited to this, and for example, an LCD included in the accessory notification unit 330 may display a notification indicating that the AF speed setting cannot be set.

If AF is started, the focusing driving instruction for the interchangeable lens 100 is transmitted to the accessory 300 in process 1402. After that, in process 1403, the accessory 300 whose AF speed setting state is "set" converts the focusing driving speed to be transmitted to the interchangeable lens 100 based on the AF speed setting. In process 1404, the accessory 300 transmits a focusing driving instruction including the converted focusing driving speed to the interchangeable lens 100. In response to the reception of this communication request, the interchangeable lens 100 drives the focus lens 104 and updates the focusing information managed by the interchangeable lens 100. The focusing information is information including FPC information and the like.

In processes 1405 and 1406, the focusing information acquisition request from the camera body 200 is transmitted to the interchangeable lens 100 through the communication protocol conversion processing by the accessory 300. In response to the reception of this communication request, the interchangeable lens 100 responds with the focusing information managed by the interchangeable lens 100. This response is communicated to the camera body 200 through the communication protocol conversion processing by the accessory 300 in processes 1407 and 1409. In process 1409, the accessory 300 updates the focusing information stored in the accessory 300 itself based on the latest focusing information acquired in process 1407.

If the AF speed setting is canceled by an operation on the focusing speed setting member 702 or the like in a state where the AF speed setting state is set to "set", the accessory 300 updates the AF speed setting state with a value representing "not set" and clears the AF speed setting in process 1410. The method of canceling the AF speed setting is not limited to the operation on the operation member. For example, the AF speed setting may be canceled in response to removal of the interchangeable lens 100, or the AF speed setting may be canceled when the imaging optical system is changed by driving of the zoom lens 102. The LED included in the accessory notification unit 330 may be turned on to notify the user that the AF speed setting has been canceled. The method of notifying the user that the AF speed setting has been canceled via the accessory notification unit 330 is not limited to this, and for example, an LCD included in the accessory notification unit 330 may display a notification indicating that the AF speed setting has been canceled.

Figure 15:
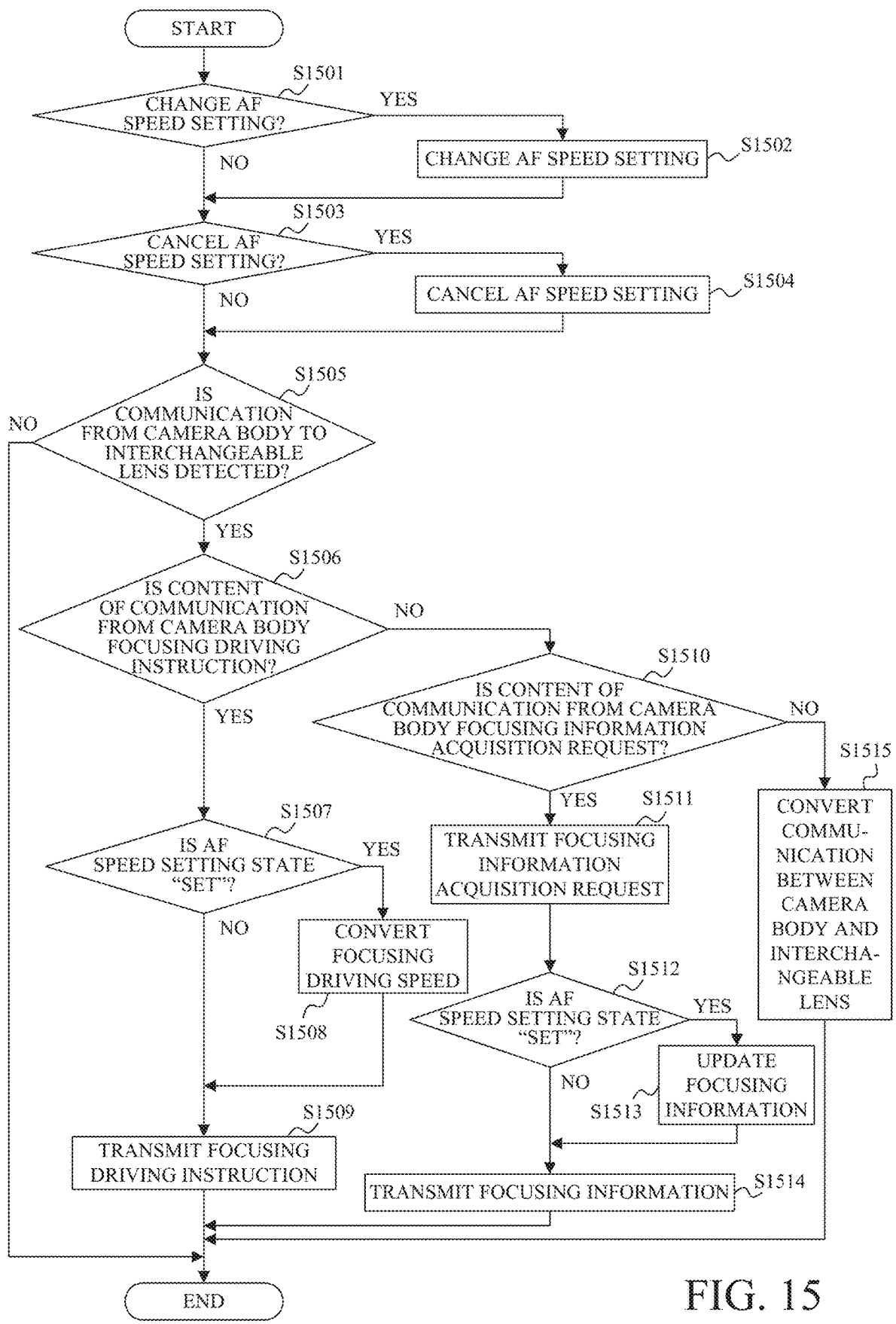
FIG. 15 is a diagram illustrating a processing flow of the AF speed setting function in an accessory according to the third embodiment.

With reference to FIG. 15, a description is given of processing in the accessory 300 having the AF speed setting function according to this embodiment.

The processing to be described hereinafter is control processing relating to the AF speed setting function performed by the accessory microcomputer 302 in the accessory 300 in a state of normal operation after completing the start sequence described with reference to FIG. 8.

In step S1501, the accessory microcomputer 302 determines whether or not to change the AF speed setting. If the accessory microcomputer 302 determines to change the AF speed setting, the process proceeds to step S1502, and if the accessory microcomputer 302 determines not to change the AF speed setting, the process proceeds to step S1503.

In step S1502, the accessory microcomputer 302 changes the AF speed setting.

The method of determining the start of changing the AF speed setting in step S1501 and the method of changing the AF speed setting in step S1502 are similar to the above-described process 1401, and therefore a detailed description thereof is omitted.

In step S1503, the accessory microcomputer 302 determines whether or not to cancel the AF speed setting. If the accessory microcomputer 302 determines to cancel the AF speed setting, the process proceeds to step S1504. If the accessory microcomputer 302 determines not to cancel the AF speed setting, the process proceeds to step S1505.

In step S1504, the accessory microcomputer 302 cancels the AF speed setting.

The method of determining the start of changing the AF speed setting in step S1501 and the method of changing the AF speed setting in step S1502 are similar to above-described process 1401, and therefore a detailed description thereof is omitted.

The method of determining the cancellation of the AF speed setting in step S1503 and the method of canceling the AF speed setting in step S1504 are similar to above-described process 1410, and therefore a detailed description thereof is omitted.

In step S1505, the accessory microcomputer 302 determines whether or not the communication from the camera body 200 to the interchangeable lens 100 is detected. If the accessory microcomputer 302 determines that the communication is detected, the process proceeds to step S1506. If the accessory microcomputer 302 determines that the communication is not detected, this flow is restarted from the start so that this flow is repeatedly executed, that is, the process proceeds to step S1501.

In step S1506, the accessory microcomputer 302 determines whether or not a content of the communication from the camera body 200 is a focusing driving instruction. If the accessory microcomputer 302 determines that the content is a focusing driving instruction, the process proceeds to step S1507. If the accessory microcomputer 302 determines the content is not a focusing driving instruction, the process proceeds to step S1510.

In step S1507, the accessory microcomputer 302 determines whether or not the AF speed setting state is "set". If the accessory microcomputer 302 determines that the AF speed setting state is "set", the process proceeds to step S1508. If the accessory microcomputer 302 determines the AF speed setting state is not "set", the process proceeds to step S1509.

In step S1508, the accessory microcomputer 302 converts a focusing driving speed to be transmitted to the interchangeable lens 100 based on the AF speed setting.

In step S1509, the accessory microcomputer 302 transmits the focusing driving instruction to the interchangeable lens 100 in the communication protocol supported by the interchangeable lens 100. After the process in step S1509 is completed, this flow is restarted from the start so that this flow is repeatedly executed, that is, the process proceeds to step S1501.

In step S1510, the accessory microcomputer 302 determines whether or not a content of the communication from the camera body 200 is a focusing information acquisition request. If the accessory microcomputer 302 determines that the content is a focusing information acquisition request, the process proceeds to step S1511, and if the accessory microcomputer 302 determines the content is not a focusing information acquisition request, the process proceeds to step S1515.

In step S1511, the accessory microcomputer 302 converts the communication protocol to the communication protocol supported by the interchangeable lens 100, transmits the converted focusing information acquisition request to the interchangeable lens 100, and receives focusing information from the interchangeable lens 100. This process is similar to above-described process 1405 and process 1406, and therefore a detailed description thereof is omitted.

In step S1512, the accessory microcomputer 302 determines whether or not the AF speed setting state is "set". If the accessory microcomputer 302 determines that the AF speed setting state is "set", the process proceeds to step S1513. If the accessory microcomputer 302 determines the AF speed setting state is not "set", the process proceeds to step S1514.

In step S1513, the accessory microcomputer 302 updates the focusing information stored in the accessory 300 itself based on the acquired focusing information. This process is similar to above-described process 1408, and therefore a detailed description thereof is omitted.

In step S1514, the accessory microcomputer 302 transmits the focusing information stored in the accessory 300 itself in the communication protocol supported by the camera body 200. This process is similar to above-described process 1409, and therefore a detailed description thereof is omitted. After the process in step S1514 is completed, this flow is restarted from the start so that this flow is repeatedly executed, that is, the process proceeds to step S1501.

In step S1515, the accessory microcomputer 302 analyzes a content of the communication received from the camera body 200, converts it into the communication protocol supported by the interchangeable lens 100, and transmits the communication to the interchangeable lens 100. At this time, in a case where the interchangeable lens 100 is to respond to the communication, the accessory microcomputer 302 waits until receiving the response. In a case where the camera body 200 needs a response, the response is transmitted in the communication protocol supported by the camera body 200. After the process in step S1515 is completed, this flow is restarted from the start so that this flow is repeatedly executed, that is, the process proceeds to step S1501.

As described above, the configuration according to this embodiment can make the accessory 300 have the AF speed setting function. This makes it possible to provide a camera system having an AF speed setting function even in a case where the interchangeable lens 100 and the camera body 200 do not have the AF speed setting function.

Fourth Embodiment

A camera system according to this embodiment is characterized in that the interchangeable lens 100 and the camera body 200 are connected via an accessory 300 having a fine focusing function.

Fine Focusing Function

Here, a description is given of the fine focusing function. Generally, in an imaging scene of starry sky or the like, a camera body is often fixed to a tripod and focus is finely adjusted with an MF function without an AF function used. For example, there is a method of finely adjusting focus by operating a manual operation ring. However, in this method, finely operating the manual operation ring may be difficult, and therefore fine focusing may be difficult. There is another example of a method of finely adjusting focus by controlling a camera body from a smartphone application. However, it is likely that the application takes time to control the camera body, and the user may miss an imaging opportunity because imaging cannot be immediately performed. In addition, this function can only be used with a camera body that the application supports.

The fine focusing function is a function that finely adjusts the focus without a fine operation. For example, in this embodiment, the infinite side focus limit setting button 707 or the close side focus limit setting button 708 is operated so that the focus lens 104 is driven to the infinite side or the close side according to the number of operations. Therefore, focus can be finely adjusted without fine adjustment such as adjustment with a manual operation ring. The fine focusing function is not limited to this, and may be, for example, a method in which the focus is continuously driven little by little while the button is being pressed. The fine focusing function may not be limited to the function of fine adjustment, and for example, may have a configuration in which the focus is largely driven for coarse adjustment.

Figure 16:
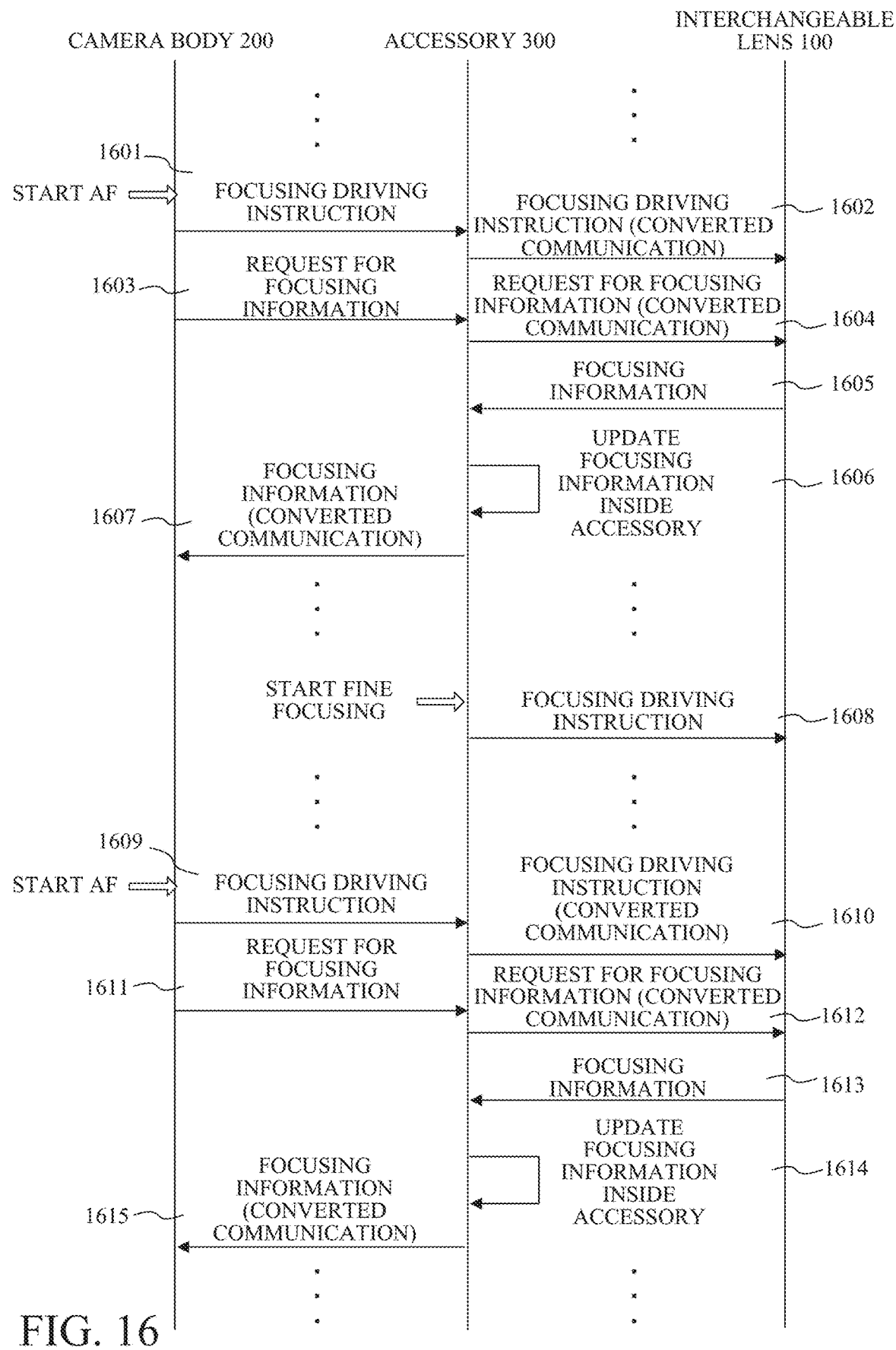
FIG. 16 is a diagram illustrating a sequence of a fine focusing function in a camera system according to a fourth embodiment.

With reference to FIG. 16, a description is given of processing in the camera system having the fine focusing function according to this embodiment.

Figure 9:
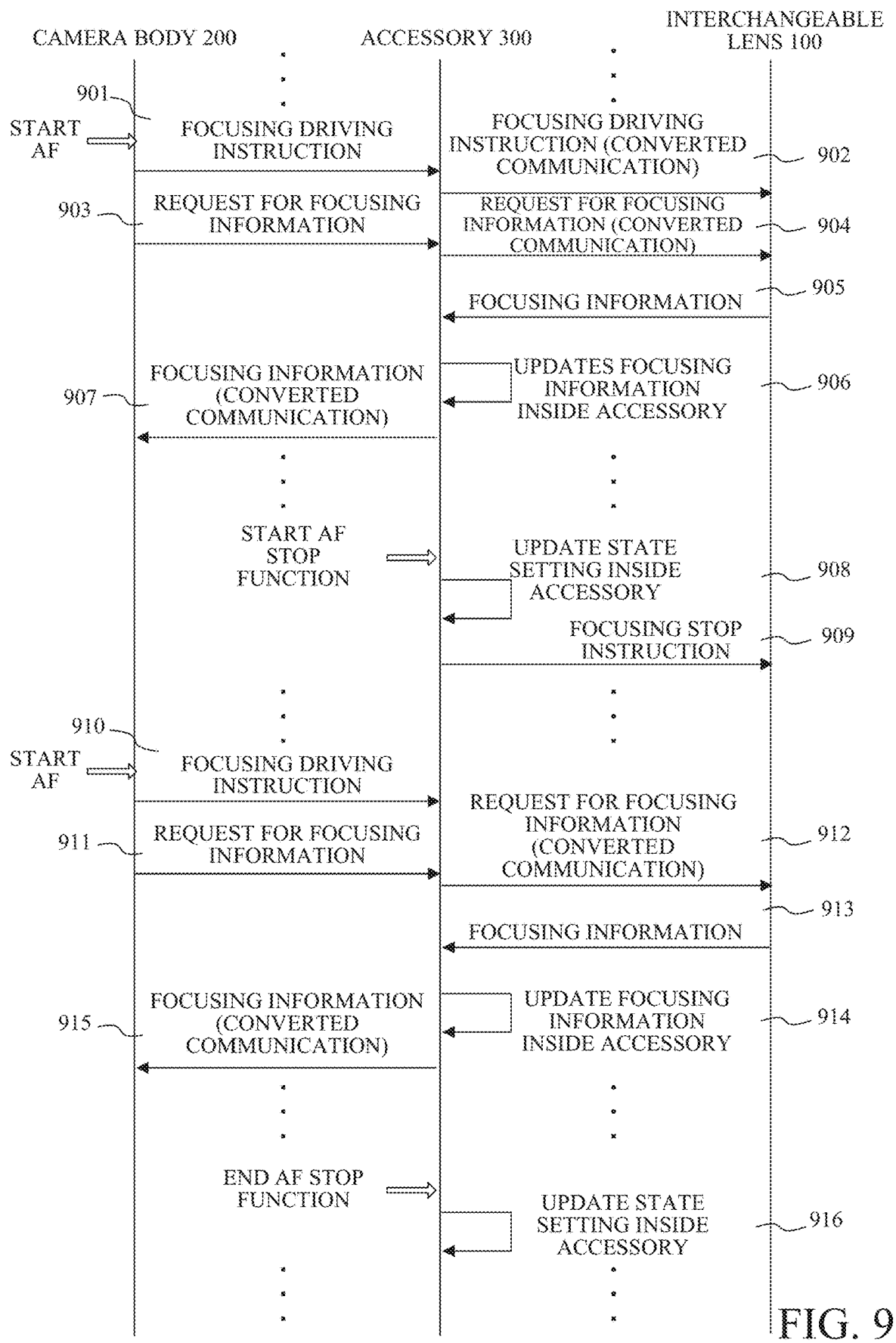
FIG. 9 is a diagram illustrating a sequence of an AF stop function in the camera system according to the first embodiment.

Processes 1601 to 1607 are respectively similar to processes 901 to 907 in FIG. 9, and therefore a description thereof is omitted.

If a process of the fine focusing function is started by an operation on the infinite side focus limit setting button 707 or the close side focus limit setting button 708, the accessory 300 transmits a focusing driving instruction to the interchangeable lens 100 in process 1608. A fine focusing driving amount is transmitted to the interchangeable lens 100 every time the infinite side focus limit setting button 707 or the close side focus limit setting button 708 is operated, and thus the user can finely adjust the focus without performing a fine operation. Information that the interchangeable lens 100 is in the MF state may be transmitted to the camera body 200, which makes it possible to prevent the camera body 200 from transmitting an unnecessary focusing driving instruction to the interchangeable lens 100. A proper focusing driving amount differs depending on the interchangeable lens 100, which is described later. Although a description is given of an example of using the infinite side focus limit setting button 707 or the close side focus limit setting button 708, the configuration is not limited to this. For example, an electronic ring that provides click feeling or an unillustrated lever may be used. If the user operates the infinite side focus limit setting button 707 or the close side focus limit setting button 708, it is indicated that the user wants to use the fine focusing function. Therefore, a certain period after process 1608 is completed may be set to a period during which process 1609, which is a process of AF, is not performed. At this time, the accessory 300 may convert the focusing information stored in the accessory 300 itself into information indicating (representing or including) a state different from the latest focusing information acquired in process 1613. Here, the focusing information is information including, in addition to the FPC information, a focusing driving state indicating (representing) whether or not the focus lens 104 is being driven, AF/MF information indicating (representing) whether the interchangeable lens 100 is in an AF state or an MF state, and the like. For example, even in a case where the focusing information from the interchangeable lens 100 indicates the AF state, the accessory 300 may update the focusing information stored in the accessory 300 itself with the MF state and transmits to the camera body 200 that the interchangeable lens 100 is in the MF state. Since the camera body 200 is notified of the MF state, it is possible to prevent unnecessary focusing driving instruction from being communicated. Furthermore, in a case where the camera body 200 cannot capture an image in the AF mode, imaging can be performed because the camera body 200 is notified of the MF state.

After the accessory 300 completes the process of the fine focusing function, AF is started by an operation on the operation unit 207 of the camera body 200. At this time, in processes 1609 and 1610, the focusing driving instruction is transmitted to the interchangeable lens 100 through the communication protocol conversion processing by the accessory 300. In response to the reception of this communication request, the interchangeable lens 100 drives the focus lens 104 and updates the focusing information managed by the interchangeable lens 100.

Thereafter, in processes 1611 and 1612, the focusing information acquisition request from the camera body 200 is transmitted to the interchangeable lens 100 through the communication protocol conversion processing by the accessory 300. In response to the reception of this communication request, the interchangeable lens 100 responds with the focusing information managed by the interchangeable lens 100. This response is transmitted to the camera body 200 through the communication protocol conversion processing by the accessory 300 in processes 1613 and 1615. In process 1614, the accessory 300 updates the focusing information stored in the accessory 300 itself based on the latest focusing information acquired in process 1613. According to the above processing, the process of the fine focusing function is temporarily performed by the operation on the accessory 300, and thereafter the process can be returned to the AF process based on the instruction from the camera body 200.

Figure 17:
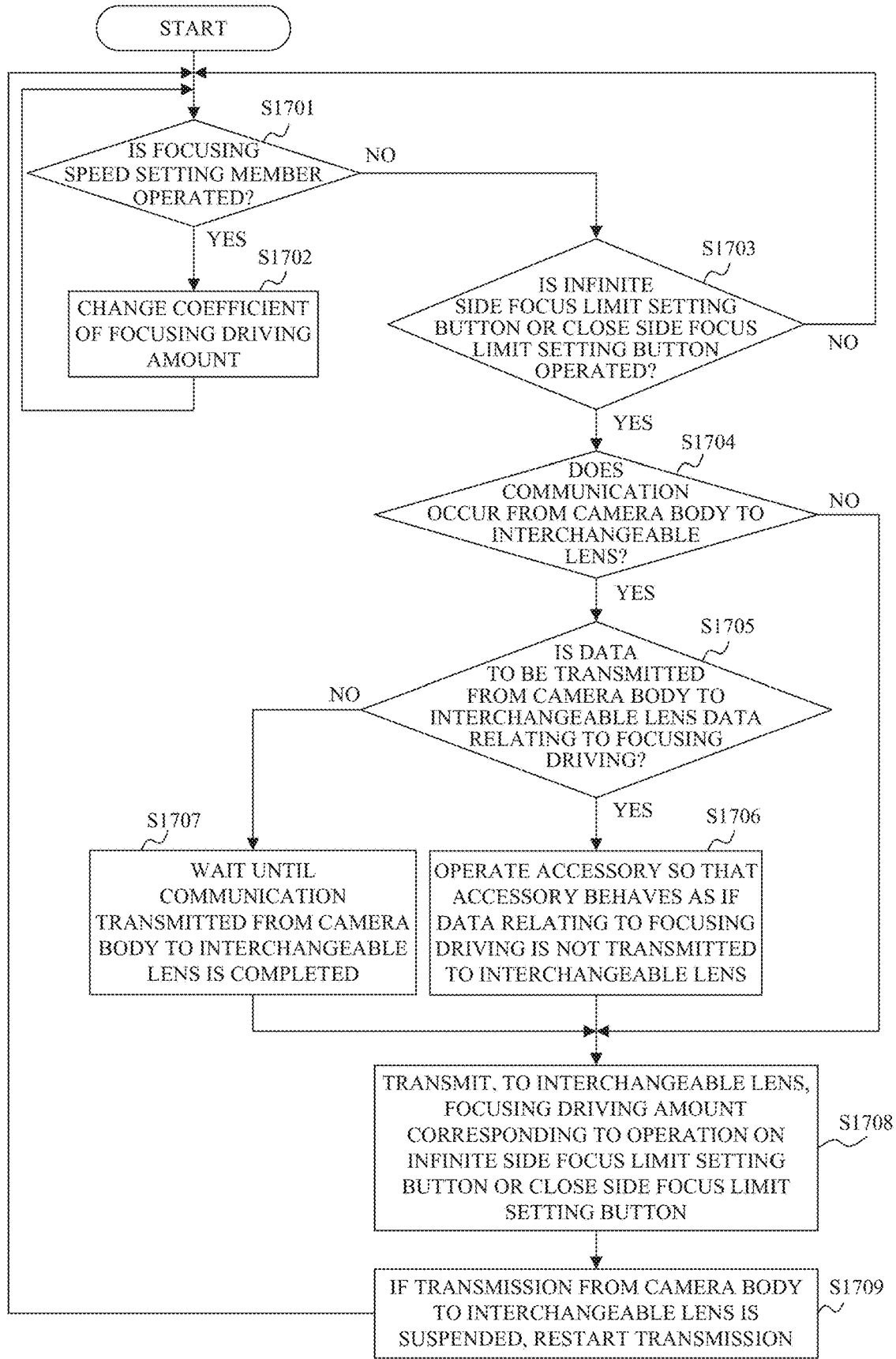
FIG. 17 is a diagram illustrating a processing flow of the fine focusing function in the camera system according to the fourth embodiment.

With reference to FIG. 17, a description is given of processing in the accessory 300 in the camera system having the fine focusing function according to this embodiment.

In step S1701, the accessory microcomputer 302 determines whether or not the focusing speed setting member 702 is operated. If the accessory microcomputer 302 determines that the focusing speed setting member 702 is operated, the process proceeds to step S1702. If the accessory microcomputer 302 determines that the focusing speed setting member 702 is not operated, the process proceeds to step S1703.

In step S1702, the accessory microcomputer 302 changes a coefficient of the focusing driving amount in step S1708.

In step S1703, the accessory microcomputer 302 determines whether or not the infinite side focus limit setting button 707 or the close side focus limit setting button 708 is operated. If the accessory microcomputer 302 determines that the infinite side focus limit setting button 707 or the close side focus limit setting button 708 is operated, the process proceeds to step S1704. If the accessory microcomputer 302 determines that the buttons are not operated, the process returns to step S1701.

In step S1704, the accessory microcomputer 302 determines whether or not communication occurs from the camera body 200 to the interchangeable lens 100. If the accessory microcomputer 302 determines that communication occurs, the process proceeds to step S1705, and if the accessory microcomputer 302 determines that communication does not occur, the process proceeds to step S1708.

In step S1705, the accessory microcomputer 302 determines whether or not data to be transmitted from the camera body 200 to the interchangeable lens 100 is data relating to focusing driving. The data relating to focusing driving includes the focusing driving instruction, the focusing stop instruction, and the like. If the accessory microcomputer 302 determines that the data relates to the focusing driving, the process proceeds to step S1706, and if the accessory microcomputer 302 determines that the data does not relate to the focusing driving, the process proceeds to step S1707.

In step S1706, the accessory microcomputer 302 operates the accessory 300 so that the accessory 300 behaves as in a case where the data relating to the focusing driving is not transmitted to the interchangeable lens 100. For example, there is a method of deleting the data so as to prevent the data from being transmitted from the accessory 300 to the interchangeable lens 100. Alternatively, a method may be used of transmitting meaningless data (specifically, data that does not cause the focusing driving) from the accessory 300 to the interchangeable lens 100. Since the user is trying to finely adjust the focus, careless driving of the focus lens 104 may confuse the user. If the focus lens 104 is not to be driven from the current state, an instruction to stop the focusing driving may be transmitted.

In step S1707, the accessory microcomputer 302 waits until the communication transmitted from the camera body 200 to the interchangeable lens 100 is completed. For example, in a case where the accessory 300 recognizes that the focusing information acquisition request is being communicated, the accessory 300 waits until the communication is completed, so that the accessory 300 can transmit a focusing driving instruction to the interchangeable lens 100 while inconsistent is prevented in the camera system.

In step S1708, the accessory microcomputer 302 transmits, to the interchangeable lens 100, a focusing driving amount corresponding to the operation on the infinite side focus limit setting button 707 or the close side focus limit setting button 708. In this embodiment, in response to the operation on the infinite side focus limit setting button 707, data is transmitted to the interchangeable lens 100 such that the focus lens 104 is driven to the infinite side. Similarly, in response to an operation the close side focus limit setting button 708, data is transmitted to the interchangeable lens 100 such that the focus lens 104 is driven to the close side. At this time, if a coefficient of the focusing driving amount updated in step S1702 is reflected in the driving amount, usability is improved. For example, there is a configuration in which, in step S1702, the magnification of the focusing driving amount is simply changed to ¼ times, ½ times, equal magnification, twice, and four times. The user can select the coefficient of focusing driving amount according to a lens type, a focal length, an aperture value, etc., so as to be provided with a fine focusing function properly set for one operation on the infinite side focus limit setting button 707 or the close side focus limit setting button 708. The interchangeable lens 100 may be notified that the state is the AF state at the beginning of this step so that the focus lens 104 is certainly driven. The above description is mere an example. It is widely known that a depth of field (a range of a distance on a field side that appears to be in focus in a photo) changes depending on pixel size, focal length, and aperture value, and thus the configuration may be such that the accessory microcomputer 302 makes a determination based on the information thereof and changes the coefficient. The configuration may be such that the coefficient of the focusing driving amount can be changed from an external device such as a smartphone. If the user does not want focusing driving noise to be recorded during motion image recording, the configuration may be such that the focusing driving amount and focusing driving speed are limited.

In a case where the camera body 200 transmits data to the interchangeable lens 100 while the accessory 300 is transmitting the focusing driving data to the interchangeable lens 100, the communication between the interchangeable lens 100 and the camera body 200 is suspended. In the case of the first communication, the communication pause period can be expressed by the BUSY frame. Therefore, while the accessory 300 is transmitting the focusing driving data to the interchangeable lens 100, the BUSY frame may be maintained in the communication between the camera body 200 and the accessory 300.

In step 1709, in a case where the transmission from the camera body 200 to the interchangeable lens 100 is suspended, the accessory microcomputer 302 restarts the transmission.

As described above, the configuration according to this embodiment can make the accessory 300 have the fine focusing function. This makes it possible to provide a camera system having a fine focusing function even in a case where the interchangeable lens 100 and the camera body 200 do not have the fine focusing function.

Fifth Embodiment

A camera system according to this embodiment is characterized in that the interchangeable lens 100 and the camera body 200 are connected via an accessory 300 having an MF function.

MF Function

Figure 18:
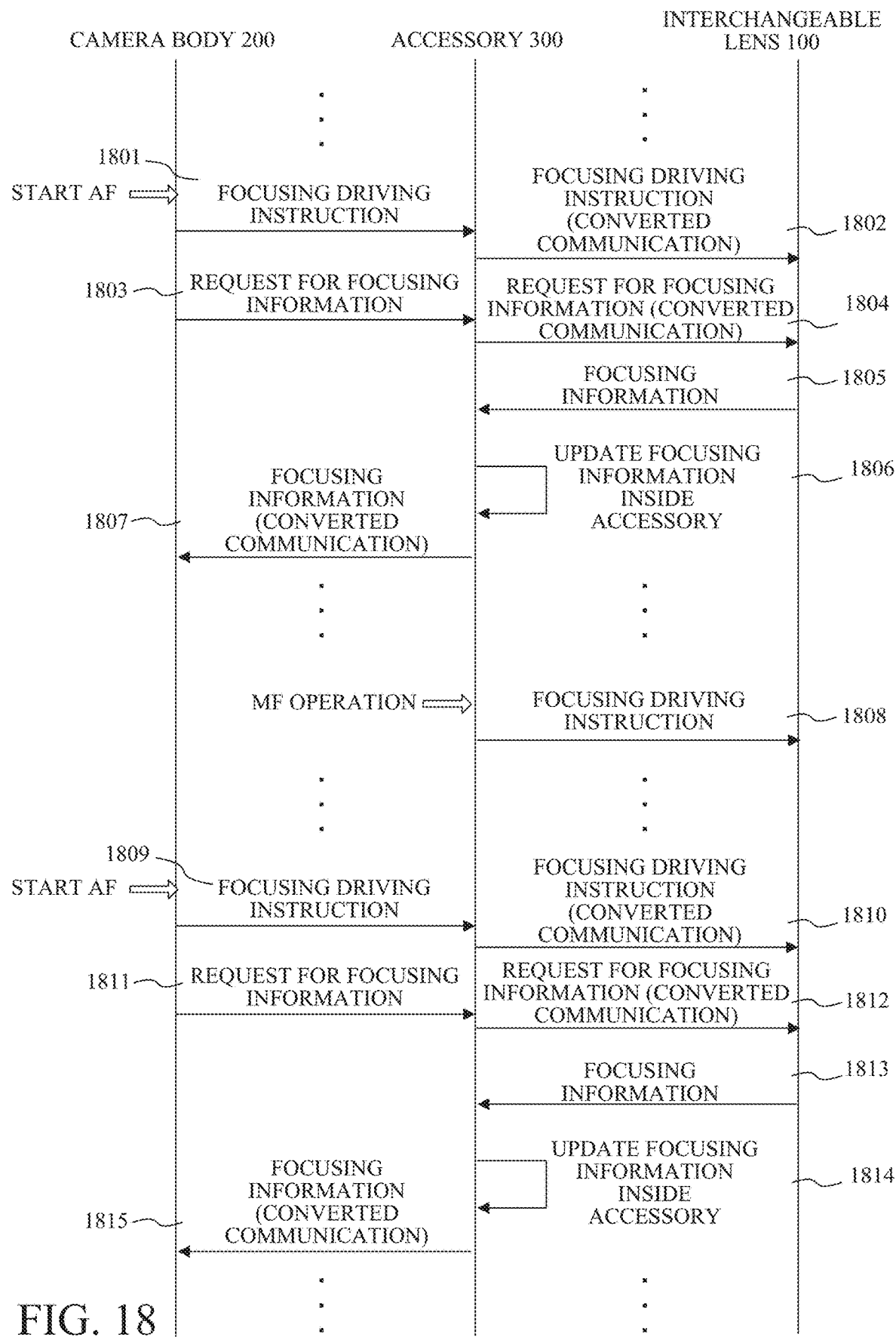
FIG. 18 is a diagram illustrating a sequence of a function that allows an MF operation even in an AF mode in a camera system according to a fifth embodiment.

With reference to FIG. 18, a description is given of processing in a camera system having a function that allows an MF operation even in a state where the camera body 200 is set to an AF mode, according to this embodiment.

In this embodiment, the focus lens 104 is driven according to an operation amount by an operation on the electronic ring 701 even in a state where the camera body 200 is set to the AF mode. A situation may occur such that the user wants to perform the MF operation in imaging with the camera body 200 set to the AF mode. For example, in a case where AF focusing is difficult because an object has low brightness or low contrast, the user may want to quickly perform focusing by the MF operation. Even in such a scene, the accessory 300 according to this embodiment enables quick focusing without changing the setting of the camera body 200 from the AF mode to the MF mode.

Processes 1801 to 1807 are respectively similar to processes 1601 to 1607 of FIG. 16, and therefore a description thereof is omitted.

If the process of the MF function is started by an operation on the electronic ring 701, the accessory 300 transmits a focusing driving instruction to the interchangeable lens 100 in process 1808. The focusing driving amount is changed according to the operation amount on the electronic ring 701, and thus the focus lens 104 is driven by a small MF operation amount as if the manual operation ring 130 is slightly rotated, and the focus lens 104 is driven by a large MF operation amount as if the manual operation ring 130 is greatly rotated. At this time, the camera body 200 may be notified that the interchangeable lens 100 is in the MF state so that unnecessary focusing driving instruction is not transmitted from the camera body 200 to the interchangeable lens 100. A proper focusing driving amount differs depending on the interchangeable lens 100, which is described later. Although a description is given of an example of the electronic ring 701, the configuration is limited to this. For example, a configuration may be such that the MF operation amount is changed according to a length of an operation on the infinite side focus limit setting button 707 or the close side focus limit setting button 708, or a configuration may be such that the MF operation amount is changed according to an operation amount on an unillustrated lever. If the user operates the electronic ring 701, it is indicated that the user wants to use the MF function, and thus a certain period after process 1808 is completed may be set to a period during which process 1809, which is a process of AF, is not performed. At this time, the accessory 300 may convert the focusing information stored in the accessory 300 itself into information indicating (representing or including) a state different from the latest focusing information acquired in process 1813. The focusing information is information including, in addition to the FPC information, a focusing driving state indicating (representing) whether or not the focus lens 104 is being driven, AF/MF information indicating (representing) whether the interchangeable lens 100 is in an AF state or an MF state, and the like. For example, even in a case where the focusing information from the interchangeable lens 100 indicates the AF state, the accessory 300 may update the focusing information stored in the accessory 300 itself with the MF state and transmits to the camera body 200 that the interchangeable lens 100 is in the MF state. Since the camera body 200 is notified of the MF state, it is possible to prevent an unnecessary focusing driving instruction from being communicated. Furthermore, in a case where the camera body 200 cannot capture an image in the AF mode, imaging can be performed because the camera body 200 is notified of the MF state.

After the process of the MF function of the accessory 300 is completed, if AF is started by an operation on the operation unit 207 of the camera body 200, the focusing driving instruction is transmitted to the interchangeable lens 100 through the communication protocol conversion processing by the accessory 300 in processes 1809 and 1810. In response to the reception of this communication request, the interchangeable lens 100 drives the focus lens 104 and updates the focusing information managed by the interchangeable lens 100.

In processes 1811 and 1812, the focusing information acquisition request from the camera body 200 is transmitted to the interchangeable lens 100 through the communication protocol conversion processing by the accessory 300. In response to the reception of this communication request, the interchangeable lens 100 responds with the focusing information managed by the interchangeable lens 100. This response is transmitted to the camera body 200 through the communication protocol conversion processing by the accessory 300 in processes 1813 and 1815. In process 1814, the accessory 300 updates the focusing information stored in the accessory 300 itself based on the latest focusing information acquired in process 1813. According to the above process, the MF function is temporarily operated by the operation on the accessory 300, and thereafter the process can be returned to the AF process based on the instruction from the camera body 200.

Figure 19:
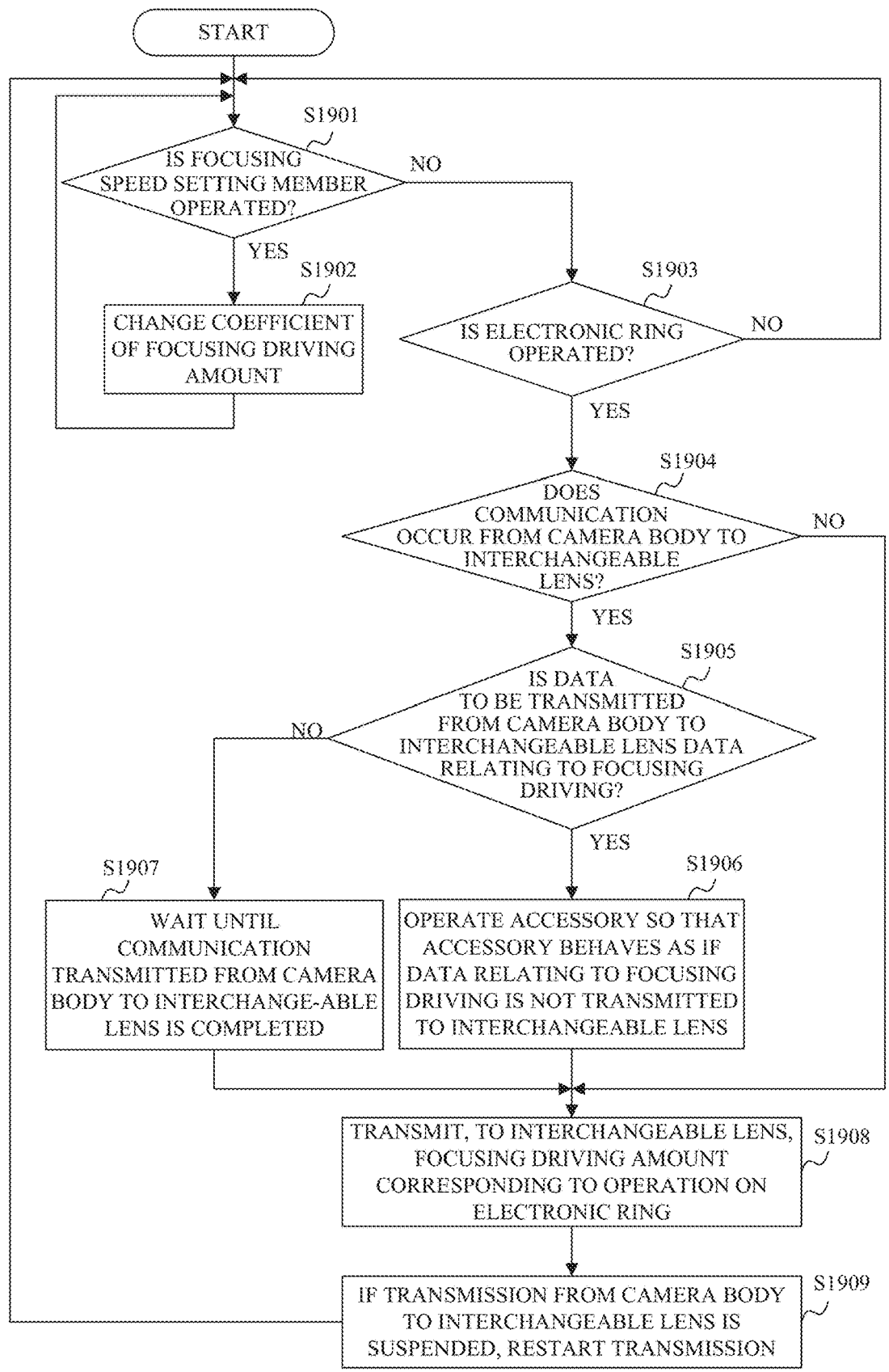
FIG. 19 is a diagram illustrating a processing flow of the function that allows the MF operation even in the AF mode in the camera system according to the fifth embodiment.

With reference to FIG. 19, a description is given of processing in the accessory 300 in the camera system that causes the MF function even in a case where the setting of the camera body 200 is the AF mode, according to this embodiment.

In step S1901, the accessory microcomputer 302 determines whether or not the focusing speed setting member 702 is operated. If the accessory microcomputer 302 determines that the focusing speed setting member 702 is operated, the process proceeds to step S1902. If the accessory microcomputer 302 determines that the focusing speed setting member 702 is not operated, the process proceeds to step S1903.

In step S1902, the accessory microcomputer 302 changes a coefficient of the focusing driving amount in step S1908.

In step S1903, the accessory microcomputer 302 determines whether or not the electronic ring 701 is operated. If the accessory microcomputer 302 determines that the electronic ring 701 is operated, the process proceeds to step S1904, and if the accessory microcomputer 302 determines that the electronic ring 701 is not operated, the process returns to step S1901.

In step S1904, the accessory microcomputer 302 determines whether or not communication occurs from the camera body 200 to the interchangeable lens 100. If the accessory microcomputer 302 determines that communication occurs, the process proceeds to step S1905, and if the accessory microcomputer 302 determines that communication does not occur, the process proceeds to step S1908.

In step S1905, the accessory microcomputer 302 determines whether or not data to be transmitted from the camera body 200 to the interchangeable lens 100 is data relating to focusing driving. The data relating to the focusing driving includes the focusing driving instruction, the focusing stop instruction, and the like. If the accessory microcomputer 302 determines that the data relates to the focusing driving, the process proceeds to step S1906, and if the accessory microcomputer 302 determines that the data does not relate to the focusing driving, the process proceeds to step S1907.

In step S1906, the accessory microcomputer 302 operates the accessory 300 so that the accessory 300 behaves as in a case where the data relating to the focusing driving is not transmitted to the interchangeable lens 100. For example, there is a method of deleting the data so as to prevent the data from being transmitted from the accessory 300 to the interchangeable lens 100. Alternatively, a method may be used of transmitting meaningless data (specifically, data that does not cause the focusing driving) from the accessory 300 to the interchangeable lens 100. Since the user is trying to manually adjust the focus, careless driving of the focus lens 104 may confuse the user. If the focus lens 104 is not to be driven from the current state, an instruction to stop the focusing driving may be transmitted.

In step S1907, the accessory microcomputer 302 waits until the communication transmitted from the camera body 200 to the interchangeable lens 100 is completed. For example, in a case where the accessory 300 recognizes that the focusing information acquisition request is being communicated, the accessory 300 waits until the communication is completed, so that the accessory 300 can transmit a focusing driving instruction to the interchangeable lens 100 while inconsistent is prevented in the camera system.

In step S1908, the accessory microcomputer 302 transmits, to the interchangeable lens 100, a focusing driving amount corresponding to the operation on the electronic ring 701. At this time, if a coefficient of the focusing driving amount updated in step S1902 is reflected in the driving amount, usability is improved. For example, there is a configuration in which, in step S1902, the magnification of the focusing driving amount is simply changed to ¼ times, ½ times, equal magnification, twice, and four times. The user can select the coefficient of focusing driving amount according to a lens type, a focal length, an aperture value, etc., so as to be provided with an MF function properly set for the operation amount on the electronic ring 701. The interchangeable lens 100 may be notified that the state is the AF state at the beginning of this step so that the focus lens 104 is certainly driven. The above description is a mere example. It is widely known that a depth of field (a range of a distance on a field side that appears to be in focus in a photo) changes depending on pixel size, focal length, and aperture value, and thus the configuration may be such that the accessory microcomputer 302 makes a determination based on the information thereof and changes the coefficient. The configuration may be such that the coefficient of the focusing driving amount can be changed from an external device such as a smartphone. If the user does not want focusing driving noise to be recorded during motion image recording, the configuration may be such that the focusing driving amount and focusing driving speed is limited.

In a case where the camera body 200 transmits data to the interchangeable lens 100 while the accessory 300 is transmitting the focusing driving data to the interchangeable lens 100, the communication between the interchangeable lens 100 and the camera body 200 is suspended. In the case of the first communication, the communication pause period can be expressed by the BUSY frame. Therefore, while the accessory 300 is transmitting the focusing driving data to the interchangeable lens 100, the BUSY frame may be maintained in the communication between the camera body 200 and the accessory 300.

In step 1909, in a case where the transmission from the camera body 200 to the interchangeable lens 100 is suspended, the accessory microcomputer 302 restarts the transmission.

As described above, the configuration according to this embodiment can make the accessory 300 have a function that allows the MF operation even in a state where the camera body 200 is set to the AF mode. Thereby, even in a case where the interchangeable lens 100 and the camera body 200 do not have a function that allows the MF operation even in a state where the camera body 200 is set to the AF mode, it is possible to provide a camera system having that function.

Sixth Embodiment

This embodiment proposes a method for making the accessory 300 realize storing of a focus position and reproduction driving.
Behavior of Accessory 300 in Initialization Processing of FPC Information With reference to FIG. 20, a description is given of processing for updating the FPC information managed inside the accessory 300 in a case where initialization processing of the FPC information is performed between the interchangeable lens 100 and the camera body 200.

In step S2001, the accessory microcomputer 302 determines whether or not a content of communication from the camera body 200 is a request for initialization of FPC information. If the accessory microcomputer 302 determines that the content is a request for the initialization of the FPC information, the process proceeds to step S2002, and if the accessory microcomputer 302 determines that the content is not a request for the initialization of the FPC information, the process in this step is repeated.

In step S2002, the accessory microcomputer 302 performs a process of acquiring the latest FPC information with the interchangeable lens 100. The process in this step is performed before the interchangeable lens 100 is requested to initialize the FPC information.

In step S2003, the accessory microcomputer 302 corrects the focusing reference position information stored in itself so as to eliminate a difference from the latest FPC information acquired in step S2002 and stores the corrected focusing reference position information.

In step S2004, the accessory microcomputer 302 performs, with the interchangeable lens 100, communication on the request for initialization of FPC information detected in step S2001 after converting its communication protocol.

According to the above processing, the accessory 300 can acquire the absolute position of the focus even in a case where the focusing driving control is executed between the interchangeable lens 100 and the camera body 200. Specifically, the accessory 300 acquires FPC information by adding the focusing reference position information managed by itself and the FPC information communicated between the interchangeable lens 100 and the camera body 200, and thereby can acquire the absolute position of the focus.

However, as described below, in a case where zooming driving is performed, an error may occur between the focus position as an actual focal plane and the FPC information due to a mechanical structure. Depending on a type of an actuator that controls driving of the focus lens 104, an error may occur between the focus position as the actual focal plane and the FPC information in a case where the focusing driving is repeatedly performed. Since the accessory 300 manages the FPC information by the FPC information communicated between the camera body 200 and the interchangeable lens 100, reliability of the focusing reference position information managed by the accessory 300 may be lowered as a result. In such a case, an operation on the reset button 704 causes update processing of the focusing reference position information described below.
Update Processing of Focusing Reference Position Information With reference to FIG. 21A, a description is given of the update processing of the focusing reference position.

In step S2101, the accessory microcomputer 302 determines whether or not a trigger for updating the focusing reference position information is detected. For example, the case where the trigger is detected corresponds to a case where the reset button 704 is operated. If the accessory microcomputer 302 determines that the trigger is detected, the process proceeds to step S2102, and if the accessory microcomputer 302 determines that the trigger is not detected, the process in this step is repeated.

In step S2102, the accessory microcomputer 302 starts the update processing of the focusing reference position information between the interchangeable lens 100 and the accessory 300. As described below, focusing driving cannot be instructed from the camera body 200 during this processing, the accessory microcomputer 302 pretends, to the camera body 200, that the interchangeable lens 100 is, for example, in a manual focusing state.

In step S2103, the accessory microcomputer 302 performs communication for prohibiting a manual focusing process to the interchangeable lens 100. This is a process to prevent the FPC information in the interchangeable lens 100 from being changed by the manual focusing operation on the interchangeable lens 100 during the update of the focusing reference position information managed by the accessory 300, which is described in this flow.

In step S2104, the accessory microcomputer 302 determines whether or not the interchangeable lens 100 can acquire the absolute reference position of the focus lens 104. In this step, the determination is made based on the authentication information of which the accessory 300 is notified from the interchangeable lens 100 in process 805. As an example of the interchangeable lens 100 that can acquire the absolute reference position of the focus lens 104, there is a lens configuration including a device called a reset sensor that can detect the absolute position with high accuracy and is located at a specific position in the focusing driving range. In a case where the interchangeable lens 100 is such a lens, the interchangeable lens 100 can reacquire the absolute position of the focus lens 104 by driving the focus lens 104 to a position where the reset sensor described above is located. If the accessory microcomputer 302 determines that the interchangeable lens 100 can acquire the absolute reference position of the focus lens 104, the process proceeds to step S2105, and if the accessory microcomputer 302 determines that the interchangeable lens 100 cannot acquire the absolute reference position of the focus lens 104, the process proceeds to S2106.

In step S2105, the accessory microcomputer 302 requests the interchangeable lens 100 to acquire the absolute reference position of the focus lens 104.

In step S2106, the accessory microcomputer 302 transmits a communication request to the interchangeable lens 100 so that the interchangeable lens 100 drives the focus lens 104 to the infinite end or the close end.

In step S2107, the accessory microcomputer 302 performs a process of waiting for the focus lens 104 to stop and a process of ignoring the focusing driving request from the camera body 200.

In step S2108, in a state where the focus lens 104 arrives at the infinite end or the close end and is stopped, the accessory microcomputer 302 requests the interchangeable lens 100 to initialize the FPC information and initializes the focusing reference position information managed by itself. At this time point, the FPC information communicated between the interchangeable lens 100 and the camera body 200, and the focusing reference position information managed by the accessory 300 is initialized to a same value again.

In step S2109, the accessory microcomputer 302 initializes a focus relative change amount managed by itself. The focus relative change amount is a parameter indicating (representing) a change amount of the focus lens as a difference value from the focusing reference position information, and a detailed description thereof is described below.

In step S2110, the accessory microcomputer 302 initializes various warning determination parameters for determining a state in which accuracy of reproduction driving of the focus position, which is described below, cannot be ensured.

In step S2111, the accessory microcomputer 302 ends the update processing of the focusing reference position information between the interchangeable lens 100 and the accessory 300. After this time, the process of not receiving the focusing driving request from the camera body 200 is canceled, the request being prohibited in step S2102.

Subsequently, with reference to FIG. 21B, a description is given of a subroutine of focus-stop confirming processing by the accessory microcomputer 302 in step S2107.

In step S2112, the accessory microcomputer 302 determines whether or not communication occurs from the camera body 200. If the accessory microcomputer 302 determines that communication occurs, the process proceeds to step S2113. If the accessory microcomputer 302 determines that the communication does not occur, the process proceeds to step S2120.

In step S2113, the accessory microcomputer 302 determines whether or not a content of the communication from the camera body 200 is a request that inquires about a state of a switch that is provided on the interchangeable lens 100 for changing a function to the AF function and the MF function. If the accessory microcomputer 302 determines that the content is a request that inquires about the state of the switch for changing the function to the AF function and the MF function, the process proceeds to step S2114, and if the accessory microcomputer 302 determines that the content is not a request that inquires about the state of the switch, the process proceeds to step S2115.

In step S2114, the accessory microcomputer 302 communicates to the camera body 200 that the MF function is set. As a result, it is possible to prevent the focusing driving request from the camera body 200 from being generated in a period until the update of the focusing reference position information in the accessory 300 executed in this flow is completed.

In step S2115, the accessory microcomputer 302 determines whether or not a content of the communication from the camera body 200 is a request that inquires about the focusing state. If the accessory microcomputer 302 determines that the content is a request that inquires about the focusing state, the process proceeds to step S2116, and if the accessory microcomputer 302 determines that the content is not a request that inquires about the focusing state, the process proceeds to step S2117.

In step S2116, the accessory microcomputer 302 communicates, with the camera body 200, false information that the state is a focusing driving impossible state.

In step S2117, the accessory microcomputer 302 determines whether or not a content of the communication from the camera body 200 is a focusing driving request. If the accessory microcomputer 302 determines that the content is a focusing driving request, the process proceeds to step S2118. If the accessory microcomputer 302 determines that the content is not a focusing driving request, the process proceeds to step S2119.

In step S2118, the accessory microcomputer 302 does not execute a focusing driving request to the interchangeable lens 100.

In step S2119, the accessory microcomputer 302 executes the focusing driving request to the interchangeable lens 100 after performing the communication protocol conversion processing.

In step S2120, the accessory microcomputer 302 performs an inquiry about the focusing state to the interchangeable lens 100.

In step S2121, the accessory microcomputer 302 determines whether or not the focus lens 104 is stopped based on a response from the interchangeable lens 100. If the accessory microcomputer 302 determines that the focus lens 104 is stopped, this flow is ended, and if the accessory microcomputer 302 determines that the focus lens 104 is not stopped, this flow is restarted.

The above processing can cancel the error with the actual position of the focus lens 104 accumulated in the FPC information communicated between the interchangeable lens 100 and the camera body 200, the error being accumulated by the driving errors when the focus lens 104 is repeatedly driven.

Regarding the process in step S2106 of causing the focus lens 104 to arrive at the infinite end or the close end, the accessory 300 may monitor the communication between the interchangeable lens 100 and the camera body 200. Alternatively, the accessory 300 may use optical data such as object distance information acquired by independently communicating with the interchangeable lens 100. Alternatively, the accessory 300 may use the authentication information on the interchangeable lens 100 acquired in process 805 to determine whether or not an actuator such as a stepping motor that is likely to cause a drive error is provided. In a case where an actuator that is less likely to cause a focusing driving error is provided, the focusing reference position may be updated while the focus lens 104 is stopped at the current position without the arriving process to the end of the focus lens 104 performed. In that case, the determination may made by the authentication information received from the interchangeable lens 100 by the accessory 300 in process 805.

Behavior of Accessory 300 in Operation of Storing Focus Position

Figure 22:
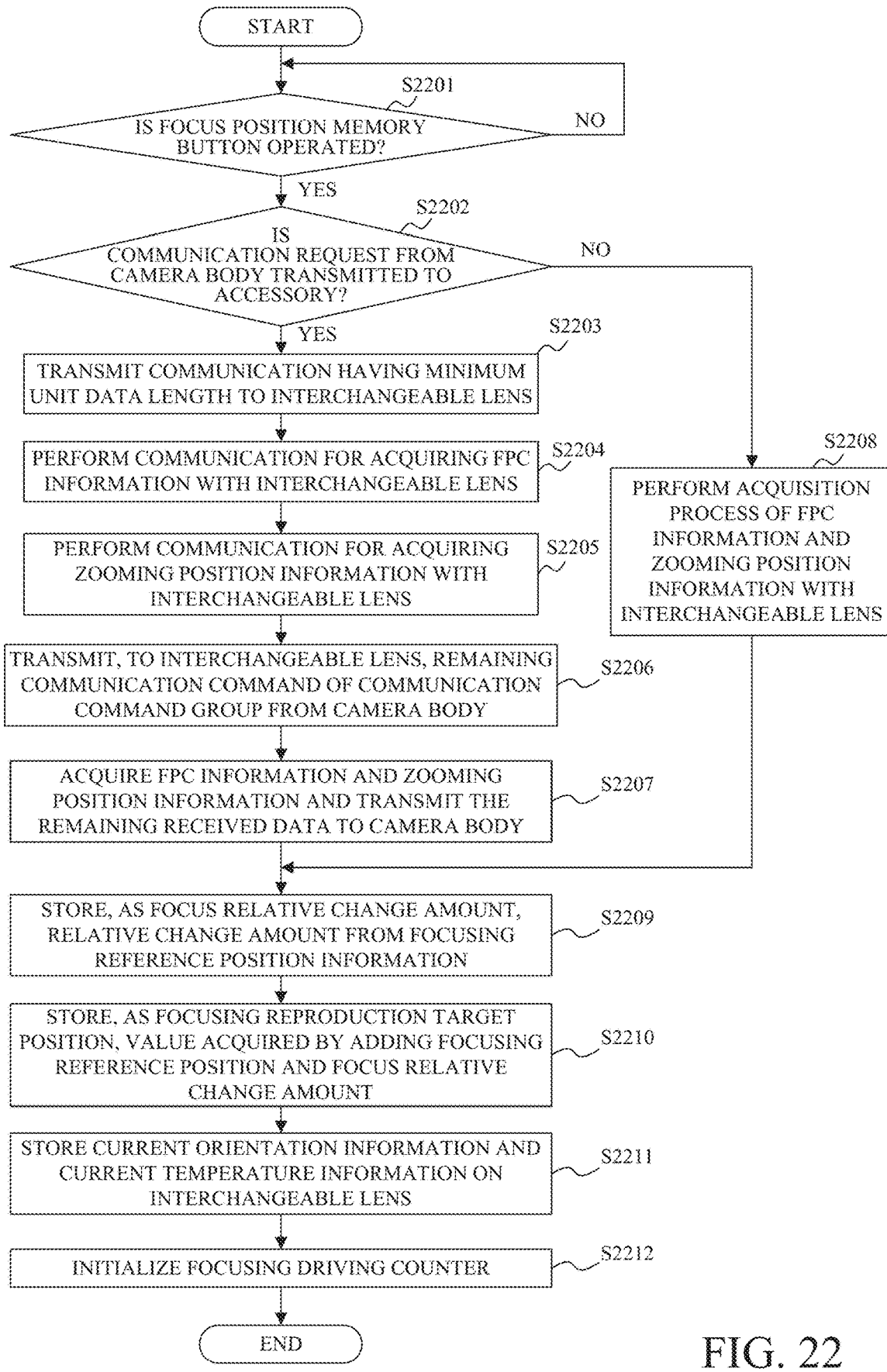
FIG. 22 is a flowchart illustrating processing of storing the focus position according to the sixth embodiment.

With reference to FIG. 22, a description is given of processing in a case where the focus position memory button 705 is operated.

In step S2201, the accessory microcomputer 302 determines whether or not the focus position memory button 705 is operated. If the accessory microcomputer 302 determines that the focus position memory button 705 is operated, the process proceeds to step S2202, and if the accessory microcomputer 302 determines that the focus position memory button 705 is not operated, the process in this step is repeated.

In step S2202, the accessory microcomputer 302 determines whether or not a communication request from the camera body 200 is transmitted to the accessory 300. If the accessory microcomputer 302 determines that the communication request is transmitted, the process proceeds to step S2203, and if the accessory microcomputer 302 determines that the communication request is not transmitted, the process proceeds to step S2208.

In step S2203, the accessory microcomputer 302 finds a communication end of one a minimum unit data length indicating one command of a communication command group transmitted from the camera body 200, converts the communication protocol for the communication of that data length, and transmits the converted communication to the interchangeable lens 100. Such a process is performed because the communication command communicated between the interchangeable lens 100 and the camera body 200 can be communicated while being concatenated in an arbitrary data length, for example, as illustrated in FIG. 4B.

In step S2204, the accessory microcomputer 302 performs communication for acquiring the FPC information with the interchangeable lens 100 after performing the process in step S2203 independently of the communication request from the camera body 200.

In step S2205, the accessory microcomputer 302 additionally performs communication for acquiring zooming position information with the interchangeable lens 100 after performing the communication in step S2204, independently of the communication request from the camera body 200. The zooming position information is used for determining a condition for warning display when the accuracy of reproduction driving to a driving position may be deteriorated described below.

In step S2206, the accessory microcomputer 302 transmits, to the interchangeable lens 100, the remaining communication commands of the communication command group from the camera body 200 whose execution has been interrupted by the processes in steps S2204 and S2205.

In step S2207, the accessory microcomputer 302 acquires, from the received data as a response from the interchangeable lens 100, the zooming position information and the FPC information which is the response to the communication that has been executed in the processes in steps S2204 and S2205 and has interrupted the communication command group from the camera body 200. The accessory microcomputer 302 transmits the remaining received data to the camera body 200.

In step S2208, the accessory microcomputer 302 performs an acquisition process of the FPC information and the zooming position information with the interchangeable lens 100.

In step S2209, as the focus relative change amount, the accessory microcomputer 302 stores, in the accessory memory unit 340, a relative change amount from the focusing reference position information, based on the FPC information acquired in step S2204 or step S2208.

In step S2210, as a reproduction target position of the focus, the accessory microcomputer 302 stores, in the accessory memory unit 340, a value acquired by adding the focusing reference position and the focus relative change amount each of which is managed by the accessory memory unit 340 itself. The focusing reference position and the focus relative change amount are managed separately because the focusing reference position may be corrected when the absolute position information on the focus lens 104 is to be determined by using the FPC information after the initialization.

In step S2211, the accessory microcomputer 302 stores current orientation information (position information) and current temperature information on the interchangeable lens 100 in the accessory memory unit 340. Specifically, the orientation information (position information) on the interchangeable lens 100 is information indicating (representing or including) that, for example, the camera body 200 is held in a normal position, in a vertical position, or the like, and may be detected by the accessory 300 using orientation information detected by any device in the camera system.

For example, in a case where the configuration is such that the orientation information is transmitted from the camera body 200 to the interchangeable lens 100, the accessory 300 can acquire that information by monitoring a content of the communication. In the case where the configuration is such that the orientation information is transmitted from the interchangeable lens 100 to the camera body 200, the accessory 300 can acquire that information by communicating an acquisition request for the orientation information with the interchangeable lens 100 by a process similar to the process in step S2205. Alternatively, the accessory 300 may include a unit for detecting the orientation information. The method of acquiring the temperature information is similar. The orientation information and the temperature information are used in a determination on the warning display described below.

In step S2212, a focusing driving counter managed by the accessory 300 is initialized. Information thereof manages a history of the driving and stopping processes of the focus lens 104, and is used in the determination on the warning display described below, and the determination is realized by monitoring a control error when the driving and stopping processes are repeated.

Figure 23:
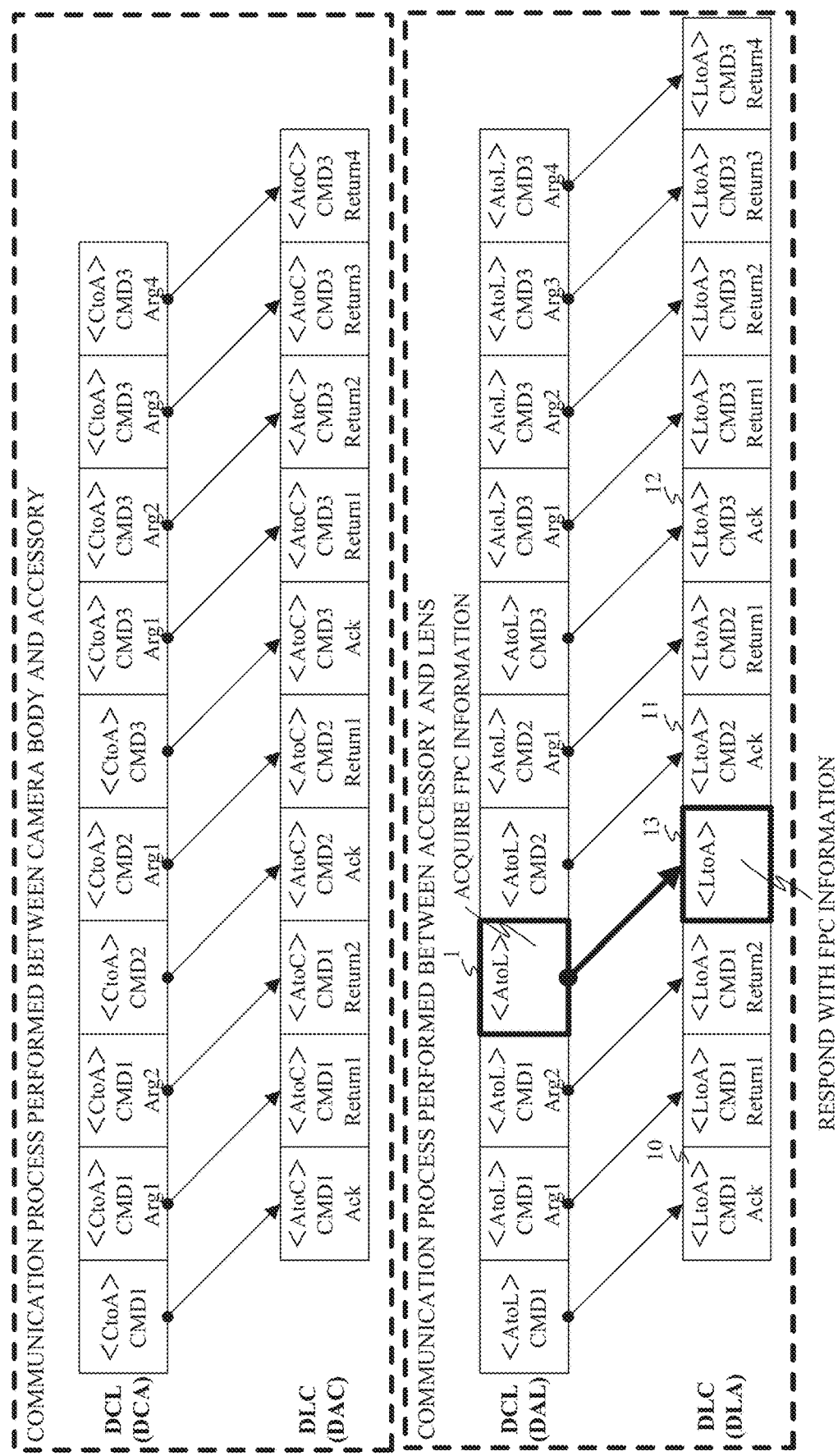
FIG. 23 is a diagram illustrating processing of replacing communication data in an accessory according to the sixth embodiment.

Here, with reference to FIG. 23, a supplementary description is given of the above-described processes in steps S2203 to S2207. FIG. 23 illustrates an example of a content of communication on which the determination is made in step S2202 in a case where communication is performed between the interchangeable lens 100 and the camera body 200 when the focus position memory button 705 is operated.

The upper part of FIG. 23 illustrates an example of communication performed between the camera body 200 and the accessory 300. As communication data DCL (DCA) transmitted from the camera body 200 to the accessory 300, a command 1 (CMD1), a command 2 (CMD2), a command 3 (CMD3) whose data lengths are respectively three bytes, two bytes, and five bytes are continuously communicated. As the communication data DLC (DAC) transmitted from the accessory 300 to the camera body 200, three response values corresponding to the above three commands are continuously communicated. Here, the commands and the data lengths are in a one-to-one relationship, and the accessory 300 can determine a data length of each command by analyzing the commands from the camera body 200.

The lower part of FIG. 23 illustrates an example of communication executed between the interchangeable lens 100 and the accessory 300 in a case where an operation on the focus position memory button 705 is detected at a time after the command 1 is communicated and before the command 2 is communicated. In the communication data DCL (DAL) transmitted from the accessory 300 to the interchangeable lens 100, a command 1 having a data length of three bytes is communication data that is acquired by the accessory 300 converting a communication protocol of the command 1 transmitted from the camera body 200 and is communicated by the accessory 300. Similarly, a command 2 and a command 3 are communication data that are acquired by the accessory 300 respectively converting the communication protocols of the command 2 and the command 3 transmitted from the camera body 200 and are communicated by the accessory 300. The accessory 300 receives the command 1 from the camera body 200, converts its communication protocol, and executes the communication of the command 1. In a case where the accessory 300 detects an operation on the focus position memory button 705 during that process, data 1 surrounded by a black frame is executed to the interchangeable lens 100 before the communication of the command 2 is executed. As a result, the interchangeable lens 100 responds to the accessory 300 with four pieces of data 10, 11, 12, and 13 as the communication data DLC (DLA) transmitted from the interchangeable lens 100 to the accessory 300. Since the data 13 surrounded by the black frame is not a response to the request from the camera body 200, the accessory 300 communicates, to the camera body 200, the three pieces of data 10, 11 and 12 after converting their communication protocols. More specifically, the data 10 is transmitted to the camera body 200 as data of a response value that corresponds to the command 1 and is transmitted from the accessory 300 to the camera body 200. Similarly, the data 11 and 12 are transmitted to the camera body 200 as data of response values that respectively correspond to the commands 2 and 3 and are transmitted from the accessory 300 to the camera body 200.

According to the above processing, the accessory 300 can acquire the FPC information from the interchangeable lens 100 at an earliest time after the focus position memory button 705 is operated. Therefore, it is possible to store real-time FPC information when the focus position memory button 705 is operated.

The smaller the delay of the acquisition of the FPC information performed in step S2203 from the time at which the focus position memory button 705 is operated, the more accurate the focus position is stored. Therefore, the acquisition of the FPC information is executed between the interchangeable lens 100 and the accessory 300 while the acquisition interrupts the communication command group from the camera body 200. However, the acquisition of the zooming position information in step S2204 may be executed between the interchangeable lens 100 and the accessory 300 after the execution the communication command group from the camera body 200.

Figure 20:
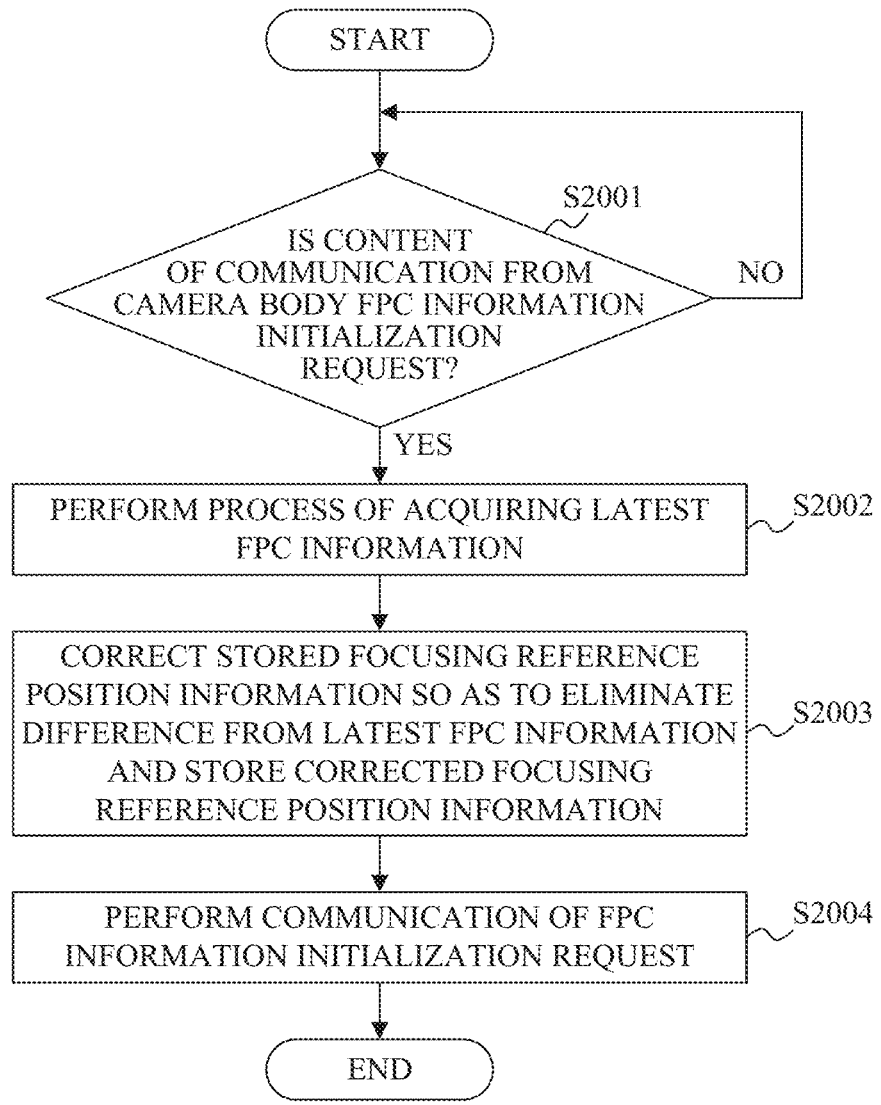
FIG. 20 is a flowchart illustrating a management method corresponding to communication of focusing reference position information between a camera body and an interchangeable lens according to a sixth embodiment.

In this embodiment, a description is given of the method in which the accessory 300 manages the two parameters of the focusing reference position and the focus relative change amount in order to manage the absolute position information of the focus lens 104, but those pieces of information may be managed as FPC information acquired by adding those pieces of information. In that case, if communication of the request for initialization of the FPC information from the camera body 200 described with reference to FIG. 20 is detected, the focusing reference position may be corrected so that a difference from a current FPC information value is eliminated by a process similar to the process in step S2003.

Figure 24:
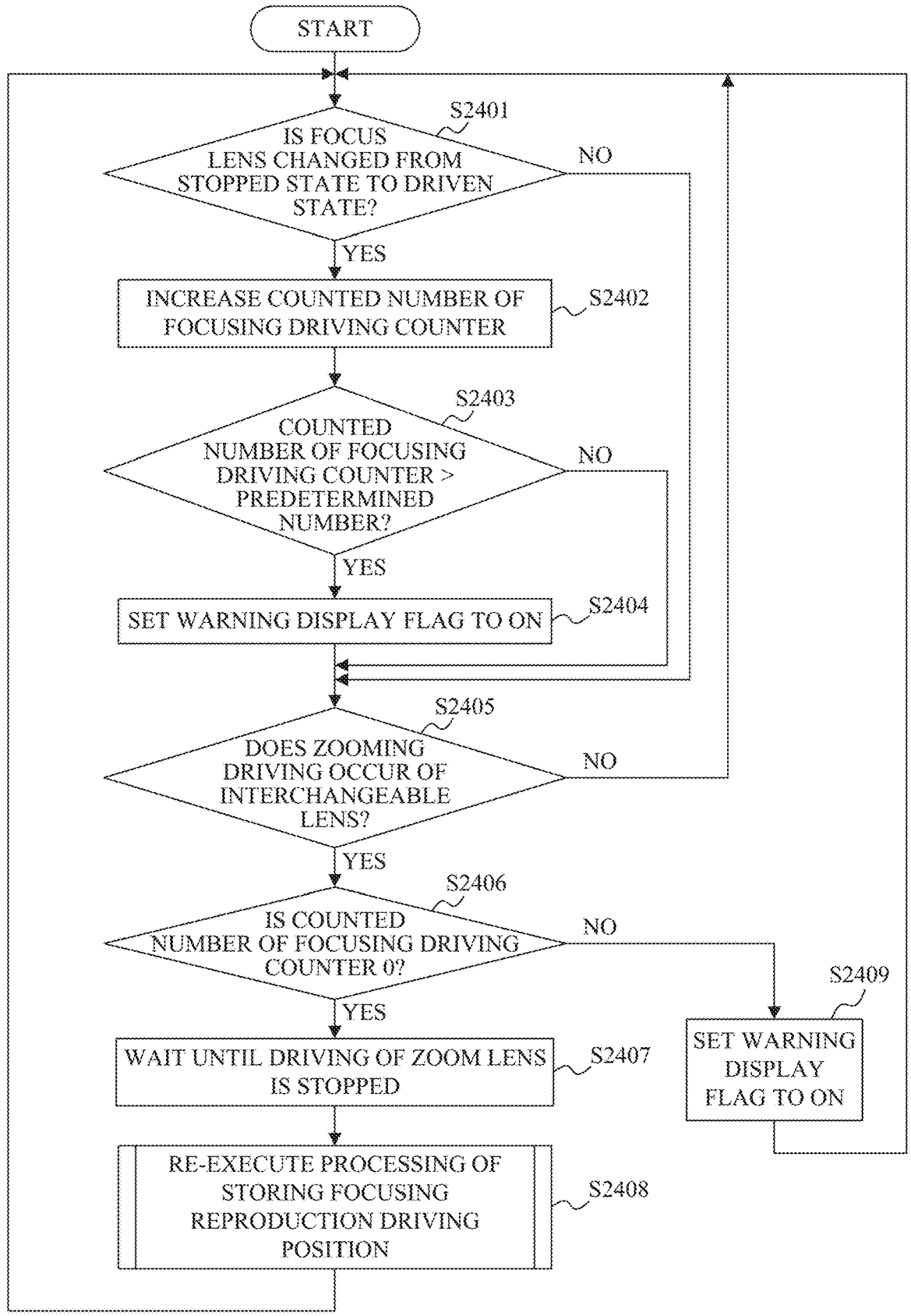
FIG. 24 is a flowchart illustrating processing of re-storing the focus position at a time of zooming operation after the focus position is stored according to the sixth embodiment.

Behavior when Zooming Operation is Performed after Operation of Storing Focus Position As described below, in a case where zooming driving is performed, an error may occur between the focus position as the actual focal plane and the FPC information because of the mechanical structure. Therefore, after the zooming driving, the accuracy of the reproduction driving of the focus position may be deteriorated. Thus, in a case where, after the operation of storing the focusing reproduction target position described with reference to FIG. 22, the zooming driving is performed without focusing driving performed, usability is improved by storing a focus position after the zooming driving as the focusing reproduction target position. The above-described processing is described with reference to FIG. 24.

At the start of this flow, the accessory microcomputer 302 is in a state in which the focusing reproduction target position has been stored in the processing of FIG. 22.

In step S2401, the accessory microcomputer 302 determines whether or not the focus lens 104 is changed from the stopped state to the driven state. This determination may be made by monitoring communication performed between the interchangeable lens 100 and the camera body 200, or by communication of periodically acquiring the focusing driving state performed between the interchangeable lens 100 and the accessory 300. If the accessory microcomputer 302 determines that the focus lens 104 is changed to the driving state, the process proceeds to step S2402. If the accessory microcomputer 302 determines that the focus lens 104 is not changed to the driving state, the process proceeds to step S2405.

In step S2402, the accessory microcomputer 302 increases a counted number of the focusing driving counter managed by itself. The focusing driving counter is initialized by the process in step S2212 at the time of the operation of storing the focusing reproduction position of FIG. 22.

In step S2403, the accessory microcomputer 302 determines whether or not the counted number of the focusing driving counter exceeds a predetermined number. Depending on the type of the actuator that drives and controls the focus lens 104, an error may occur between the focus position as the actual focal plane and the FPC information when the focusing driving is repeatedly performed. Therefore, this determination is performed for performing warning display, which is described below, in a case where the driving and stopping processes are performed a predetermined number or more. If the accessory microcomputer 302 determines that the counted number exceeds the predetermined number, the process proceeds to step S2404, and if the accessory microcomputer 302 determines that the counted number does not exceed the predetermined number the process proceeds to step S2405.

In step S2404, the accessory microcomputer 302 sets, to on, a warning display flag managed by itself.

In step S2405, the accessory microcomputer 302 determines whether or not the zooming driving occurs of the interchangeable lens 100. This determination may be made by monitoring the communication performed between the interchangeable lens 100 and the camera body 200, or by communication that periodically acquires the zooming driving state and is performed between the interchangeable lens 100 and the accessory 300. If the accessory microcomputer 302 determines that the zooming driving occurs, the process proceeds to step S2406, and if the accessory microcomputer 302 determines that the zooming driving does not occur, the process returns to step S2401.

In step S2406, the accessory microcomputer 302 determines whether or not the counted number of the focusing driving counter managed by itself is 0. If the accessory microcomputer 302 determines that the counted number of the focusing driving counter is 0, that is, if the focusing driving is not performed and the zooming driving is performed after the operation of storing the focusing reproduction driving position, the process proceeds to step S2407. If the accessory microcomputer 302 determines that the counted number of the focusing driving counter is not 0, that is, if focusing driving is performed after the operation of storing the focusing reproduction driving position, the process proceeds to step S2409.

In step S2407, the accessory microcomputer 302 waits until the driving of the zoom lens 102 is stopped.

In step S2408, the accessory microcomputer 302 re-executes the processing of storing the focusing reproduction driving position described with reference to FIG. 22.

In step S2409, the accessory microcomputer 302 sets, to on, the warning display flag managed by itself.

According to the above processing, in a case where the zooming driving is performed without the focusing driving performed after the storing of the focusing reproduction driving position, the accessory 300 automatically can re-execute the storing of the focusing reproduction driving position without performing the warning display described below. As a result, usability can be improved.

Behavior in Focus Position Reproduction Operation

Figure 25A:
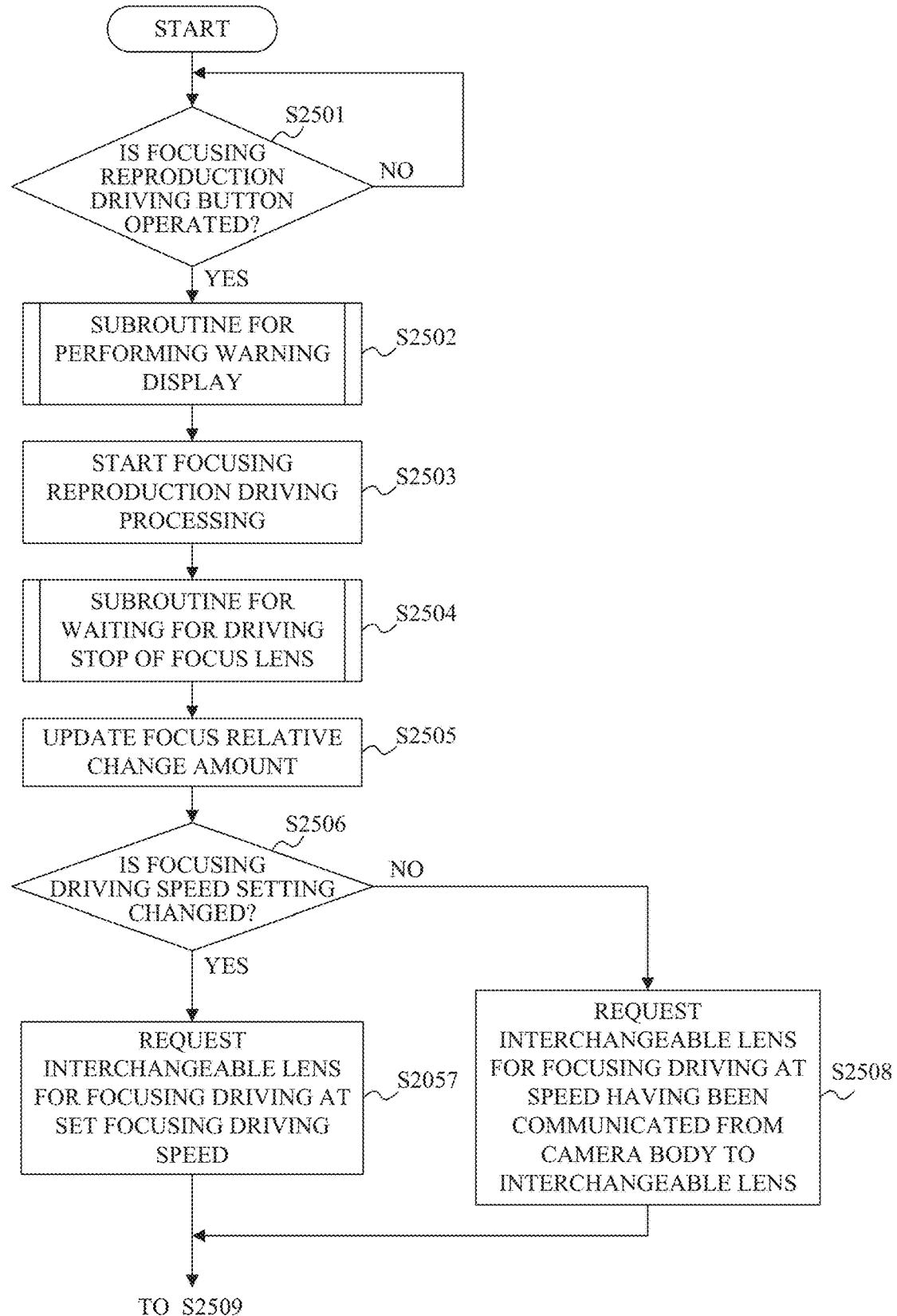
FIGS. 25A and 25B are flowcharts for explaining a reproduction operation of the focus position and warning display processing according to the sixth embodiment.
Figure 25B:
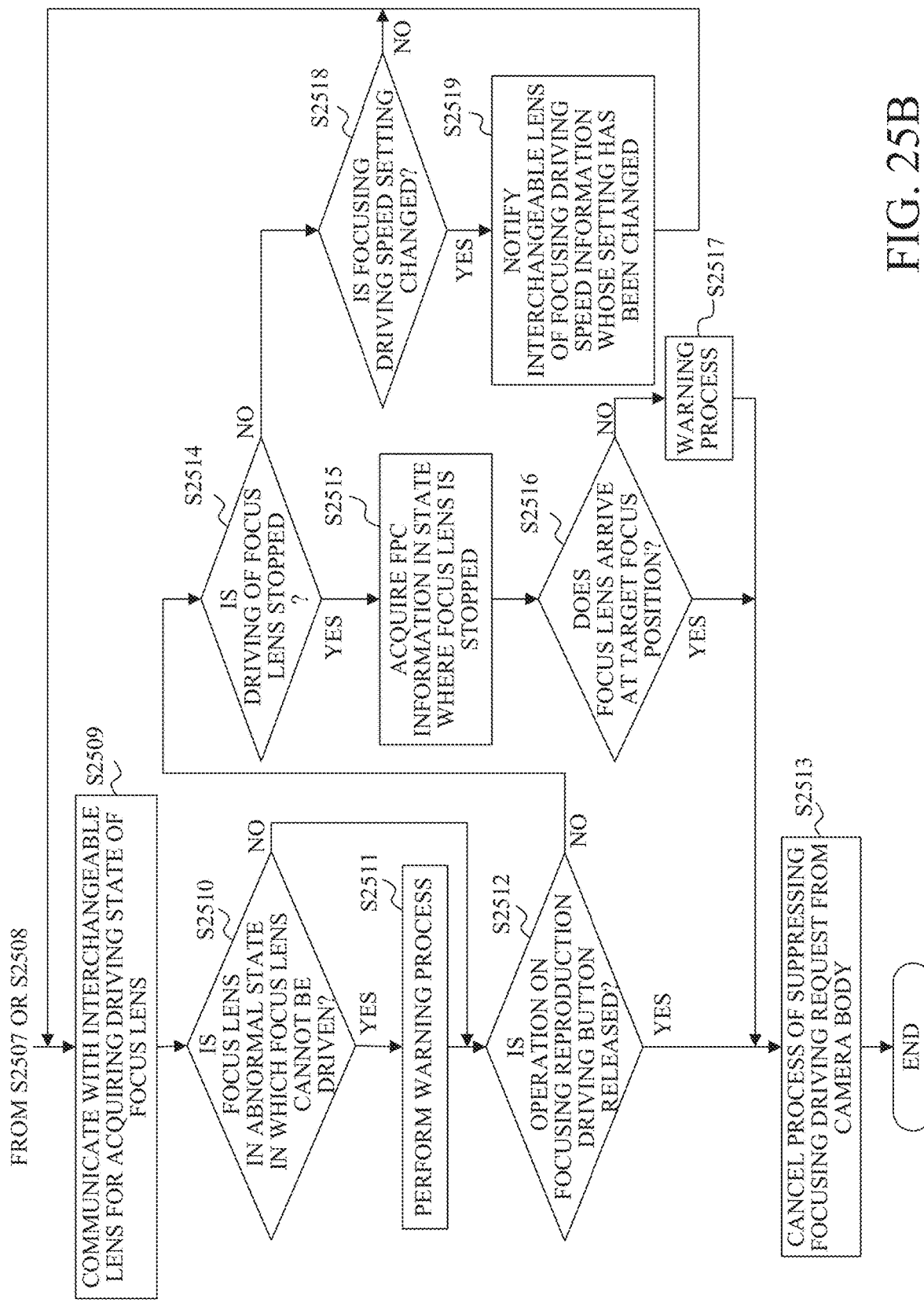

With reference to FIGS. 25A and 25B, a description is given of processing in a case where the focusing reproduction driving button 706, which is a reproduction driving button, is operated.

In step S2501, the accessory microcomputer 302 determines whether or not the focusing reproduction driving button 706 is operated. If the accessory microcomputer 302 determines that the focusing reproduction driving button 706 is operated, the process proceeds to step S2502. If the accessory microcomputer 302 determines that the focusing reproduction driving button 706 is not operated, the process in this step is repeated.

In step S2502, the accessory microcomputer 302 executes a subroutine for performing the warning display.

In step S2503, the accessory microcomputer 302 starts the focusing reproduction driving processing with the interchangeable lens 100.

In step S2504, the accessory microcomputer 302 executes a subroutine for waiting for driving of the focus lens 104 to stop. This subroutine is similar to the process described in steps S2110 to S2119 of FIGS. 21A and 21B.

In step S2505, the accessory microcomputer 302 acquires, from the interchangeable lens 100, the FPC information in a state where the focus lens 104 is stopped, and updates the focus relative change amount managed by itself.

In step S2506, the accessory microcomputer 302 determines whether or not the focusing driving speed setting is changed by the focusing speed setting member 702. The speed setting is similar to the content described with reference to FIG. 14. If the accessory microcomputer 302 determines that the focusing driving speed setting is changed, the process proceeds to step S2507. If the accessory microcomputer 302 determines that the focusing driving speed setting is not changed, the process proceeds to step S2508.

In step S2507, the accessory microcomputer 302 requests the interchangeable lens 100 to perform focusing driving at the focusing driving speed set in step S2506. At this time, the accessory microcomputer 302 requests focusing driving such that a difference value is canceled between the above-described focusing reproduction target position and absolute position information on the focus lens 104 based on the focus relative change amount and on the focusing reference position information stored in advance.

In step S2508, in the accessory microcomputer 302, the focusing speed has not been set or the focusing speed setting has been canceled. Therefore, the accessory microcomputer 302 requests the interchangeable lens 100 to perform focusing driving at a speed that has been communicated, at an immediately preceding time, from the camera body 200 to the interchangeable lens 100. The accessory microcomputer 302 may request the interchangeable lens 100 to perform focusing driving at a maximum speed.

In step S2509, the accessory microcomputer 302 communicates with the interchangeable lens 100 for acquiring the driving state of the focus lens 104.

In step S2510, the accessory microcomputer 302 determines whether or not the focus lens 104 is in an abnormal state in which the focus lens 104 cannot be driven. The abnormal state is, for example, a state where an external factor, such as shock or holding by a hand, makes the focus lens 104 impossible to operate. If the accessory microcomputer 302 determines that the focus lens 104 is in the abnormal state in which the focus lens 104 cannot be driven, the process proceeds to step S2511, and if the accessory microcomputer 302 determines that the focus lens 104 is not in the abnormal state, the process proceeds to step S2512.

In step S2511, the accessory microcomputer 302 performs a warning process.

In step S2512, the accessory microcomputer 302 determines whether or not the operation on the focusing reproduction driving button 706 is released. If the accessory microcomputer 302 determines that the operation on the focusing reproduction driving button 706 is released, the process proceeds to step S2513, and if the accessory microcomputer 302 determines that the operation is not released, the process proceeds to step S2514.

In step S2513, the accessory microcomputer 302 cancels the process of suppressing the focusing driving request from the camera body 200 performed in the subroutine of step S2504.

In step S2514, the accessory microcomputer 302 determines whether or not the driving of the focus lens 104 is stopped. If the accessory microcomputer 302 determines that the driving of the focus lens 104 is stopped, the process proceeds to step S2515, and if the accessory microcomputer 302 determines that the driving is not stopped, the process proceeds to step S2516.

In step S2515, the accessory microcomputer 302 acquires, from the interchangeable lens 100, the FPC information in a state where the focus lens 104 is stopped.

In step S2516, the accessory microcomputer 302 determines whether or not the focus lens 104 arrives at the target focus position specified in step S2506 based on the FPC information acquired in step S2515. As an example of a case where the focus lens 104 cannot arrive at the focus position, there is a case where the interchangeable lens 100 is set so that the focusing driving possible range is limited. If the accessory microcomputer 302 determines that the focus lens 104 arrives at the target focus position, the process proceeds to step S2513, and if the accessory microcomputer 302 determines that the focus lens 104 does not arrive at the target focus position, the process proceeds to step S2517.

In step S2517, the accessory microcomputer 302 performs the warning process.

In step S2518, the accessory microcomputer 302 determines whether or not the focusing driving speed setting is changed by the focusing speed setting member 702. If the accessory microcomputer 302 determines that the focusing driving speed setting is changed, the process proceeds to step S2519, and if the accessory microcomputer 302 determines that the focusing driving speed setting is not changed, the process returns to step S2509.

In step S2519, the accessory microcomputer 302 notifies the interchangeable lens 100 of the focusing driving speed information whose setting has been changed.

Figure 25C:
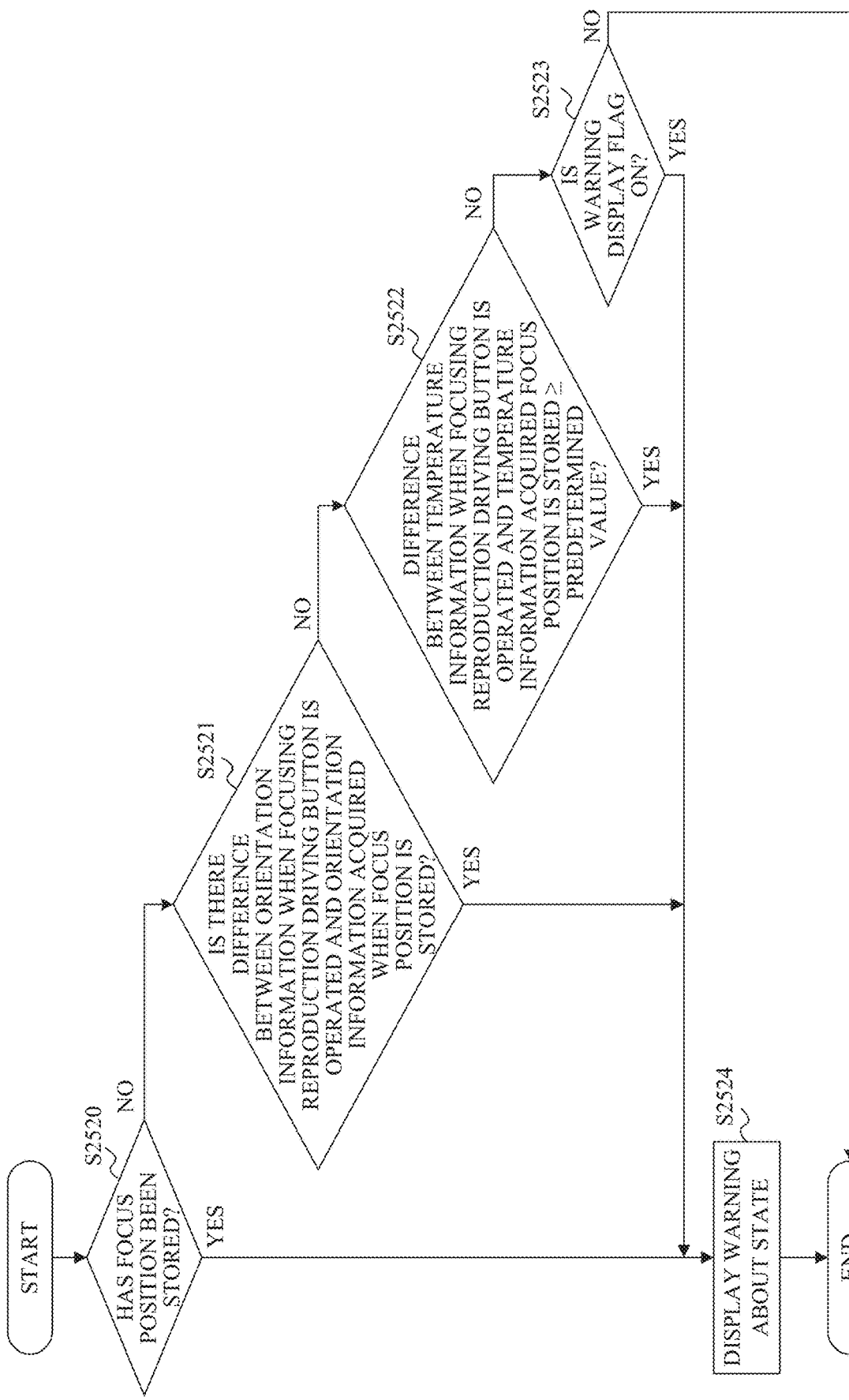
FIG. 25C is a diagram illustrating a subroutine for performing the warning display according to the sixth embodiment.

Hereinafter, a subroutine for performing the warning display in step S2502 is described with reference to FIG. 25C.

In step S2520, the accessory microcomputer 302 determines whether or not the storing of the focus position described with reference to FIG. 22 has been executed. If the accessory microcomputer 302 determines that the storing of the focus position has been executed, the process proceeds to step S2524, and if the accessory microcomputer 302 determines that the storing has not been executed, the process proceeds to step S2521.

In step S2521, the accessory microcomputer 302 determines whether or not there is a difference between the orientation information when the focusing reproduction driving button 706 is operated and the orientation information acquired in step S2211 when the focus position is stored. If the accessory microcomputer 302 determines that there is a difference, the process proceeds to step S2524, and if the accessory microcomputer 302 determines that there is no difference, the process proceeds to step S2522. As the method of acquiring the orientation information, a method similar to step S2211 may be used.

In step S2522, the accessory microcomputer 302 determines whether or not a difference between the temperature information when the focusing reproduction driving button 706 is operated and the temperature information acquired in step S2211 in the storing of the focus position is equal to or greater than a predetermined value. If the accessory microcomputer 302 determines that the difference is equal to or greater than the predetermined value, the process proceeds to step S2524, and if the accessory microcomputer 302 determines that the difference is not equal to or greater than the predetermined value, the process proceeds to step S2523. The predetermined value may be changed depending on the type of actuator that drives the focus lens 104 (stepping motors 107 and 108 in FIG. 1). As the method of acquiring the temperature information, a method similar to step S2211 may be used.

In step S2523, the accessory microcomputer 302 determines whether or not the warning display flag managed by itself is on. If the accessory microcomputer 302 determines that the warning display flag is on, the process proceeds to step S2524, and if the accessory microcomputer 302 determines that the flag is not on, this flow ends.

Step S2524 is a step executed in a case where the driving accuracy at the time of focusing reproduction driving may be deteriorated, and the accessory microcomputer 302 causes the accessory notification unit 330 to notify the user of the warning state. In the communication performed by the accessory 300 with the camera body 200, the camera body 200 may be prompted to perform an error display by the accessory 300 intentionally violating the communication format (the camera body 200 may be notified of a communication error). The reproduction driving processing of the focus may be continued even in a case where the warning display process is performed, or the reproduction driving processing may be stopped at this point.

As described above, processing of the focus position reproduction operation enables the focusing driving from the focus position when the reproduction driving button is operated to the focus position for reproduction driving stored in advance in the accessory 300. Further, it is possible to display a warning to the user by determining zooming position change, orientation change, temperature change, number of focusing driving times, etc. as a case where the accuracy of focusing reproduction driving may be deteriorated.

Figure 26:
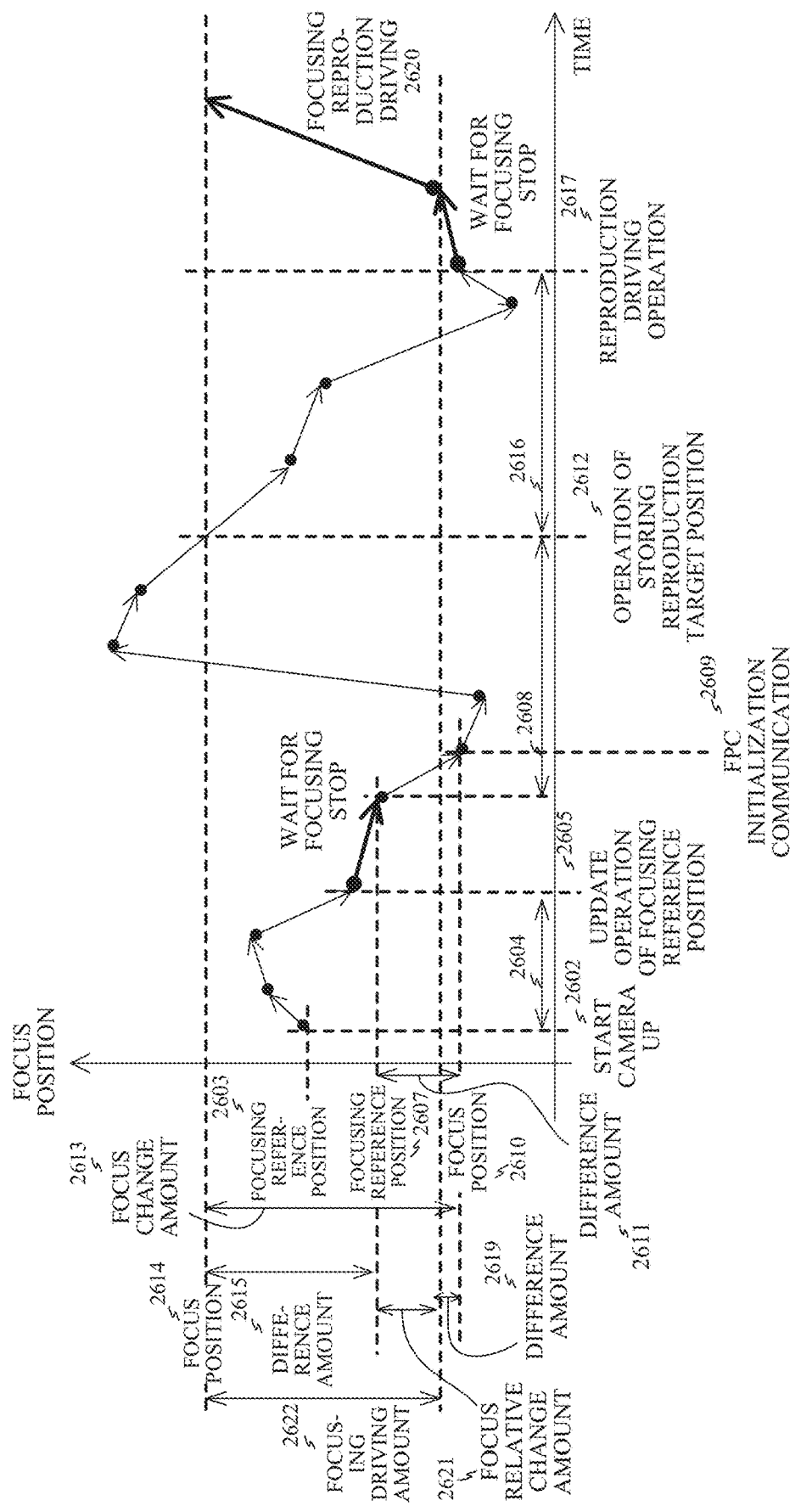
FIG. 26 is a diagram illustrating a focusing process in a case where a focus position is stored and the reproduction operation is performed according to the sixth embodiment.

Hereinafter, with reference to FIG. 26, a description is given of how the focus position is moved by the update processing of the focusing reference position information, the behavior in the operation of storing the focus position, and the behavior in the focus position reproduction operation in a chronological order. In FIG. 26, a horizontal axis represents the time and a vertical axis represents the position information on the focus lens 104.

First, when start processing of the camera body 200 is performed at time 2602, the focusing reference position managed by the accessory 300 is determined. At the same time, the FPC information communicated between the interchangeable lens 100 and the camera body 200 is set to zero. A focusing reference position 2603 indicates that the accessory 300 manages the focus position as the reference position.

The changes in the focus position illustrated in section 2604 represent the changes in the focus lens 104 caused by the focusing driving instruction instructed to the interchangeable lens 100 via the accessory 300 based on autofocus control from the camera body 200, or by a manual focusing operation.

Figure 21A:
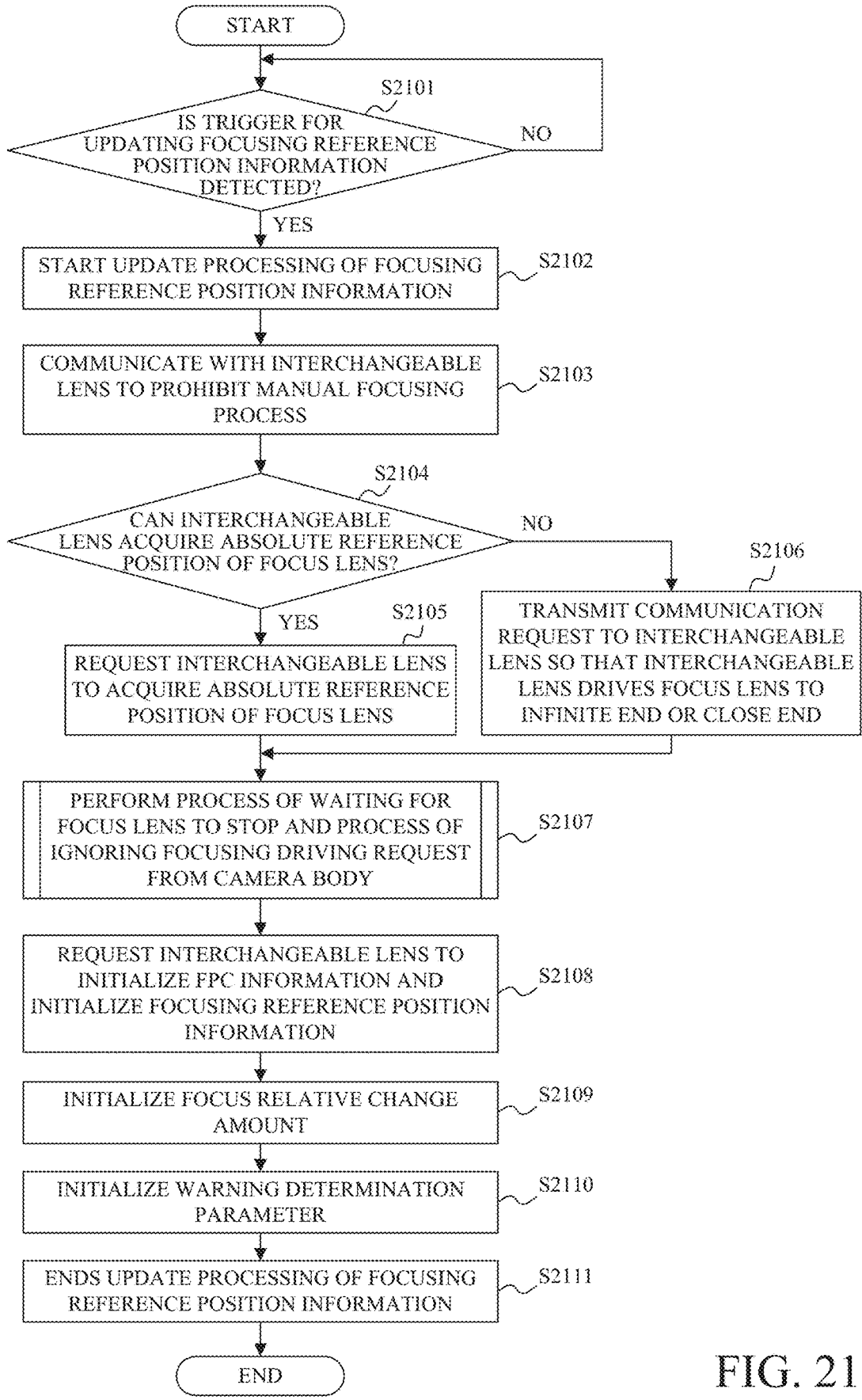
FIG. 21A is a flowchart illustrating processing of updating the focusing reference position information according to the sixth embodiment.
Figure 21B:
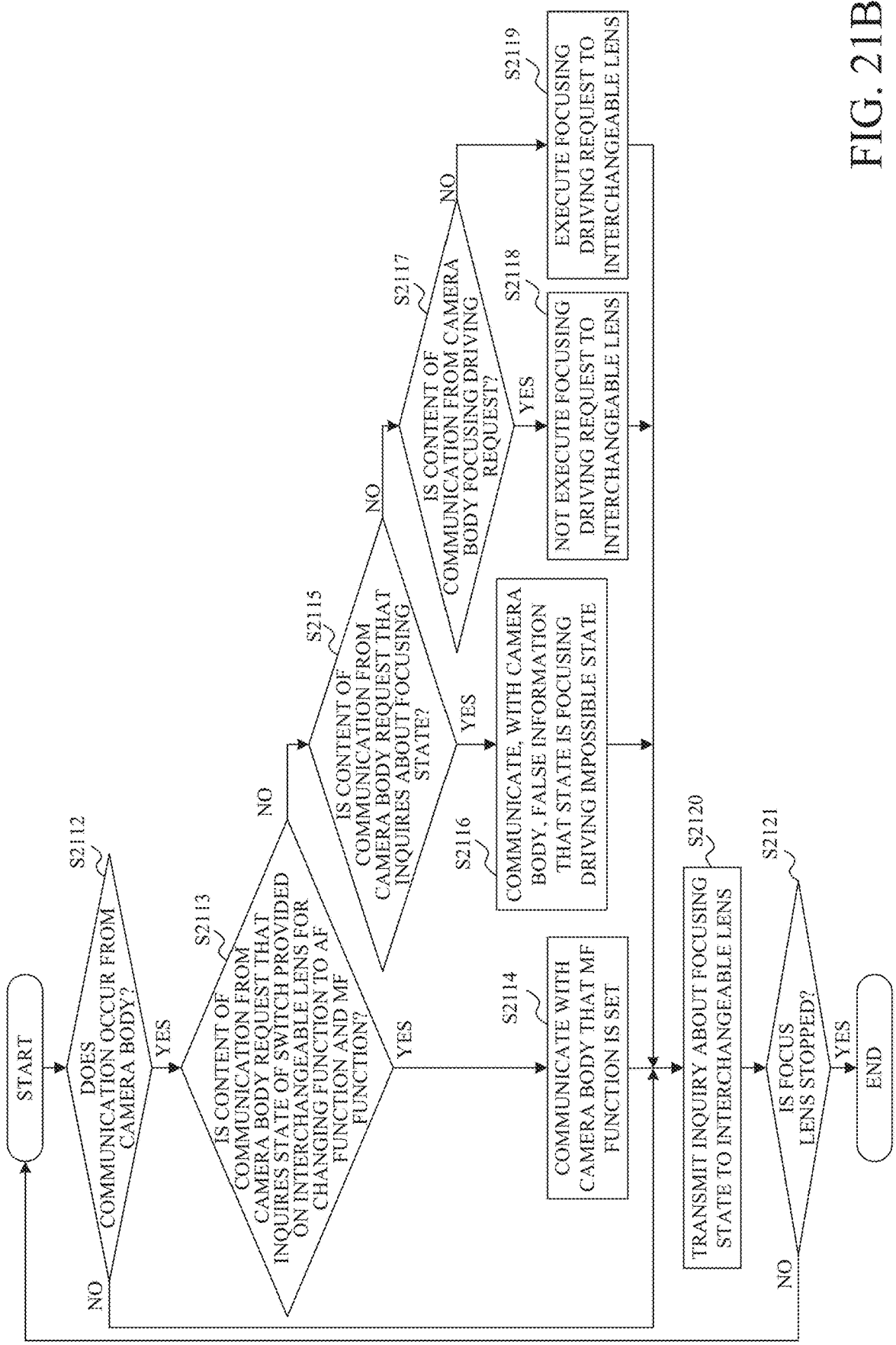
FIG. 21B is a diagram illustrating a subroutine of focus-stop confirming processing according to the sixth embodiment.

When the update operation of the focusing reference position by the user is received at time 2605, the process is performed of waiting for focusing to stop described in step S2107 of FIG. 21A. After confirming that the focus lens 104 has been stopped in this process, the accessory 300 re-stores a focusing reference position 2607 as the focusing reference position. FIG. 26 illustrates a case where the attached interchangeable lens 100 is an interchangeable lens that can acquire the absolute reference position determined in step S2104, and a reset sensor is located at the focusing reference position 2607. At this time point, the FPC information communicated between the interchangeable lens 100 and the camera body 200 is set to zero.

In section 2608, similarly to section 2604, the user changes the focus position by autofocus control or manual focus control.

At time 2609, when the accessory 300 detects the request for the initialization of the FPC information from the camera body 200, the focusing reference position stored in the accessory 300 is updated by the processing of FIG. 20. A focus position 2610 is the focus position when the request for initialization of the FPC information is detected. A difference amount 2611 between the focusing reference position 2607 and the focus position 2610 corresponds to the amount of correcting the focusing reference position information in step S2003.

At time 2612, when the operation of storing the focusing reproduction target position by the user is received, the accessory 300 acquires the FPC information from the interchangeable lens 100 in the process in step S2203 or step S2208 of FIG. 22. At this time, the latest FPC information is acquired without the focus position stopped. The zero position of the FPC information at this point is the focus position 2610, and the FPC information acquired at time 2612 is a focus change amount 2613. The current focus position at this time is a focus position 2614, which is the same position as the focusing reproduction target position stored in the accessory 300. The difference amount 2615 between the current focus position and the focusing reference position is stored in the accessory 300 as the focus relative change amount.

In section 2616, similarly to section 2604, the user changes the focus position by autofocus control or manual focus control.

When the reproduction driving operation by the user is received at time 2617, a process of waiting for focusing to stop is performed as the process of waiting for the focusing to stop in step S2504. The FPC information at a position where the focusing stops is a difference amount 2619 from the focus position 2610. After the focus lens 104 is stopped, focusing reproduction driving 2620 is performed on the focusing reproduction target position by the process in step S2506. A focusing driving amount 2622 at this time can be calculated by the following equation.

Focusing Driving Amount 2622={Focus Position 2614−(Focusing Reference Position 2607+Focus Relative Change Amount 2621)}

As described above, the process (movement) described with reference to FIG. 26 makes it possible that the storing of the focus position and the reproduction driving is realized by the operations by the user. In this embodiment, a description is given of the case where only one point is stored when the focus position is stored, but the present disclosure is not limited to this, and focus positions may be stored in a plurality of points.

Figure 27:
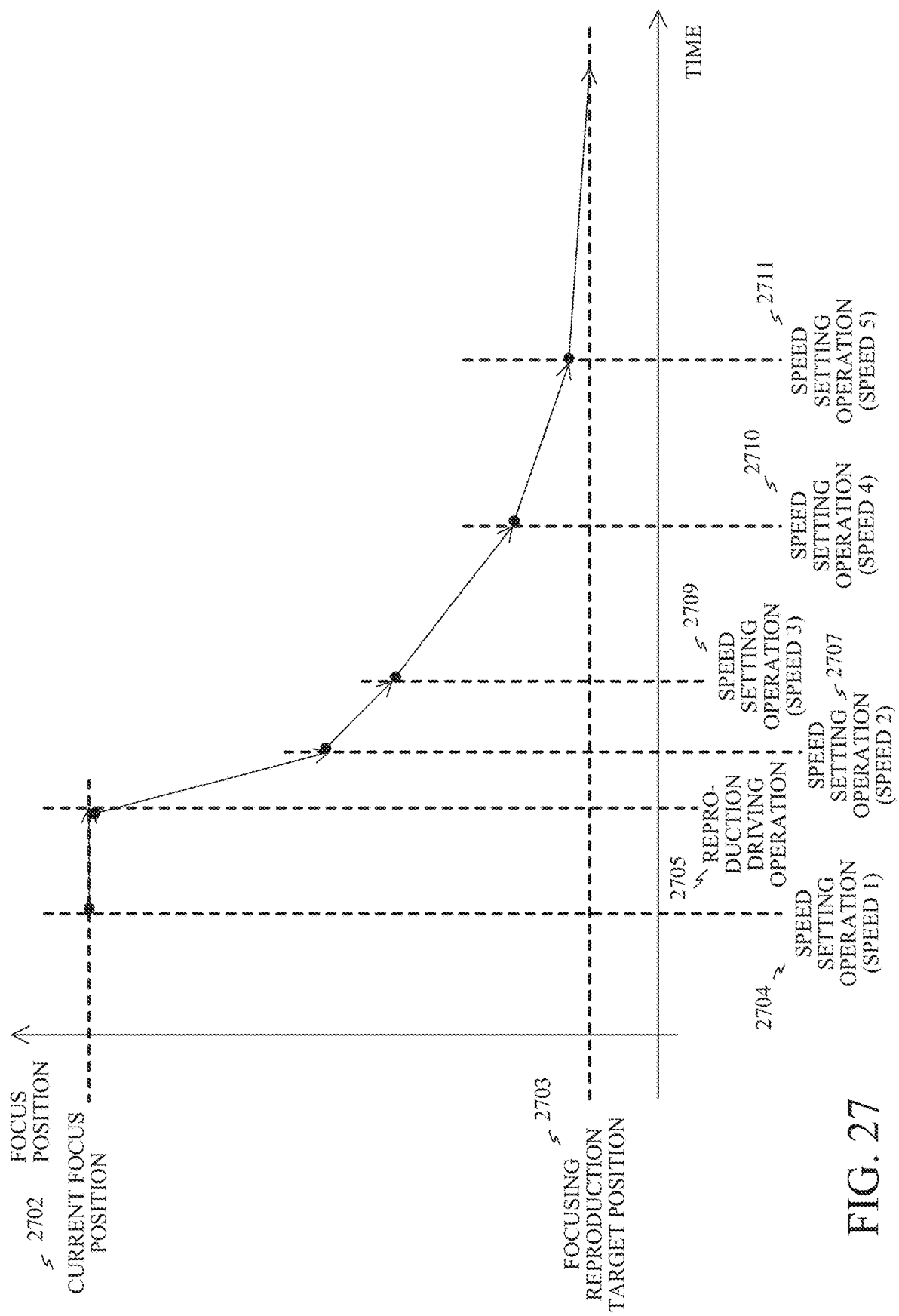
FIG. 27 is a diagram illustrating a focusing process in a case where a focusing speed setting changing operation is performed during focusing reproduction driving according to the sixth embodiment.

Hereinafter, with reference to FIG. 27, a description is given of a focusing process in a case where the focusing speed setting changing operation is performed during the focusing reproduction driving as described in step S2518. In FIG. 27, a horizontal axis represents time and a vertical axis represents position information on the focus lens 104.

At the start of this process, the focus lens 104 is at a current focus position 2702. A description is given of an example of a case of driving from the focus position 2702 to a focusing reproduction target position 2703.

When the focusing speed setting operation on the accessory 300 is performed at time 2704, the accessory 300 stores the set value. After that, the focusing speed setting is changed at times 2707, 2709, 2710, and 2711. In this embodiment, speed 1, speed 2, speed 3, speed 4, and speed 5 can be selected, and the speed setting is such that the speed gradually decrease from speed 1.

Next, the focusing reproduction driving operation is performed at time 2705. This operation starts focusing driving at a high speed setting.

Next, when the focusing speed setting operation of the accessory 300 is performed at time 2707, the accessory 300 stores the set value and communicates the change of the speed setting with the interchangeable lens 100. This operation changes the focusing driving to focusing driving at a speed setting slightly slower than the speed set at time 2704. After that, the speed of the focusing reproduction driving can be gradually changed to a low speed by performing the speed setting change operation at times 2709, 2710, and 2711. In FIG. 27, the operation of gradually slowing down the speed setting is described as an example, but the speed setting may be increased or high speed and low speed may be properly switched.

As described above, the process described with reference to FIG. 27 enables the user operation to control the speed of focusing reproduction driving.

Seventh Embodiment

In the sixth embodiment, the storing of the focus position and the reproduction driving are realized by the user operation, but in this embodiment, the accessory 300 automatically performs the focusing reproduction driving during an exposure period, and thereby a function of focusing driving during exposure is exerted.

Figure 28:
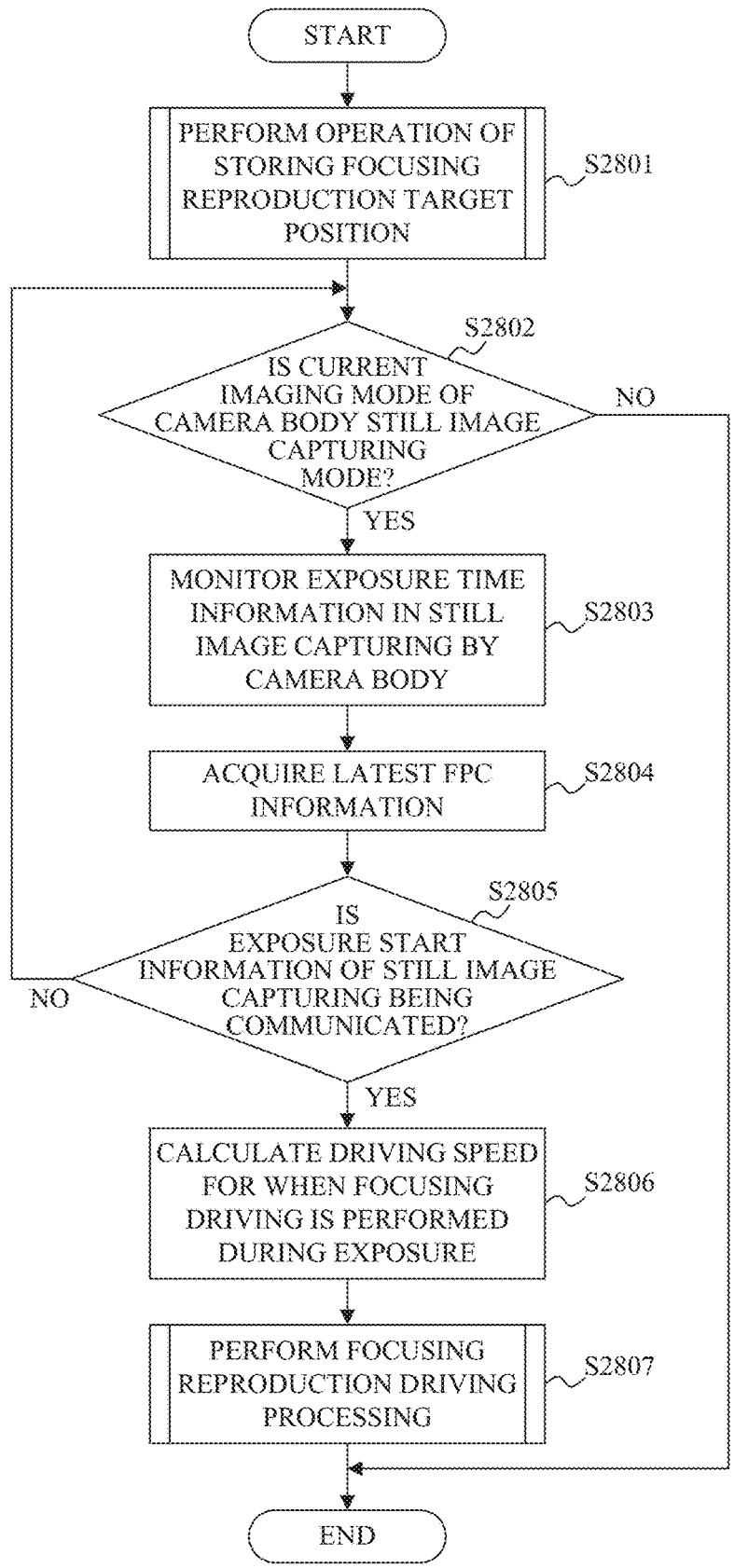
FIG. 28 is a flowchart illustrating processing of focusing driving during exposure in still image capturing according to a seventh embodiment.

With reference to FIG. 28, a description is given of a flow at the time of still image capturing according to this embodiment.

In step S2801, the accessory microcomputer 302 performs the operation of storing the focusing reproduction target position described with reference to FIG. 22.

In step S2802, the accessory microcomputer 302 determines whether or not a current imaging mode of the camera body 200 is a still image capturing mode. If the accessory microcomputer 302 determines that the imaging mode is the still image capturing mode, the process proceeds to step S2803, and if the accessory microcomputer 302 determines that the imaging mode is not the still image capturing mode, this flow ends.

In step S2803, the accessory microcomputer 302 monitors exposure time information in the still image capturing performed by the camera body 200.

In step S2804, the accessory microcomputer 302 acquires the latest FPC information from the interchangeable lens 100.

In step S2805, the accessory microcomputer 302 determines whether or not the exposure start information in still image capturing is being communicated. If the accessory microcomputer 302 determines that the exposure start information in still image capturing is being communicated, the process proceeds to step S2806, and if the accessory microcomputer 302 determines that the exposure start information is not being communicated, the process returns to step S2802.

In step S2806, the accessory microcomputer 302 calculates the driving speed of the focus lens 104 for a case where focusing driving is performed during exposure. Specifically, the accessory microcomputer 302 uses the exposure time acquired in step S2803 and a driving amount of the focus lens 104 based on the FPC information acquired in step S2804 and the reproduction target position information in step S2801. Information including the driving amount of the focus lens 104 and information relating to the driving speed of the focus lens 104 is referred to as information on focus control during exposure.

In step S2807, the focusing reproduction driving processing described with reference to FIG. 25A is performed.

Figure 29:
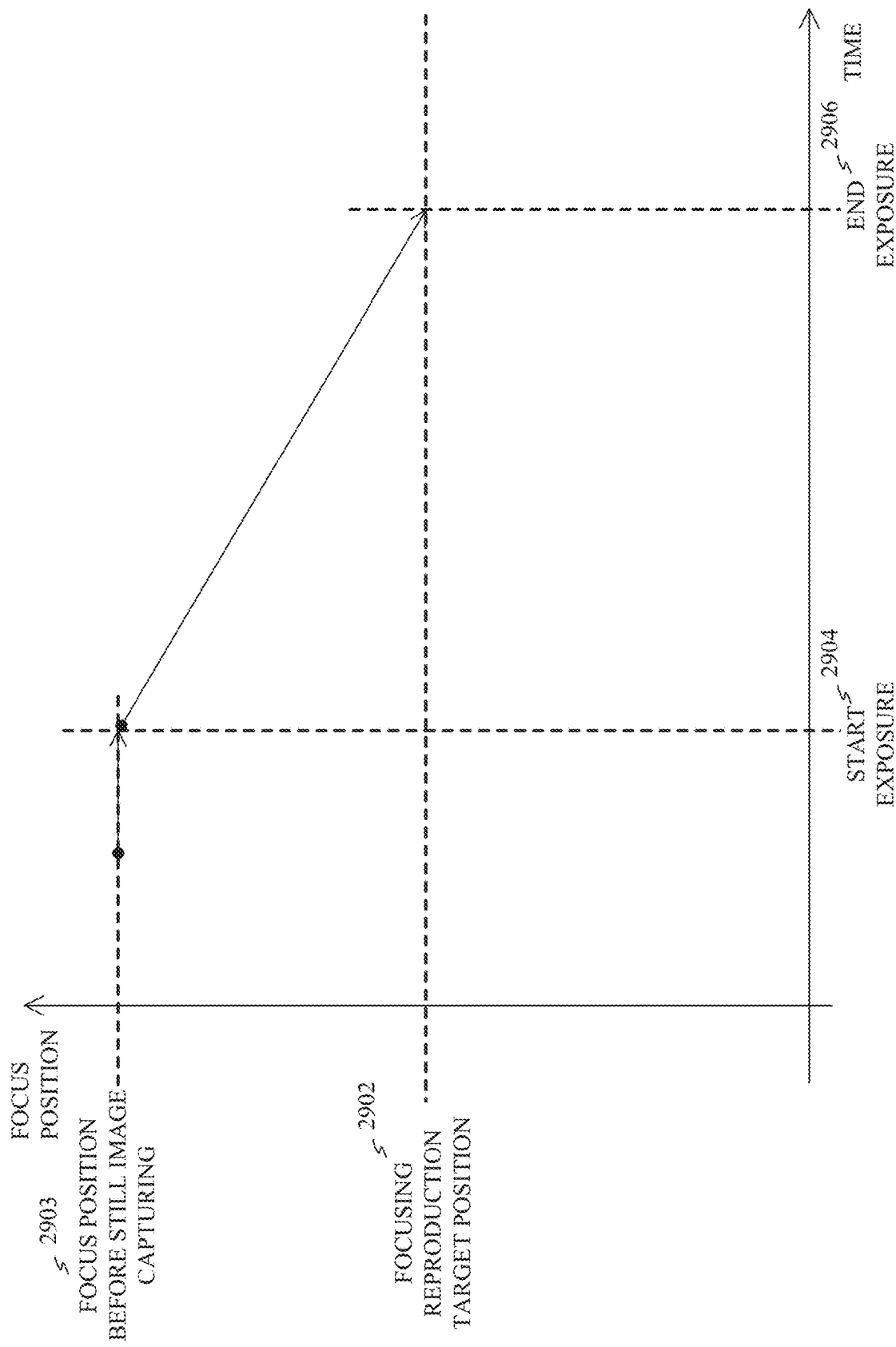
FIG. 29 is a diagram illustrating a focusing process in focusing driving during exposure in still image capturing according to the seventh embodiment.

With reference to FIG. 29, the flow described above is supplementarily described. In FIG. 29, a horizontal axis represents time and a vertical axis represents position information on the focus lens 104.

In step S2801, a focusing reproduction target position 2902 is stored. Here, the focusing reproduction target position 2902 has been stored by the user prior to the still image capturing operation.

Time 2904 is a time of the start of exposure. Information on this time is determined by the accessory 300 from the information communicated from the camera body 200 to the interchangeable lens 100. This process corresponds to the process in step S2803.

Then, in the process in step S2807, the accessory 300 communicates the focusing driving request to the interchangeable lens 100, so that the focus lens 104 moves from a position 2903 of the focus lens 104 before the still image capturing. At this time, the focusing driving amount and the driving speed calculated in step S2806 are used.

Time 2906 is a time of the end of exposure.

According to the process described above, in a case where the user performs the operation on the accessory 300 for storing the focusing reproduction driving position in advance, control can be easily realized of the focusing driving during exposure in still image capturing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-156457, filed on Sep. 27, 2021, and Japanese Patent Application No. 2021-156568, filed on Sep. 27, 2021, each of which is hereby incorporated by reference herein in its entirety.

What is claimed is:

1. An accessory detachably attached between an interchangeable lens and an imaging apparatus, the accessory comprising:
   a communication unit configured to communicate with the interchangeable lens and the imaging apparatus;
   a first operation unit configured to be operated in a case where focus position information on the interchangeable lens is to be acquired from the interchangeable lens;
   a memory unit configured to store information relating to focus of the interchangeable lens based on the focus position information;
   a second operation unit configured to be operated in a case where reproduction driving is to be performed of a focus lens included in the interchangeable lens; and
   at least one processor configured to function as a control unit configured to control driving of the focus lens,
   wherein in a case where the first operation unit is operated, the control unit acquires the information relating to focus by using the focus position information, and
   wherein in a case where the second operation unit is operated, the control unit performs the reproduction driving of the focus lens by using the information relating to focus;
   wherein the communication unit communicates with the interchangeable lens independently of a communication request from the imaging apparatus, while the first operation unit is being operated,
   wherein in a case where a communication request from the imaging apparatus is executed at the same time as when the first operation unit is operated, the communication unit transmits, to the interchangeable lens, information acquired by adding a predetermined communication request to the communication request from the imaging apparatus and transmits, to the imaging apparatus, information acquired by removing information corresponding to the predetermined communication request from information acquired from the interchangeable lens.

2. The accessory according to claim 1, further comprising a third operation unit configured to be operated in a case where the interchangeable lens is to be requested to initialize the focus position information and the information relating to focus stored in the memory unit is to be initialized.

3. The accessory according to claim 2, wherein the communication unit transmits the information relating to focus to the imaging apparatus while the control unit is executing control according to an operation on the third operation unit.

4. The accessory according to claim 2, wherein the communication unit transmits, to the imaging apparatus, information indicating that (i) the interchangeable lens is in a manual focusing state or (ii) the interchangeable lens is in a state such that the interchangeable lens cannot execute autofocus control instructed by the imaging apparatus, while the control unit is executing control according to an operation on the third operation unit.

5. The accessory according to claim 2, wherein the communication unit communicates with the interchangeable lens independently of a communication request from the imaging apparatus, while the control unit is executing control according to an operation on the third operation unit.

6. The accessory according to claim 1, further comprising a setting unit configured to be used when a driving speed of the focus lens is to be set for a case where the control unit controls the driving of the focus lens.

7. The accessory according to claim 6, wherein the communication unit transmits, to the interchangeable lens, the driving speed of the focus lens set by the setting unit, while the second operation unit is being operated.

8. The accessory according to claim 1, wherein the communication unit transmits the information relating to focus of the interchangeable lens to the imaging apparatus, while the control unit is controlling driving of the focus lens.

9. The accessory according to claim 8, wherein the communication unit transmits, to the imaging apparatus, information indicating that (i) the interchangeable lens is in a manual focusing state or (ii) the interchangeable lens is in a state such that the interchangeable lens cannot execute autofocus control instructed by the imaging apparatus, while the control unit is controlling the driving of the focus lens.

10. The accessory according to claim 1, wherein in a case where a change in a zooming position of the interchangeable lens is detected after the first operation unit is operated, the control unit acquires the information relating to focus by using the focus position information.

11. The accessory according to claim 1, wherein the control unit acquires information on focus control during exposure by using (i) a time when a still image is captured, the time being determined based on communication from the imaging apparatus, (ii) the information relating to focus stored in the memory unit, and (iii) current information relating to focus.

12. The accessory according to claim 11, wherein the information on focus control during exposure includes a driving amount of the focus lens and information relating to a driving speed of the focus lens.

13. The accessory according to claim 1, further comprising a notification unit configured to notify a user that driving accuracy of the focus lens is deteriorated in a case where the driving accuracy of the focus lens during the reproduction driving of the focus lens is deteriorated.

14. The accessory according to claim 13, wherein by using any of light, sound, and vibration, the notification unit notifies the user that the driving accuracy is deteriorated.

15. The accessory according to claim 13, wherein by causing a communication error in the communication unit, the notification unit notifies the user that the driving accuracy is deteriorated.

16. The accessory according to claim 13, wherein in a case where the first operation unit is operated, the memory unit stores information relating to the interchangeable lens, and
wherein in a case where the second operation unit is operated, the control unit determines, by using the information relating to the interchangeable lens, whether or not to cause the notification unit to notify the user that the driving accuracy is deteriorated.

17. The accessory according to claim 16, wherein the information relating to the interchangeable lens includes at least one piece of information of zooming position information on the interchangeable lens, position information on the interchangeable lens, temperature information on the interchangeable lens, and information relating to the number of focusing driving of the interchangeable lens.

18. The accessory according to claim 16, wherein the information relating to the interchangeable lens includes zooming position information on the interchangeable lens,
wherein in a case where a difference between the zooming position information when the focus position information is acquired and the zooming position information when the reproduction driving of the focus lens is performed is smaller than a predetermined value, the control unit does not cause the notification unit to notify the user that the driving accuracy of the focus lens is deteriorated, and
wherein in a case where the difference is larger than the predetermined value, the control unit causes the notification unit to notify the user that the driving accuracy of the focus lens is deteriorated.

19. The accessory according to claim 16, wherein the information relating to the interchangeable lens includes position information on the interchangeable lens,
wherein in a case where a difference between the position information when the focus position information is acquired and the position information when the reproduction driving of the focus lens is performed is smaller than a predetermined value, the control unit does not cause the notification unit to notify the user that the driving accuracy of the focus lens is deteriorated, and
wherein in a case where the difference is larger than the predetermined value, the control unit causes the notification unit to notify the user that the driving accuracy of the focus lens is deteriorated.

20. The accessory according to claim 16, wherein the information relating to the interchangeable lens includes temperature information on the interchangeable lens,
wherein in a case where a difference between the temperature information when the focus position information is acquired and the temperature information when the reproduction driving of the focus lens is performed is smaller than a predetermined value, the control unit does not cause the notification unit to notify the user that the driving accuracy of the focus lens is deteriorated, and wherein in a case where the difference is larger than the predetermined value, the control unit causes the notification unit to notify the user that the driving accuracy of the focus lens is deteriorated.

21. The accessory according to claim 16, wherein the information relating to the interchangeable lens includes information relating to the number of times of focusing driving is performed by the interchangeable lens, wherein in a case where a difference between the information relating to the number of times of focusing driving is performed when the focus position information is acquired and the information relating to the number of times of focusing driving is performed when the reproduction driving of the focus lens is performed is smaller than a predetermined value, the control unit does not cause the notification unit to notify the user that the driving accuracy of the focus lens is deteriorated, and wherein in a case where the difference is larger than the predetermined value, the control unit causes the notification unit to notify the user that the driving accuracy of the focus lens is deteriorated.

22. The accessory according to claim 13, wherein in a case where the second operation unit is operated and the focus lens has not arrived at a target position, the control unit causes the notification unit to notify the user that the driving accuracy of the focus lens is deteriorated.

23. The accessory according to claim 1, wherein the starting point position can be updated according to a request from the imaging apparatus, and wherein, when the starting point position is updated, the memory stores information relating differences the starting point position before update and the reference position.

24. A control method of an accessory that is detachably attached between an interchangeable lens and an imaging apparatus and includes a first operation unit configured to be operated in a case where focus position information on the interchangeable lens is to be acquired from the interchangeable lens, and a second operation unit configured to be operated in a case where reproduction driving is to be performed of a focus lens included in the interchangeable lens, the control method comprising:

a step in which the first operation unit is operated;

a step of acquiring information relating to focus by using the focus position information;

a step of storing the information relating to focus;

a step in which the second operation unit is operated; and a step of performing the reproduction driving of the focus lens by using the information relating to focus;

a step of communicating with the interchangeable lens independently of a communication request from the imaging apparatus, while the first operation unit is being operated, wherein in a case where a communication request from the imaging apparatus is executed at the same time as when the first operation unit is operated, the step of communicating transmits, to the interchangeable lens, information acquired by adding a predetermined communication request to the communication request from the imaging apparatus and transmits, to the imaging apparatus, information acquired by removing information corresponding to the predetermined communication request from information acquired from the interchangeable lens.

25. A non-transitory computer-readable storage medium storing a computer program that causes a computer to execute the control method according to claim 24.

* * * * *